US012553185B2

United States Patent
Sugiyama et al.

(10) Patent No.: US 12,553,185 B2
(45) Date of Patent: Feb. 17, 2026

(54) FINE FIBROUS CELLULOSE, DISPERSED SOLUTION, SHEET, LAMINATED SHEET, LAMINATE, AND METHOD FOR PRODUCING FINE FIBROUS CELLULOSE

(71) Applicant: OJI HOLDINGS CORPORATION, Tokyo (JP)

(72) Inventors: Ikue Sugiyama, Tokyo (JP); Yusuke Matsubara, Tokyo (JP); Rina Shishido, Tokyo (JP); Hayato Fushimi, Tokyo (JP); Yoshiharu Nishikori, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 136 days.

(21) Appl. No.: 17/999,308

(22) PCT Filed: May 19, 2021

(86) PCT No.: PCT/JP2021/019070
§ 371 (c)(1),
(2) Date: Nov. 18, 2022

(87) PCT Pub. No.: WO2021/235501
PCT Pub. Date: Nov. 25, 2021

(65) Prior Publication Data
US 2023/0203755 A1   Jun. 29, 2023

(30) Foreign Application Priority Data
May 19, 2020   (JP) .................................. 2020-087680
May 19, 2020   (JP) .................................. 2020-087681
(Continued)

(51) Int. Cl.
*D21H 11/20* (2006.01)
*B32B 5/02* (2006.01)
(Continued)

(52) U.S. Cl.
CPC ............... *D21H 11/20* (2013.01); *B32B 5/02* (2013.01); *B32B 7/12* (2013.01); *B32B 27/12* (2013.01);
(Continued)

(58) Field of Classification Search
CPC ........ D21H 11/20; D21H 21/26; D21H 11/18; B32B 2262/062; C08B 9/00; C08B 3/00
See application file for complete search history.

(56) References Cited

U.S. PATENT DOCUMENTS

| 2010/0224840 | A1  | 9/2010 | Hawkes et al. |
| 2016/0115249 | A1* | 4/2016 | Noguchi .................... C08B 5/00 536/62 |
| 2017/0183820 | A1* | 6/2017 | Banzashi ................. B32B 5/28 |

FOREIGN PATENT DOCUMENTS

| CN | 106661840 A  * | 5/2017 | ........... G02F 1/1333 |
| EP | 2 644 371 A1 | 10/2013 | |

(Continued)

OTHER PUBLICATIONS

English machine translation of CN106661840A1, 2017 (Year: 2017).*
(Continued)

*Primary Examiner* — Anthony Calandra
(74) *Attorney, Agent, or Firm* — Sughrue Mion, PLLC

(57) ABSTRACT

It is an object of the present invention to provide fine fibrous cellulose capable of enhancing transparency and suppressing coloring, when the fine fibrous cellulose are processed into a dispersed solution or a sheet. The present invention relates to fine fibrous cellulose, in which the amount of substituents introduced is less than 0.5 mmol/g and the fiber width is 1 to 10 nm. Moreover, the present invention relates to a dispersed solution and a sheet, each of which comprises fine fibrous cellulose. Furthermore, the present invention relates to a method for producing fine fibrous cellulose, comprising: (A) removing at least a part of substituents from
(Continued)

fine fibrous cellulose with a fiber width of 1000 nm or less having the substituents, and (B) performing a uniform dispersion treatment on the resulting fine fibrous cellulose after completion of the (A).

17 Claims, 1 Drawing Sheet

(30) Foreign Application Priority Data

May 18, 2021 (JP) .................................. 2021-084169
May 18, 2021 (JP) .................................. 2021-084170

(51) Int. Cl.
  *B32B 7/12* (2006.01)
  *B32B 27/12* (2006.01)
  *D21H 21/26* (2006.01)

(52) U.S. Cl.
  CPC ........ *D21H 21/26* (2013.01); *B32B 2262/062* (2013.01); *B32B 2305/22* (2013.01); *B32B 2307/412* (2013.01)

(56) References Cited

FOREIGN PATENT DOCUMENTS

| | | |
|---|---|---|
| EP | 2 759 402 A1 | 7/2014 |
| EP | 2 853 634 A1 | 4/2015 |
| JP | 2008-308802 A | 12/2008 |
| JP | 2009-243010 A | 10/2009 |
| JP | 2014-034673 A | 2/2014 |
| JP | 2014-079938 A | 5/2014 |
| JP | 2014-141772 A | 8/2014 |
| JP | 2015-098526 A | 5/2015 |
| JP | 2016-037031 A | 3/2016 |
| JP | 2016-188353 A | 11/2016 |
| JP | 2016-211116 A | 12/2016 |
| JP | 2017-056715 A | 3/2017 |
| JP | 2017-66272 A | 4/2017 |
| JP | 2017-66273 A | 4/2017 |
| JP | 2017-66556 A | 4/2017 |
| JP | 2017-136814 A | 8/2017 |
| JP | 2018-048218 A | 3/2018 |
| JP | 2018-141249 A | 9/2018 |
| JP | 2018-154699 A | 10/2018 |
| JP | 6437679 B1 | 12/2018 |
| JP | 2019-1876 A | 1/2019 |
| JP | 2019-7101 A | 1/2019 |
| JP | 2019-007101 A | 1/2019 |
| JP | 6467536 B1 | 2/2019 |
| JP | 2019-35095 A | 3/2019 |
| JP | 2019-199671 A | 11/2019 |
| JP | 2020-19971 A | 2/2020 |
| JP | 2020-055975 A | 4/2020 |
| JP | 2020-62889 A | 4/2020 |
| JP | 2020-70342 A | 5/2020 |
| KR | 10-2018-0098636 A | 9/2018 |
| WO | 2013/176049 A1 | 11/2013 |
| WO | 2014/115560 A1 | 7/2014 |
| WO | 2014/192634 A1 | 12/2014 |
| WO | 2015/182438 A1 | 12/2015 |
| WO | 2016/175258 A1 | 11/2016 |
| WO | 2017/022830 A1 | 2/2017 |
| WO | 2017/111103 A1 | 6/2017 |
| WO | 2017/126432 A1 | 7/2017 |
| WO | 2017/150634 A1 | 9/2017 |
| WO | 2017/154568 A1 | 9/2017 |
| WO | 2018/110627 A1 | 6/2018 |
| WO | 2019/124364 A1 | 6/2019 |

OTHER PUBLICATIONS

Office Action issued Sep. 9, 2023 in Chinese Application No. 202180036590.1.
International Search Report dated Jul. 20, 2021 in International Application No. PCT/JP2021/019070.
International Preliminary Report on Patentability dated Nov. 17, 2022 with a Translation of the Written Opinion of the International Searching Authority in International Application No. PCT/JP2021/019070.
Japanese Office Action dated Jul. 21, 2020, in Japanese Application No. 2020-091108.
Japanese Office Action dated Oct. 27, 2020 in Japanese Application No. 2020-091108.
Japanese Decision of Refusal dated Mar. 9, 2021 in Japanese Application No. 2020-091108.
Japanese Office Action dated Jan. 5, 2021 in Japanese Application No. 2020-157147.
Japanese Office Action dated Jul. 6, 2021 in Japanese Application No. 2020-157147.
Japanese Office Action dated Nov. 30, 2021 in Japanese Application No. 2020-157147.
Written Opinion of the International Searching Authority dated Jul. 20, 2021 in Application No. PCT/JP2021/019070.
Office Action dated Jul. 2, 2024 in Japanese Application No. 2021-084170.
Office Action dated Jun. 18, 2024 in Chinese Application No. 202180036590.1.
Office Action issued Jan. 20, 2024 in Chinese Application No. 202180036590.1.
Office Action dated Mar. 14, 2023 from the Chinese Patent Office in Chinese Application No. 202180036590.1.
Extended European Search Report issued Apr. 18, 2024 in European Application No. 21808832.6.
Office Action issued Oct. 18, 2024 in Korean Patent Application No. 10-2022-7042197.
Office Action issued Dec. 17, 2024 in Japanese Application No. 2021-084169.
Communication issued Apr. 7, 2025 by the Korean Patent Office in Korean Application No. 10-2022-7042197.
Communication issued Apr. 30, 2025 in Japanese Application No. 2021-084169.
Tajima, "Development of Xanthated Cellulose Nanofiber", Journal of Japan Society of Textile Engineers, vol. 74, No. 2, 2020, pp. 108-112.
Fushimi, "Development of Highly Functionalized Transparent Sheet from Phosphorylated Cellulose Nanofiber", Journal of Japan Society of Textile Engineers, vol. 73, No. 2, 2019, pp. 101-104.
Office Action dated Oct. 28, 2025, issued in Japanese application No. 2024-211908.
Communication dated Dec. 17, 2025 issued by the Korean Patent Office in Korean application No. 10-2022-7042197.

* cited by examiner

[Figure 1]
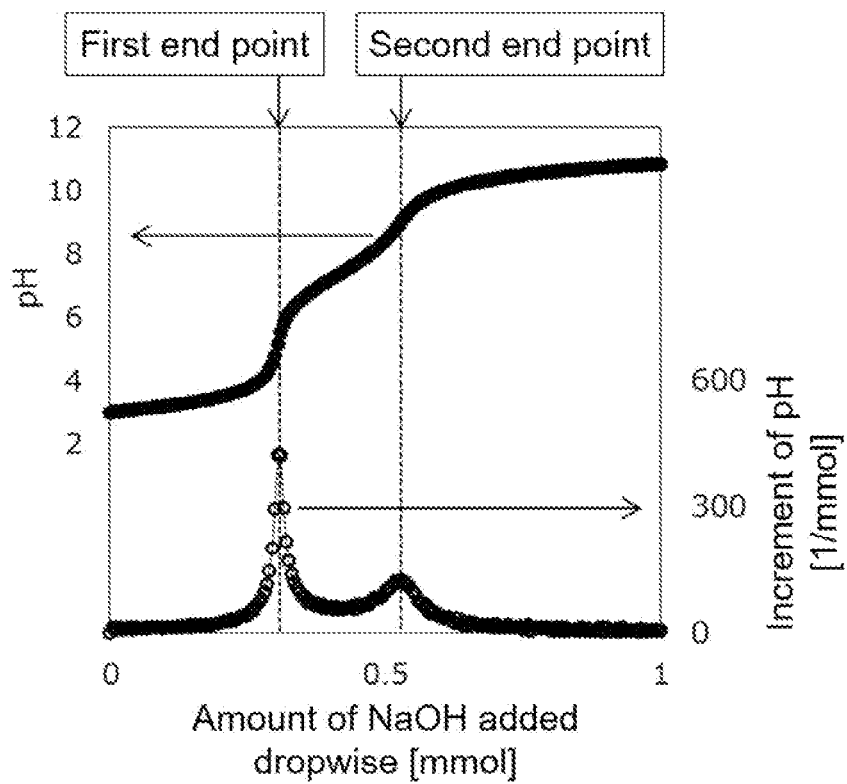
[Figure 2]
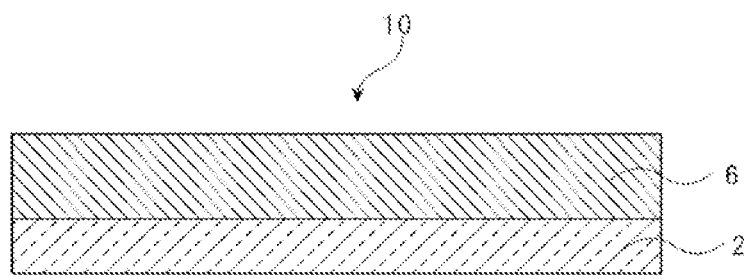

FINE FIBROUS CELLULOSE, DISPERSED SOLUTION, SHEET, LAMINATED SHEET, LAMINATE, AND METHOD FOR PRODUCING FINE FIBROUS CELLULOSE

CROSS REFERENCE TO RELATED APPLICATIONS

This application is a National Stage of International Application No. PCT/JP2021/019070 filed May 19, 2021, claiming priority based on Japanese Patent Application No. 2020-087680 filed May 19, 2020, Japanese Patent Application No. 2020-087681 filed May 19, 2020, Japanese Patent Application No. 2021-084169 filed May 18, 2021, and Japanese Patent Application No. 2021-084170 filed May 18, 2021.

TECHNICAL FIELD

The present invention relates to fine fibrous cellulose, a dispersed solution, a sheet, a laminated sheet, a laminate, and a method for producing fine fibrous cellulose.

BACKGROUND ART

In recent years, because of enhanced awareness of alternatives to petroleum resources and environmental consciousness, there has been a focus on materials utilizing reproducible natural fibers. Among natural fibers, fibrous cellulose having a fiber diameter of 10 μm or more and 50 μm or less, in particular, wood-derived fibrous cellulose (pulp) have been widely used mainly as paper products so far.

Fine fibrous cellulose, which have a fiber diameter of 1 μm or less, have also been known as fibrous cellulose. Such fine fibrous cellulose have attracted attention as novel materials, and the intended use thereof has been highly diversified. For example, the development of sheets, resin composites and thickeners, comprising the fine fibrous cellulose, has been promoted.

Fine fibrous cellulose can be produced by performing a defibration treatment on cellulose fibers. However, since cellulose fibers strongly bind to one another by hydrogen bonds, enormous energy is required to obtain fine fibrous cellulose only by simply performing a defibration treatment. Thus, it has been known that, in order to produce fine fibrous cellulose by smaller defibration treatment energy, it is effective to perform a pre-treatment such as a chemical treatment or a biological treatment, in addition to performing the defibration treatment.

For example, it has been known that, if ionic functional groups are introduced into cellulose fibers by performing a chemical treatment on the cellulose fibers, the cellulose fibers are easily fibrillated, and dispersion stability is also enhanced after completion of the fibrillation. On the other hand, there is also a case where a fluctuation in ionic strength or pH may occur in a system comprising cellulose fibers or a functional group-derived reaction may occur due to such a chemical treatment. As a result, problems such as deterioration or yellowing of cellulose fibers may occur in some cases.

Hence, studies have been conducted regarding dissociation of ionic functional group at any timing after fibrillation. For example, Patent Document 1 discloses a method for producing fine fibers, which comprises (a) a step of introducing substituent having electrostatic and/or steric functionality into an fine fiber raw material to obtain substituent-introduced fibers, (b) a step of mechanically treating the substituent-introduced fibers, and (c) a step of dissociating a part of or the entire introduced substituent from the substituent-introduced fine fibers obtained in the step (b), so as to obtain substituent-dissociated fine fibers. In addition, Patent Document 2 discloses a method for producing a de-esterified compound, which comprises a step of heating a compound having a phosphoric acid-derived ester and/or a carboxylic acid-derived ester in the presence of a nitrogen-containing compound exhibiting basicity. In these publications, dissociation of substituents introduced into fine fibers has been studied.

Patent Document 3 discloses a method for producing an fine fiber-containing sheet, which comprises, at least, (a) a step of introducing substituent having electrostatic and/or steric functionality into a fiber raw material to obtain substituent-introduced fibers, (b) a step of mechanically treating the substituent-introduced fibers obtained in the step (a) to obtain substituent-introduced fine fibers, (c) a step of preparing a sheet from the substituent-introduced fine fibers obtained in the step (b), and (d) a step of dissociating at least a part of the introduced substituent from the sheet obtained in the step (c). In this publication, a method of forming a sheet from fine fibers having substituent, and then dissociating the substituent from the sheet, has been studied.

Furthermore, Patent Documents 4 and 5 disclose a method for producing cellulose xanthate nanofibers, comprising subjecting cellulose xanthate or cation-substituted cellulose xanthate to a defibration treatment. In Patent Document 4, a method of subjecting cellulose xanthate nanofibers to a regeneration treatment, as necessary, so as to return the nanofibers to undenatured cellulose, has also been studied. In addition, Patent Document 5 discloses a derivative functional group-dissociated fine cellulose fiber-containing sheet having an average fiber diameter of 3 nm or more and 300 nm or less, wherein functional groups are dissociated from cellulose derivative fine fibers.

By the way, in recent years, the development of a composite comprising an fine fibrous cellulose-containing sheet and a resin layer has been promoted. Regarding such a composite, studies are conducted, for example, in order to enhance adhesiveness between the fine fibrous cellulose-containing sheet (fiber layer) and the resin layer. For example, Patent Document 6 discloses a laminate having a fiber layer comprising fine fibrous cellulose and a resin layer contacted with one surface of the fiber layer. Moreover, Patent Document 7 discloses a laminate comprising a fiber layer formed with fine fibrous cellulose, a resin layer, and an adhesive layer established between the fiber layer and the resin layer, whereas Patent Document 8 discloses a laminate, in which a base material, an anchor layer, and a cellulose nanofiber layer are established in this order.

PRIOR ART DOCUMENTS

Patent Documents

Patent Document 1: WO2013/176049
Patent Document 2: JP2015-098526 A
Patent Document 3: WO2015/182438
Patent Document 4: WO2017/111103
Patent Document 5: JP2019-7101 A
Patent Document 6: WO2017/126432
Patent Document 7: JP2017-056715 A
Patent Document 8: JP2014-079938 A

SUMMARY OF INVENTION

Object to be Solved by the Invention

The present inventors have conducted studies regarding fine fibrous cellulose from which substituents are removed, and as a result, the inventors have discovered that the removal of functional groups from fine fibrous cellulose that are in a slurry state after completion of fibrillation cause a reduction in transparency, and also that the removal of functional groups from fine fibrous cellulose that are in a sheet state may produce coloring.

Thus, in order to solve such prior art problems, the present inventors have conducted studies for the purpose of providing fine fibrous cellulose from which substituents are removed, which are able to enhance transparency and suppress coloring, when the fine fibrous cellulose is formed into a dispersed solution or a sheet. Moreover, the present invention is also intended to provide a laminated sheet having a fiber layer comprising fine fibrous cellulose and a resin layer, wherein the laminated sheet has high transparency and suppressed coloring.

Means for Solving the Object

Specifically, the present invention has the following configuration.

[1]
Fine fibrous cellulose, in which the amount of substituent introduced is less than 0.5 mmol/g and having a fiber width of 1 to 10 nm.

[2]
The fine fibrous cellulose according to [1], wherein the nanofiber yield calculated according to the following equation is 95% by mass or more:

Nanofiber yield [% by mass]=C/0.1×100, wherein

C represents the concentration of fine fibrous cellulose comprised in a supernatant that is obtained by centrifuging a water dispersion comprising 0.1% by mass of fine fibrous cellulose under conditions of 12000 G and 10 minutes.

[3]
The fine fibrous cellulose according to [1] or [2], wherein when the fine fibrous cellulose is formed into a water dispersion comprising 0.2% by mass of the fine fibrous cellulose, the haze of the water dispersion is 5.0% or less.

[4]
The fine fibrous cellulose according to any one of [1] to [3], wherein the substituent is anionic group.

[5]
The fine fibrous cellulose according to [4], wherein the anionic group is phosphorus oxoacid group, or substituent derived from the phosphorus oxoacid group.

[6]
The fine fibrous cellulose according to any one of [1] to [5], which have carbamide group.

[7]
A dispersed solution comprising the fine fibrous cellulose according to any one of [1] to [6].

[8]
A sheet comprising the fine fibrous cellulose according to any one of [1] to [6].

[9]
A laminated sheet comprising the sheet according to [8] and a resin layer.

[10]
A sheet comprising fine fibrous cellulose, in which the amount of substituent introduced is less than 0.5 mmol/g and having a fiber width of 1 to 10 nm, and the YI value at a thickness of 50 μm is 1.5 or less.

[11]
The sheet according to [10], wherein when the sheet is heated at 160° C. for 6 hours, the YI increase percentage calculated according to the following equation is 1500% or less:

YI increase percentage(%)=(yellowness index of sheet after heating−yellowness index of sheet before heating)/yellowness index of sheet before heating×100, wherein the yellowness index of the sheet is a yellowness index measured in accordance with JIS K 7373: 2006.

[12]
The sheet according to [10] or [11], wherein the total light transmittance is 90.0% or more.

[13]
The sheet according to any one of [10] to [12], wherein the haze is 5.0% or less.

[14]
The sheet according to any one of [10] to [13], wherein the surface roughness of at least one surface is 10 nm or less.

[15]
A laminated sheet having a fiber layer and a resin layer disposed on at least one surface of the fiber layer, wherein
the fiber layer comprises fibrous cellulose, in which the amount of substituent introduced is less than 0.5 mmol/g and having a fiber width of 1 to 10 nm.

[16]
The laminated sheet according to [15], wherein the thickness of the fiber layer is 20 μm or more.

[17]
The laminated sheet according to [15] or [16], wherein the density of the fiber layer is 1.0 g/cm$^3$ or more.

[18]
The laminated sheet according to any one of [15] to [17], wherein the resin layer is directly laminated on the fiber layer.

[19]
The laminated sheet according to any one of [15] to [18], wherein the resin layer comprises at least one type selected from a polycarbonate resin and an acrylic resin.

[20]
The laminated sheet according to any one of [15] to [19], wherein the resin layer further comprises an adhesion aid.

[21]
The laminated sheet according to [20], wherein the adhesion aid is at least one type selected from an isocyanate compound and an organic silicon compound.

[22]
The laminated sheet according to [20] or [21], wherein the adhesion aid is an isocyanate compound, and the content of the isocyanate compound is 10 parts by mass or more and 40 parts by mass or less with respect to 100 parts by mass of the resin comprised in the resin layer.

[23]
The laminated sheet according to any one of [15] to [22], wherein the YI value is 2.0 or less.

[24]
The laminated sheet according to any one of [15] to [23], wherein the haze is 2.0% or less.

[25]
The laminated sheet according to any one of [15] to [24], which is for use in optical members.

[26]
A laminate comprising the laminated sheet according to any one of [15] to [25] and an adherend.

[27]
A method for producing fine fibrous cellulose, comprising:
(A) removing at least a part of substituent from fine fibrous cellulose having the substituent with a fiber width of 1000 nm or less, and
(B) performing a uniform dispersion treatment on the fine fibrous cellulose after completion of the (A).

[28]
The method for producing fine fibrous cellulose according to [27], wherein the amount of substituent introduced into the fine fibrous cellulose to be subjected to the (A) is 0.60 mmol/g or more.

[29]
The method for producing fine fibrous cellulose according to [27] or [28], wherein the substituent is anionic group.

[30]
The method for producing fine fibrous cellulose according to [29], wherein the anionic group is phosphorus oxoacid group, or substituent derived from the phosphorus oxoacid group.

[31]
The method for producing fine fibrous cellulose according to any one of [27] to [30], wherein the fine fibrous cellulose to be subjected to the (A) have carbamide group.

[32]
The method for producing fine fibrous cellulose according to any one of [27] to [31], which further comprises:
reducing the amount of nitrogen.

[33]
The method for producing fine fibrous cellulose according to any one of [27] to [32], wherein the (A) is carried out on the fine fibrous cellulose that are in a slurry state.

[34]
The method for producing fine fibrous cellulose according to [33], which further comprises:
adjusting the pH of the slurry comprising the fine fibrous cellulose to 3 to 8, before the (A).

[35]
The fine fibrous cellulose according to any one of [1] to [6], which are for use in concrete pump primer.

[36]
The fine fibrous cellulose according to any one of [1] to [6], which are for use in lubricants.

[37]
The fine fibrous cellulose according to any one of [1] to [6], which are for use in mold molding compositions.

[38]
The fine fibrous cellulose according to any one of [1] to [6], which are for use in dental materials.

[39]
The fine fibrous cellulose according to any one of [1] to [6], which are for use in polishing agents.

[40]
The fine fibrous cellulose according to any one of [1] to [6], which are for use in release agents.

[41]
The fine fibrous cellulose according to any one of [1] to [6], which are for use in papermaking additives.

[42]
A concrete pump primer comprising the fine fibrous cellulose according to any one of [1] to [6].

[43]
A lubricant comprising the fine fibrous cellulose according to any one of [1] to [6].

[44]
A mold molding composition comprising the fine fibrous cellulose according to any one of [1] to [6].

[45]
A dental material comprising the fine fibrous cellulose according to any one of [1] to [6].

[46]
A polishing agent comprising the fine fibrous cellulose according to any one of [1] to [6].

[47]
A release agent comprising the fine fibrous cellulose according to any one of [1] to [6].

[48]
A papermaking additive comprising the fine fibrous cellulose according to any one of [1] to [6].

Advantageous Effects of Invention

According to the present invention, fine fibrous cellulose, which are able to enhance transparency and suppress coloring, when the fine fibrous cellulose is formed into a dispersed solution or a sheet, can be obtained. Moreover, according to the present invention, a laminated sheet having high transparency and suppressed coloring can be obtained.

BRIEF DESCRIPTION OF DRAWINGS

FIG. 1 is a graph showing the relationship between the amount of NaOH added dropwise to a fibrous cellulose-containing slurry having phosphorus oxoacid group and the pH.

FIG. 2 is a cross-sectional view showing the configuration of the laminated sheet of the present embodiment.

EMBODIMENTS OF CARRYING OUT THE INVENTION

The present invention will be described in detail below. The constitutive elements of the present invention given below may be described based on some typical embodiments or specific examples. However, the present invention should not be limited to such embodiments. In the present description, the numerical range expressed with the wording "a number to another number" means the range that falls between the former number indicating the lower limit value of the range and the latter number indicating the upper limit value thereof.

(Fine Fibrous Cellulose)

The present invention relates to fine fibrous cellulose, in which the amount of substituent introduced is less than 0.5 mmol/g and having a fiber width of 1 to 10 nm. In the present invention, by setting the introduced amount of substituent in the fine fibrous cellulose, after the removal of some substituent, to be less than 0.5 mmol/g, and further, by setting the fiber width of the fine fibrous cellulose to be 1 to 10 nm, when the fine fibrous cellulose is formed into a dispersed solution or a sheet, transparency can be enhanced and coloring can be suppressed. The transparency and the coloring degree of the fine fibrous cellulose that is formed into a dispersed solution or a sheet can be evaluated based on the haze or YI value of the dispersed solution or the sheet, as described later.

In the present embodiment, the amount of substituent introduced into the fine fibrous cellulose is less than 0.5 mmol/g, and it is preferably 0.4 mmol/g or less, more preferably 0.3 mmol/g or less, further preferably 0.25 mmol/g or less, and particularly preferably 0.15 mmol/g or less. The amount of substituents introduced into the fine fibrous cellulose is 0.0 mmol/g, and it is preferably 0.03 mmol/g or more, more preferably 0.04 mmol/g or more, further preferably 0.05 mmol/g or more, and particularly preferably 0.07 mmol/g or more.

The fiber width of the fine fibrous cellulose is 1 to 10 nm, and it is preferably 1 to 9 nm, more preferably 1 to 8 nm, and further preferably 1 to 7 nm. Herein, the fiber width of the fine fibrous cellulose is measured as follows, for example, by applying electron microscope observation. First, the fine fibrous cellulose are dispersed in water, so that the cellulose concentration becomes 0.01% by mass or more and 0.1% by mass or less, and the obtained water dispersion was casted onto a hydrophilized carbon grid film. After drying, it is stained with uranyl acetate, and is then observed under a transmission electron microscope (TEM; manufactured by JEOL; JEOL-2000EX). At that time, in the obtained image, any vertical or horizontal axis with the image width is created, and the magnification is then adjusted so that 20 or more fibers intersect against the axis. The observation image satisfying this condition is obtained, and with respect to this image, two longitudinal axes and two horizontal axes are arbitrarily drawn per image. The widths of the fibers intersecting the axes are visually read. Thus, 3 nonoverlapped observation images are photographed, and the values of the fiber widths of the fibers intersecting the two axes are thus read in each image (20 fibers or more×2×3=120 fibers or more).

(1) A single straight line X is drawn in any given portion in an observation image, and 20 or more fibers intersect with the straight line X.
(2) A straight line Y, which intersects perpendicularly with the aforementioned straight line in the same image as described above, is drawn, and 20 or more fibers intersect with the straight line Y.

With regard to a group of fine fibrous cellulose comprised in a dispersed solution, etc., the number average fiber width of the fine fibrous cellulose can be calculated from the fiber width obtained by the above-described method. In addition, when the fine fibrous cellulose are comprised in a sheet, the fiber width of the fine fibrous cellulose in the sheet is measured as follows, for example, by applying atomic force microscopy. First, a sheet comprising fine fibrous cellulose is observed by an atomic force microscope (manufactured by Veeco, NanoScope IIIa). At that time, an image is set to be a 500-nm viewing angle. With respect to the obtained image, two longitudinal axes and two horizontal axes are arbitrarily drawn per image. Twenty or more fibers intersecting the axes are arbitrarily selected, and the widths of the fibers are visually read. Thus, 3 nonoverlapped observation images are photographed, and the values of the fiber widths of the fibers intersecting the two axes are thus read in each image (20 fibers or more×2×3=120 fibers or more).

(1) A single straight line X is drawn in any given portion in an observation image, and 20 or more fibers intersecting with the straight line X are selected.
(2) A straight line Y, which intersects perpendicularly with the aforementioned straight line in the same image as described above, is drawn, and 20 or more fibers intersecting with the straight line Y are selected.

The fiber length of the fine fibrous cellulose is not particularly limited, and for example, it is preferably 0.1 μm or more and 1000 μm or less, more preferably 0.1 μm or more and 800 μm or less, and further preferably 0.1 μm or more and 600 μm or less. By setting the fiber length within the above-described range, destruction of the crystalline region of the fine fibrous cellulose can be suppressed. In addition, the viscosity of a slurry of the fine fibrous cellulose can also be set within an appropriate range. It is to be noted that the fiber length of the fine fibrous cellulose can be obtained by an image analysis using TEM, SEM or AFM.

The fine fibrous cellulose preferably have a type I crystal structure. Herein, the fact that the fine fibrous cellulose have a type I crystal structure may be identified by a diffraction profile obtained from a wide angle X-ray diffraction photograph using CuKα ($\lambda$=1.5418 Å) monochromatized with graphite. Specifically, it may be identified based on the fact that there are typical peaks at two positions near $2\theta$=14° or more and 17° or less, and near $2\theta$=22° or more and 23° or less. The percentage of the type I crystal structure occupied in the fine fibrous cellulose is, for example, preferably 30% or more, more preferably 40% or more, and further preferably 50% or more. The crystallinity can be obtained by measuring an X-ray diffraction profile and obtaining it according to a common method (Seagal et al., Textile Research Journal, Vol. 29, p. 786, 1959).

The aspect ratio (fiber length/fiber width) of the fine fibrous cellulose is not particularly limited, and for example, it is preferably 50 or more and 10000 or less, and more preferably 100 or more and 1000 or less. By setting the aspect ratio at the above-described lower limit value or more, it becomes easy to form a sheet comprising fine fibrous cellulose. By setting the aspect ratio at the above-described upper limit or less, when the fine fibrous cellulose are treated, for example, in the form of a dispersed solution, operations such as dilution are preferably easily handled.

The fine fibrous cellulose in the present embodiment have, for example, both a crystalline region and an amorphous region. The fine fibrous cellulose, which have both a crystalline region and an amorphous region, and also have an aspect ratio that is within the above-described range, are realized by the after-mentioned method for producing fine fibrous cellulose.

Cellulose components in the fine fibrous cellulose can be classified into α-cellulose components and hemicellulose components. A lower percentage of hemicellulose is preferable because the effect of suppressing yellowing over time or heat yellowing can be easily obtained. The percentage of hemicellulose in the fine fibrous cellulose of the present embodiment is preferably less than 30%, more preferably less than 25%, and further preferably less than 20%.

The total amount of nitrogen contained in the fine fibrous cellulose and free nitrogen contained in the fine fibrous cellulose-dispersed solution (hereinafter also referred to as "the nitrogen amount," "the nitrogen amount contained in the fine fibrous cellulose," or "the nitrogen amount in the fine fibrous cellulose") is preferably 0.08 mmol/g or less, more preferably 0.04 mmol/g or less, and further preferably 0.02 mmol/g or less. On the other hand, the nitrogen amount contained in the fine fibrous cellulose is preferably 0.001 mmol/g or more. The nitrogen amount in the fine fibrous cellulose is a value measured by the following method. First, a dispersed solution comprising the fine fibrous cellulose is adjusted to a solid concentration of 1% by mass, and is then decomposed by Kjeldahl method (JIS K 0102: 2016 44.1). After completion of the decomposition, the ammonium ion content (mmol) is measured by cation chromatography, and the obtained value is divided by the amount (g) of cellulose used in the measurement to calculate the nitrogen content (mmol/g). The above-described nitrogen amount is the total amount of nitrogen that binds to the fine fibrous cellulose via an ionic bond and/or a covalent bond, and free nitrogen dissolved in a dispersed solution, which does not bind to the fine fibrous cellulose via an ionic bond and/or a covalent bond.

In the present embodiment, the amount of substituent introduced into the fine fibrous cellulose is less than 0.5 mmol/g. The substituent used herein is preferably an anionic group. That is to say, the fine fibrous cellulose of the present embodiment are obtained by performing a substituent removal treatment on fine fibrous cellulose having anionic group, and thus, the fine fibrous cellulose of the present embodiment are substituent-removed fine fibrous cellulose.

Examples of the anionic group may include a phosphorus oxoacid group or a substituent derived from the phosphorus oxoacid group (hereinafter simply referred to as a "phosphorus oxoacid group" at times), a carboxy group or a substituent derived from the carboxy group (hereinafter simply referred to as a "carboxy group" at times), a sulfone group or a substituent derived from the sulfone group (hereinafter simply referred to as a "sulfone group" at times), and a xanthate group or a substituent derived from the xanthate group (hereinafter simply referred to as a "xanthate group" at times). When such a sulfone group or a substituent derived from the sulfone group is introduced via an ester bond, this substituent is also called a sulfur oxoacid group or a substituent derived from the sulfur oxoacid group (hereinafter simply referred to as a "sulfur oxoacid group" at times). Among these groups, the anionic group is preferably at least one type selected from among a phosphorus oxoacid group or a substituent derived from the phosphorus oxoacid group, and a sulfone group or a substituent derived from the sulfone group, and is more preferably a phosphorus oxoacid group or a substituent derived from the phosphorus oxoacid group.

The phosphorus oxoacid group or the substituent derived from the phosphorus oxoacid group is, for example, a substituent represented by the following formula (1). Into each fine fibrous cellulose, a plurality of substituents represented by the following formula (1) may be introduced. In this case, the plurality of introduced substituents represented by the following formula (1) may be either identical to or different from one another.

[Formula 1]

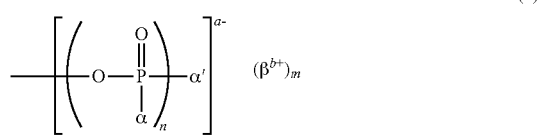

(1)

In the above Formula (1), a, b, and n each represent a natural number, and m represents any given number (provided that a=b×m); at least one of an "n" number of α and α' is O⁻, and the rest is either R or OR. Besides, all of such α and α' may also be O⁻. An "n" number of α may be all identical to one another, or may be different from one another. $\beta^{b+}$ is a mono- or more-valent cation consisting of an organic or inorganic matter.

R each represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an unsaturated cyclic hydrocarbon group, an aromatic group, or a derivative group thereof. In addition, in the formula (1), n is preferably 1.

Examples of the saturated straight chain hydrocarbon group may include a methyl group, an ethyl group, an n-propyl group, and an n-butyl group, but are not particularly limited thereto. Examples of the saturated branched chain hydrocarbon group may include an i-propyl group and a t-butyl group, but are not particularly limited thereto. Examples of the saturated cyclic hydrocarbon group may include a cyclopentyl group and a cyclohexyl group, but are not particularly limited thereto. Examples of the unsaturated straight chain hydrocarbon group may include a vinyl group and an allyl group, but are not particularly limited thereto. Examples of the unsaturated branched chain hydrocarbon group may include an i-propenyl group and a 3-butenyl group, but are not particularly limited thereto. Examples of the unsaturated cyclic hydrocarbon group may include a cyclopentenyl group and a cyclohexenyl group, but are not particularly limited thereto. Examples of the aromatic group may include a phenyl group and a naphthyl group, but are not particularly limited thereto.

Moreover, examples of the derivative group of the R may include functional groups such as a carboxy group, a carboxylate group (—COO⁻), a hydroxy group, an amino group and an ammonium group, in which at least one type selected from the aforementioned functional groups is added to or substituted with the main chain or side chain of the above-described various types of hydrocarbon groups, but are not particularly limited thereto. Furthermore, the number of carbon atoms constituting the main chain of the above-described R is not particularly limited, and it is preferably 20 or less, and more preferably 10 or less. By setting the number of carbon atoms constituting the main chain of the R within the above-described range, the molecular weight of phosphorus oxoacid groups can be adjusted in a suitable range, permeation thereof into a fiber raw material can be facilitated, and the yield of the fine fibrous cellulose can also be enhanced. Besides, when a plurality of R are present in the formula (1) or when multiple types of substituents represented by the formula (1) are introduced into the fine fibrous cellulose, the plurality of R may be either identical to or different from one another.

$\beta^{b+}$ is a mono- or more-valent cation consisting of an organic or inorganic matter. Examples of the mono- or more-valent cation consisting of an organic matter may include organic onium ions. Examples of the organic onium ions may include organic ammonium ions and organic onium ions. Examples of the organic ammonium ions may include aliphatic ammonium ions and aromatic ammonium ions. Examples of the organic onium ions may include aliphatic phosphonium ions and aromatic phosphonium ions. Examples of the mono- or more-valent cation consisting of an inorganic matter may include alkali metal ions such as sodium, potassium or lithium, divalent metal ions such as calcium or magnesium, hydrogen ions, and ammonium ions. Besides, when a plurality of $\beta^{b+}$ are present in the formula (1), or when multiple types of substituents represented by the formula (1) are introduced into the fine fibrous cellulose, the plurality of $\beta^{b+}$ may be either identical to or different from one another. As such mono- or more-valent cations consisting of an organic or inorganic matter, sodium or potassium ions, which hardly cause the yellowing of a fiber raw material containing $\beta^{b+}$ upon heating and are industrially easily applicable, are preferable, but are not particularly limited thereto.

Specific examples of the phosphorus oxoacid group or the substituent derived from the phosphorus oxoacid group may include a phosphoric acid group (—PO$_3$H$_2$), a salt of the phosphoric acid group, a phosphorus acid group (phosphonic acid group) (—PO$_2$H$_2$), and a salt of the phosphorus acid group (phosphonic acid group). Moreover, the phosphorus oxoacid group or the substituent derived from the phosphorus oxoacid group may also be a condensed phosphoric acid group (for example, a pyrophosphoric acid group), a condensed phosphonic acid group (for example, a polyphosphonic acid group), a phosphoric acid ester group (for example, a monomethyl phosphoric acid group, or a polyoxyethylene alkyl phosphoric acid group), an alkyl phosphonic acid group (for example, a methyl phosphonic acid group), or the like.

Furthermore, the sulfone group (the sulfone group or the substituent derived from the sulfone group) is preferably a sulfur oxoacid group (a sulfur oxoacid group or a substituent derived from the sulfur oxoacid group), and it is preferably a substituent represented by, for example, the following formula (2). Into each fine fibrous cellulose, a plurality of the substituent represented by the following formula (2) may be introduced. In this case, the plurality of introduced substituents represented by the following formula (2) may be either identical to or different from one another.

[Formula 2]

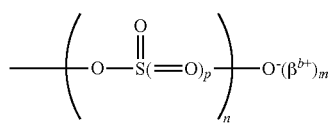

(2)

In the above structural formula, b and n each represent a natural number, p represents 0 or 1, and m represents any given number (provided that 1=b×m). When n is 2 or greater, a plurality of p may be identical numbers or may also be different numbers. In the above structural formula, $\beta^{b+}$ is a mono- or more-valent cation consisting of an organic or inorganic matter. Examples of the mono- or more-valent cation consisting of an organic matter may include organic onium ions. Examples of the organic onium ions may include organic ammonium ions and organic onium ions. Examples of the organic ammonium ions may include aliphatic ammonium ions and aromatic ammonium ions. Examples of the organic onium ions may include aliphatic phosphonium ions and aromatic phosphonium ions. Examples of the mono- or more-valent cation consisting of an inorganic matter may include alkali metal ions such as sodium, potassium or lithium, divalent metal ions such as calcium or magnesium, hydrogen ions, and ammonium ions. Besides, when multiple types of substituents represented by the above formula (2) are introduced into fine fibrous cellulose, a plurality of $\beta^{b+}$ may be either identical to or different from one another. As mono- or more-valent cations consisting of an organic or inorganic matter, sodium or potassium ions, which hardly cause the yellowing of a fiber raw material containing $\beta^{b+}$ upon heating and are industrially easily applicable, are preferable, but are not particularly limited thereto.

The amount of anionic group introduced into the fine fibrous cellulose can be measured, for example, by a neutralization titration method. According to the measurement by the neutralization titration method, while an alkali such as a sodium hydroxide aqueous solution is added to a slurry containing the obtained fine fibrous cellulose, a change in the pH is obtained, so that the introduced amount is measured.

FIG. 1 is a graph showing the relationship between the amount of NaOH added dropwise to a slurry containing fine fibrous cellulose having phosphorus oxoacid group and a pH value. The amount of phosphorus oxoacid group introduced into the fine fibrous cellulose is measured, for example, as follows.

First, a slurry containing the fine fibrous cellulose is treated with a strongly acidic ion exchange resin. Before the treatment with the strongly acidic ion exchange resin, the same defibration treatment as the after-mentioned defibration treatment step may be performed on the fine fibrous cellulose, as necessary.

Subsequently, while adding a sodium hydroxide aqueous solution, a change in the pH value is observed, and a titration curve as shown in the upper portion of FIG. 1 is obtained. In the titration curve shown in the upper portion of FIG. 1, a pH value measured with respect to the amount of alkali added is plotted. On the other hand, in the titration curve shown in the lower portion of FIG. 1, an increment (a derivative) (1/mmol) of the pH value with respect to the amount of alkali added is plotted. According to this neutralization titration, in a curve formed by plotting pH values measured with respect to the amount of alkali added, two points are confirmed, in which an increment (a derivative of pH with respect to the amount of alkali added dropwise) becomes maximum. Regarding these two points, a maximum point of an increment firstly obtained after addition of alkali is referred to as a first end point, whereas a maximum point of an increment subsequently obtained after addition of alkali is referred to as a second end point. The amount of alkali required from initiation of the titration until the first end point becomes equal to the first amount of dissociated acid in the fine fibrous cellulose comprised in the slurry used in the titration. The amount of alkali required from the first end point until the second end point becomes equal to the second amount of dissociated acid in the fine fibrous cellulose comprised in the slurry used in the titration. Furthermore, the amount of alkali required from initiation of the titration until the second end point becomes equal to the total amount of dissociated acid in the slurry used in the titration. Further, the value obtained by dividing the amount of alkali required from initiation of the titration until the first end point by a solid content (g) in the slurry to be titrated becomes the amount of phosphorus oxoacid groups introduced (mmol/g). Besides, the simple term "the amount of the phosphorus oxoacid groups introduced (or the amount of the phosphorus oxoacid groups)" refers to the first amount of dissociated acid.

In FIG. 1, the region ranging from initiation of the titration until the first end point is referred to as a first region, and the region ranging from the first end point until the second end point is referred to as a second region. For example, when the phosphorus oxoacid groups are phosphoric acid groups causing condensation, the amount of weakly acidic groups in the phosphorus oxoacid groups (which is also referred to as a "second amount of dissociated acid" in the present description) is apparently reduced, so that the amount of the alkali required for the second region is decreased as compared with the amount of the alkali required for the first region. Meanwhile, the amount of strongly acidic groups in the phosphorus oxoacid groups (which is also referred to as a "first amount of dissociated acid" in the present description) corresponds to the amount of phosphorus atoms, regardless of the presence or absence of condensation. On the other hand, when the phosphorus oxoacid groups are phosphorous acid groups, since weakly acidic groups are not present in the phosphorus oxoacid groups, the amount of the alkali required for the second region may be decreased, or the amount of the alkali required for the second region may become zero in some cases. In such a case, in the titration curve, there is only one point in which an increment of the pH value becomes maximum.

With regard to the aforementioned amount (mmol/g) of phosphorus oxoacid group introduced, the denominator indicates the mass of acid-type fine fibrous cellulose. Thus, the amount (mmol/g) of phosphorus oxoacid group introduced indicates the amount of phosphorus oxoacid group possessed by the acid-type fine fibrous cellulose (hereinafter referred to as "the amount of phosphorus oxoacid groups (acid type)"). On the other hand, when the counterions of phosphorus oxoacid groups are substituted with any given cations C to achieve charge equivalent, the denominator is converted to the mass of fine fibrous cellulose in which the cations C are counterions, so that the amount of phosphorus oxoacid groups possessed by the fine fibrous cellulose in which the cations C are counterions (hereinafter referred to as "the amount of phosphorus oxoacid groups (C type)") can be obtained.

Specifically, the amount of phosphorus oxoacid groups (C type) is calculated according to the following equation:

Amount of phosphorus oxoacid groups (C type)= amount of phosphorus oxoacid groups (acid type)/$\{1+(W-1)\times A/1000\}$.

In the above equation,

A [mmol/g] indicates the total anion amount derived from phosphorus oxoacid groups possessed by fine fibrous cellulose (total dissociated acid amount of phosphorus oxoacid groups), and W indicates formula weight per valence of the cations C (for example, Na: 23; and Al: 9).

In the measurement of the amount of anionic groups according to the titration method, when the amount of a single droplet of a sodium hydroxide aqueous solution added dropwise is too large, or when the titration interval is too short, the amount of anionic groups may be measured to be lower than the actual value and thus, a precise value may not be obtained in some cases. With regard to an appropriate amount of a sodium hydroxide aqueous solution added dropwise and a titration interval, it is desired that, for example, a 0.1 N sodium hydroxide aqueous solution is titrated in each amount of 10 to 50 µL for 5 to 30 seconds. Moreover, in order to eliminate the influence of carbon dioxide dissolved in an fine fibrous cellulose-containing slurry, it is desired that, for example, the measurement is carried out, while inert gas such as nitrogen gas is blown into the slurry from 15 minutes before initiation of the titration until termination of the titration.

On the other hand, the amount of sulfone groups introduced into fine fibrous cellulose can be calculated by freeze-drying a slurry containing fine fibrous cellulose, and further measuring the amount of sulfur in a pulverized sample. Specifically, a slurry containing fine fibrous cellulose is freeze-dried and is further pulverized, and the thus obtained sample is subjected to pressurized heat decomposition using nitric acid in a hermetically sealed container. Thereafter, the resulting sample is diluted, as appropriate, and the amount of sulfur is then measured by ICP-OES. The value calculated by dividing the measured value by the absolute dry mass of the tested fine fibrous cellulose is defined to be the amount of sulfone groups (unit: mmol/g) in the fine fibrous cellulose.

The amount of xanthate groups introduced into fine fibrous cellulose can be measured by the following method according to Bredee method. First, 40 mL of a saturated ammonium chloride solution is added to 1.5 parts by mass (absolute dry mass) of fine fibrous cellulose, and they are fully mixed with each other, while crushing the sample with a glass rod. Thereafter, the sample is left for about 15 minutes, and is then filtrated with a GFP filter (GS-25 manufactured by ADVANTEC), and the resultant is fully washed with a saturated ammonium chloride solution. Subsequently, the sample, together with the GFP filter, is placed in a 500-mL tall beaker, and 50 mL of a 0.5 M sodium hydroxide solution (5° C.) is added thereto, followed by stirring. The obtained mixture is left for 15 minutes. Thereafter, a phenolphthalein solution is added to the reaction mixture until the solution becomes pink, and 1.5 M acetic acid is then added thereto. The time point at which the pink solution is converted to a colorless solution is defined to be a neutralization point. After neutralization, 250 mL of distilled water is added to the solution, and the mixture is then fully stirred. Thereafter, 10 mL of 1.5 M acetic acid and 10 mL of a 0.05 mol/L iodine solution are added to the reaction mixture, using a Volumetric pipette. After that, the thus obtained solution is titrated with a 0.05 mol/L sodium thiosulfate solution, and then, using the amount of sodium thiosulfate titrated and the absolute dry mass of fine fibrous cellulose, the amount of xanthate groups is calculated according to the following equation:

Amount (mmol/g) of xanthate groups=(0.05×10×2−0.05×amount (mL) of sodium thiosulfate titrated)/1000/absolute dry mass (g) of fine fibrous cellulose.

In the present embodiment, the fine fibrous cellulose preferably have carbamide groups. In the present description, the carbamide group is a group represented by the following structural formula.

[Formula 3]

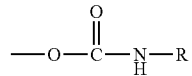

In the above structural formula, R represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof. Among others, R is particularly preferably a hydrogen atom.

The amount of carbamide groups introduced into fine fibrous cellulose is preferably 0.001 mmol/g or more. On the other hand, the amount of carbamide groups introduced into fine fibrous cellulose is preferably 0.08 mmol/g or less, more preferably 0.04 mmol/g or less, and further preferably 0.02 mmol/g or less. Herein, the amount of carbamide groups introduced into fine fibrous cellulose can be calculated by freeze-drying a slurry containing fine fibrous cellulose and further subjecting a pulverized sample to a trace nitrogen analysis. The amount of carbamide groups introduced (mmol/g) per unit mass of the fine fibrous cellulose can be calculated by dividing the content of nitrogen (g/g) per unit mass of the fine fibrous cellulose obtained by the trace nitrogen analysis, by the atomic weight of nitrogen.

In the present embodiment, when a water dispersion comprising 0.1% by mass of fine fibrous cellulose is prepared and a nanofiber yield is then calculated according to the following equation, the nanofiber yield is preferably 95% by mass or more, and more preferably 96% by mass or more. Besides, the nanofiber yield may also be 100% by mass.

Nanofiber yield [% by mass]=$C$/0.1×100

In the above equation, $C$ represents the concentration of fine fibrous cellulose comprised in a supernatant that is obtained by centrifuging a water dispersion comprising 0.1% by mass of fine fibrous cellulose under conditions of 12000 G and 10 minutes.

In addition, in the present embodiment, when a water dispersion comprising 0.2% by mass of fine fibrous cellulose is prepared, the haze of the water dispersion is preferably 5.0% or less, more preferably 4.0% or less, and further preferably 3.0% or less. Besides, the haze of the water dispersion may also be 0%. When the haze of a water dispersion comprising 0.2% by mass of fine fibrous cellulose is within the above-described range, the dispersed solution can be determined to be transparent. Herein, the haze of the water dispersion is a value measured in accordance with JIS K 7136: 2000, using a hazemeter and a liquid glass cell having an optical path length of 1 cm. Besides, the zero point is measured with ion exchange water which is placed in the same glass cell. Before the measurement, the dispersed solution as a measurement target is left at rest under the environment of 23° C. and a relative humidity of 50% for 24 hours, so that the liquid temperature of the dispersed solution is set to be 23° C.

(Method for Producing Fine Fibrous Cellulose)

The present invention relates to a method for producing fine fibrous cellulose. The method for producing fine fibrous cellulose of the present invention comprises a step (A) of removing at least a part of substituents from fine fibrous cellulose with a fiber width of 1000 nm or less having the substituents, and a step (B) of performing a uniform dispersion treatment on the resulting fine fibrous cellulose after completion of the step (A). Herein, the substituents possessed by the fine fibrous cellulose to be subjected to the step (A) are preferably anionic groups, and are more preferably phosphorus oxoacid groups or substituents derived from the phosphorus oxoacid groups. Furthermore, the fine fibrous cellulose to be subjected to the step (A) preferably have carbamide groups.

(Step (A))

Step (A) is a step of removing at least a part of substituents from fine fibrous cellulose with a fiber width of 1000 nm or less having the substituents. Hereafter, a method for producing fine fibrous cellulose with a fiber width of 1000 nm or less having substituents (i.e. the fine fibrous cellulose to be subjected to the step (A)) will be first described.

<Fiber Raw Material

The fine fibrous cellulose to be subjected to the step (A) are produced from a fiber raw material comprising cellulose. Such a fiber raw material comprising cellulose is not particularly limited, and a pulp is preferably used from the viewpoint of availability and inexpensiveness. Examples of the pulp may include wood pulp, non-wood pulp, and deinked pulp. Examples of the wood pulp may include, but are not particularly limited to, chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP); semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp may include, but not particularly limited to, cotton pulps such as cotton linter and cotton lint; and non-wood type pulps such as hemp, wheat straw, and bagasse. An example of a deinked pulp may be, but is not particularly limited to, a deinked pulp using waste paper as a raw material. The pulp of the present embodiment may be used alone as a single type, or in combination of two or more types. Among the above-listed pulps, for example, wood pulp and deinked pulp are preferable from the viewpoint of easy availability. Moreover, among the wood pulps, for example, a chemical pulp is more preferable, and a kraft pulp, a sulfite pulp, and a dissolving pulp are further preferable, from the viewpoint that it has a higher cellulose content ratio so as to enhance the yield of fine fibrous cellulose upon the defibration treatment, and that decomposition of cellulose in the pulp is mild, so that fine fibrous cellulose having a long fiber length with a high aspect ratio can be obtained. Besides, if the fine fibrous cellulose having a long fiber length with a high aspect ratio are used, the viscosity tends to become high.

As a fiber raw material comprising cellulose, for example, cellulose comprised in Ascidiacea, or bacterial cellulose generated by acetic acid bacteria can also be utilized. In addition fibers formed from straight-chain nitrogen-containing polysaccharide polymers such as chitin and chitosan can also be used, instead of a fiber raw material containing cellulose.

<Phosphorus Oxoacid Group Introduction Step>

The fine fibrous cellulose to be subjected to the step (A) have substituents. Thus, the step of producing the fine fibrous cellulose to be subjected to the step (A) preferably has a substituent introduction step, and more preferably has an anionic group introduction step. The anionic group introduction step may be, for example, a phosphorus oxoacid group introduction step. The phosphorus oxoacid group introduction step is a step of allowing at least one type of compound (hereinafter also referred to as "Compound A") selected from compounds capable of reacting with hydroxyl groups possessed by a fiber raw material comprising cellulose and thereby introducing phosphorus oxoacid groups into the fiber raw material to act on the fiber raw material comprising cellulose. By this step, phosphorus oxoacid group-introduced fibers can be obtained.

In the phosphorus oxoacid group introduction step according to the present embodiment, the reaction of the fiber raw material comprising cellulose with Compound A is preferably carried out in the presence of at least one type selected from urea and a derivative thereof (hereinafter also referred to as "Compound B").

One example of the method of allowing Compound A to act on the fiber raw material in the presence of Compound B may include a method of mixing Compound A and Compound B into the fiber raw material that is in a dry or wet state, or in a slurry state. Among the fiber raw materials in these states, because of the high uniformity of the reaction, the fiber raw material that is in a dry or wet state is preferably used, and the fiber raw material in a dry state is particularly preferably used. The shape of the fiber raw material is not particularly limited, and for example, a cotton-like or thin sheet-like fiber raw material is preferable. Compound A and Compound B may be added to the fiber raw material by the method of adding Compound A and Compound B that are dissolved in a solvent to form a solution, or are melted by being heated to a melting point or higher. Among these, because of the high uniformity of the reaction, the compounds are preferably added to the fiber raw material, in the form of a solution obtained by dissolution thereof in a solvent, or in particular, in the form of an aqueous solution. Moreover, Compound A and Compound B may be simultaneously added, or may also be added, separately. Alternatively, Compound A and Compound B may be added in the form of a mixture thereof. The method of adding Compound A and Compound B is not particularly limited, and in a case where Compound A and Compound B are in the form of a solution, the fiber raw material may be immersed in the solution for liquid absorption, and may be then removed therefrom, or the solution may also be added dropwise onto the fiber raw material. Otherwise, Compound A and Compound B in necessary amounts may be added to the fiber raw material, or Compound A and Compound B in excessive amounts may be added to the fiber raw material and then, may be squeezed or filtrated to remove redundant Compound A and Compound B.

Compound A used in the present embodiment is a compound having phosphorus atoms and being capable of forming an ester bond with cellulose. Examples of such Compound A may include phosphoric acid or a salt thereof, phosphorous acid or a salt thereof, dehydrated condensed phosphoric acid or a salt thereof, and phosphoric anhydride (diphosphorus pentoxide), but are not particularly limited thereto. As such phosphoric acid, those having various purities can be used, and for example, 100% phosphoric acid (orthophosphoric acid) or 85% phosphoric acid can be used. Phosphorous acid may be 99% phosphorus acid (phosphonic acid). Dehydrated condensed phosphoric acid is phosphoric acid that is condensed by two or more molecules according to a dehydration reaction, and examples of such dehydrated condensed phosphoric acid may include pyrophosphoric acid and polyphosphoric acid. Examples of the phosphate, phosphite, and dehydrated condensed phosphate may include lithium salts, sodium salts, potassium salts, and ammonium salts of phosphoric acid, phosphorus acid, or dehydrated condensed phosphoric acid, and these salts may have various neutralization degrees. Among these, from the viewpoints of high efficiency in introduction of the phosphoric acid groups, an improving tendency of the defibration efficiency in a defibration step described below, low costs, and industrial applicability, phosphoric acid, sodium salts of phosphoric acid, potassium salts of phosphoric acid or ammonium salts of phosphoric acid, or phosphorous acid, sodium salts of phosphorous acid, potassium salts of phosphorous acid, or ammonium salts of phosphorous acid are preferable; and phosphoric acid, sodium dihydrogen phosphate, disodium hydrogen phosphate, ammonium dihydrogen phosphate, phosphorous acid, or sodium phosphite is more preferable.

The amount of Compound A added to the fiber raw material is not particularly limited, and for example, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and further preferably 2% by mass or more and 30% by mass or less. By setting the amount of phosphorus atoms added to the fiber raw material within the above-described range, the yield of the fine fibrous cellulose can be further improved. On the other hand, by setting the amount of phosphorus atoms added to the fiber raw material to the above-described upper limit value or less, the balance between the effect of improving the yield and costs can be kept.

Compound B used in the present embodiment is at least one type selected from urea and a derivative thereof, as described above. Examples of Compound B may include urea, biuret, 1-phenyl urea, 1-benzyl urea, 1-methyl urea, and 1-ethyl urea. From the viewpoint of the improvement of the uniformity of the reaction, Compound B is preferably used in the form of an aqueous solution. Moreover, from the viewpoint of the further improvement of the uniformity of the reaction, an aqueous solution, in which both Compound A and Compound B are dissolved, is preferably used.

The amount of Compound B added to the fiber raw material (absolute dry mass) is not particularly limited, and for example, it is preferably 1% by mass or more and 500% by mass or less, more preferably 10% by mass or more and 400% by mass or less, and further preferably 100% by mass or more and 350% by mass or less.

In the reaction of the fiber raw material comprising cellulose with Compound A, for example, amides or amines, as well as Compound B, may be comprised in the reaction system. Examples of the amides may include formamide, dimethylformamide, acetamide, and dimethylacetamide. Examples of the amines may include methylamine, ethylamine, trimethylamine, triethylamine, monoethanolamine, diethanolamine, triethanolamine, pyridine, ethylenediamine, and hexamethylenediamine. Among these, particularly, triethylamine is known to work as a favorable reaction catalyst.

In the phosphorus oxoacid group introduction step, after Compound A and Compound B are added or mixed into the fiber raw material, a heat treatment is preferably performed on the fiber raw material. As a temperature for such a heat treatment, it is preferable to select a temperature that enables an efficient introduction of phosphorus oxoacid groups, while suppressing the thermal decomposition or hydrolysis reaction of fibers. For example, the heat treatment temperature is preferably 50° C. or higher and 300° C. or lower, more preferably 100° C. or higher and 250° C. or lower, and further preferably 130° C. or higher and 200° C. or lower. In addition, apparatuses having various heating media can be utilized in the heat treatment, and examples of such an apparatus that can be used herein may include a hot-air drying device, a stirring drying device, a rotary drying device, a disk drying device, a roll-type heating device, a plate-type heating device, a fluidized bed drying device, a band-type drying device, a filtration drying device, a vibrating fluidized drying device, an airborne drying device, a vacuum drying device, an infrared heating device, a far-infrared heating device, a microwave heating device, and a high frequency drying device.

In the heat treatment according to the present embodiment, a method comprising adding Compound A to a thin sheet-like fiber raw material by impregnation or the like, and then heating the fiber raw material, or a method comprising heating a fiber raw material, while kneading or stirring the fiber raw material and Compound A using a kneader or the like, can be adopted. Thereby, the unevenness in the concentration of the Compound A in the fiber raw material can be suppressed, and phosphorus oxoacid groups can be more uniformly introduced into the surface of cellulose fibers comprised in the fiber raw material. This is considered because, when water molecules move to the surface of the fiber raw material as drying advances, Compound A dissolved therein is attracted to the water molecules due to surface tension and as a result, Compound A also moves to the surface of the fiber raw material (specifically, the unevenness in the concentration of the Compound A occurs), and because such a phenomenon can be suppressed by adopting the aforementioned method.

As a heating device used for the heat treatment, for example, a device capable of always discharging moisture retained by slurry or moisture generated by the dehydration condensation (phosphoric acid esterification) reaction of Compound A with hydroxyl groups, etc. comprised in cellulose or the like in the fiber raw material, to the outside of the device system, is preferable. Such a heating device may be, for example, a ventilation-type oven. By always discharging moisture from the device system, in addition to being able to suppress a hydrolysis reaction of phosphoric acid ester bonds, which is a reverse reaction of the phosphoric acid esterification, the acid hydrolysis of sugar chains in the fibers may also be suppressed. Thus, it becomes possible to obtain fine fibrous cellulose with a high axial ratio.

The time for the heat treatment is for example preferably 1 second or more and 300 minutes or less, more preferably 1 second or more and 1000 seconds or less, and further preferably 10 seconds or more and 800 seconds or less, after moisture has been substantially removed from the fiber raw material. In the present embodiment, by setting the heating temperature and the heating time within an appropriate range, the amount of phosphorus oxoacid groups introduced can be set within a preferred range.

The phosphorus oxoacid group introduction step may be performed at least once, but may also be repeated two or more times. By performing the phosphorus oxoacid group introduction step two or more times, many phosphorus oxoacid groups can be introduced into the fiber raw material.

The amount of phosphorus oxoacid groups introduced per g (mass) of the fiber raw material in the phosphorus oxoacid group introduction step is preferably 0.60 mmol/g or more, more preferably 0.70 mmol/g or more, further preferably 0.80 mmol/g or more, still further preferably 1.00 mmol/g or more, and particularly preferably 1.20 mmol/g or more. On the other hand, the amount of phosphorus oxoacid groups introduced is, for example, per g (mass) of the fiber raw material, preferably 5.20 mmol/g or less, more preferably 3.65 mmol/g or less, and further preferably 3.00 mmol/g or less. Besides, the amount of phosphorus oxoacid groups introduced in the phosphorus oxoacid group introduction step that is within the above-described range means that the amount of substituents introduced in the fine fibrous cellulose to be subjected to the step (A) is within the above-described range. By setting the amount of phosphorus oxoacid groups introduced within the above-described range, the amount of substituents introduced in the fine fibrous cellulose to be subjected to the step (A) can be adjusted within the above-described range, and as a result, it becomes easy to produce fine fibrous cellulose having a final fiber width of 10 nm or less. In addition, the transparency of a dispersed solution or a sheet comprising the fine fibrous cellulose can be more effectively enhanced.

<Sulfone Group (Sulfur Oxoacid Group) Introduction Step>

The step of producing the fine fibrous cellulose to be subjected to the step (A) may comprise a sulfone group introduction step as an anionic group introduction step. In the sulfone group introduction step, hydroxyl groups possessed by a fiber raw material comprising cellulose react with sulfonic acid, so that cellulose fibers having sulfone groups (sulfone group-introduced fibers) can be obtained.

In the sulfone group introduction step, instead of Compound A used in the aforementioned <Phosphorus oxoacid group introduction step>, at least one type of compound selected from among compounds capable of introducing sulfone groups by reacting with hydroxyl groups possessed by a fiber raw material comprising cellulose is used (hereinafter also referred to as "Compound C"). Compound C is a compound having sulfur atoms and being capable of forming an ester bond with cellulose. Examples of such Compound C may include sulfuric acid or a salt thereof, sulfurous acid or a salt thereof, and amide sulfate, but are not particularly limited thereto. As such sulfuric acid, those having various purities can be used, and for example, 96% sulfuric acid (concentrated sulfuric acid) can be used. Sulfurous acid may be 5% sulfurous acid solution. Examples of sulfate or sulfite may include lithium salts, sodium salts, potassium salts, and ammonium salts of sulfate or sulfide, and these salts may have various neutralization degrees. As amide sulfate, sulfamic acid or the like can be used. In the sulfone group introduction step, the same Compound B as that used in the aforementioned <phosphorus oxoacid group introduction step> is preferably used.

In the sulfone group introduction step, it is preferable that sulfonic acid and an aqueous solution containing urea and/or a urea derivative are mixed into a cellulose raw material, and that a heat treatment is then performed on the cellulose raw material. As a temperature for such a heat treatment, it is preferable to select a temperature that enables an efficient introduction of sulfone groups, while suppressing the thermal decomposition or hydrolysis reaction of fibers. The heat treatment temperature is preferably 100° C. or higher, more preferably 120° C. or higher, and further preferably 150° C. or higher. On the other hand, the heat treatment temperature is preferably 300° C. or lower, more preferably 250° C. or lower, and further preferably 200° C. or lower.

In the heat treatment step, heating is preferably performed until a water content is substantially lost. Thus, the time for the heat treatment is fluctuated depending on the water content in the cellulose raw material and the additive amounts of the sulfonic acid and the aqueous solution containing urea and/or a urea derivative. For example, the heat treatment time is preferably set to be 10 seconds or more and 10000 seconds or less. For the heat treatment, apparatuses having various heating media can be utilized, and examples of such an apparatus that can be used herein may include a hot-air drying device, a stirring drying device, a rotary drying device, a disk drying device, a roll-type heating device, a plate-type heating device, a fluidized bed drying device, a band-type drying device, a filtration drying device, a vibrating fluidized drying device, an airborne drying device, a vacuum drying device, an infrared heating device, a far-infrared heating device, a microwave heating device, and a high frequency drying device.

The amount of sulfone groups introduced per g (mass) of the fiber raw material in the sulfone group introduction step is preferably 0.60 mmol/g or more, more preferably 0.70 mmol/g or more, further preferably 0.80 mmol/g or more, still further preferably 1.00 mmol/g or more, and particularly preferably 1.20 mmol/g or more. On the other hand, the amount of sulfone groups introduced is, for example, per g (mass) of the fiber raw material, preferably 5.00 mmol/g or less, and more preferably 3.00 mmol/g or less. Besides, the amount of sulfone groups introduced in the sulfone group introduction step that is within the above-described range means that the amount of substituents introduced in the fine fibrous cellulose to be subjected to the step (A) is within the above-described range. By setting the amount of sulfone groups introduced within the above-described range, the amount of substituents introduced in the fine fibrous cellulose to be subjected to the step (A) can be adjusted within the above-described range, and as a result, it becomes easy to produce fine fibrous cellulose having a fiber width of 10 nm or less. In addition, the transparency of a dispersed solution or a sheet comprising the fine fibrous cellulose can be more effectively enhanced.

<Xanthate Group Introduction Step>

The step of producing the fine fibrous cellulose to be subjected to the step (A) may comprise a xanthate group introduction step as an anionic group introduction step. In the xanthate group introduction step, hydroxyl groups possessed by a fiber raw material comprising cellulose are substituted with xanthate groups represented by the following formula (2), so that cellulose fibers having xanthate groups (xanthate group-introduced fibers) can be obtained.

$$OCSS^-M^+ \qquad (2)$$

In the above formula (2), $M^+$ represents at least one type selected from among a hydrogen ion, a monovalent metal ion, an ammonium ions, and an aliphatic or aromatic ammonium ion.

In the xanthate group introduction step, first, an alkali treatment is performed to treat the above-described fiber raw material comprising cellulose with an alkali solution, so as to obtain alkali cellulose. Examples of the alkaline solution may include an alkali metal hydroxide aqueous solution and an alkaline-earth metal hydroxide aqueous solution. Among others, the alkaline solution is preferably an alkali metal hydroxide aqueous solution such as sodium hydroxide or potassium hydroxide, and is particularly preferably a sodium hydroxide aqueous solution. When the alkaline solution is an alkali metal hydroxide aqueous solution, the concentration of alkali metal hydroxide in the alkali metal hydroxide aqueous solution is preferably 4% by mass or more, and more preferably 5% by mass or more. On the other hand, the concentration of alkali metal hydroxide in the alkali metal hydroxide aqueous solution is preferably 9% by mass or less. By setting the alkali metal hydroxide concentration to be the above-described lower limit value or more, mercerization of cellulose can be sufficiently promoted, and the amount of by-products generated upon the subsequent xanthation can be reduced, and as a result, the yield of xanthate group-introduced fibers can be enhanced. Thereby, the after-mentioned defibration treatment can be more effectively carried out. On the other hand, by setting the alkali metal hydroxide concentration to be the above-described upper limit value or less, permeation of the alkali metal hydroxide aqueous solution into the crystal region of cellulose can be suppressed, while promoting mercerization. As a result, the cellulose type I crystal structure is easily maintained, and the yield of the fine fibrous cellulose can be further enhanced.

The time for the above-described alkali treatment is preferably 30 minutes or more, and more preferably 1 hour or more. On the other hand, the alkali treatment time is preferably 6 hours or less, and more preferably 5 hours or less. By setting the alkali treatment time within the above-described range, a final yield can be enhanced, and productivity can be thereby enhanced.

It is preferable that the alkali cellulose obtained in the above-described alkali treatment is then subjected to solid-liquid separation to remove the aqueous solution as much as possible. Thereby, the water content can be reduced upon the subsequent xanthation treatment, so that the reaction can be promoted. As such a solid-liquid separation method, common dehydration methods such as, for example, centrifugation or filtration, can be used. Besides, the concentration of the alkali metal hydroxide contained in the alkali cellulose after completion of the solid-liquid separation is preferably 3% by mass or more and 8% by mass or less, with respect to the total mass of the alkali cellulose after completion of the solid-liquid separation.

In the xanthate group introduction step, a xanthation treatment step is carried out after completion of the alkali treatment. In the xanthation treatment step, carbon disulfide ($CS_2$) is reacted with alkali cellulose to convert the ($-O^-Na^+$) groups to ($-OCSS^-Na^+$) groups, thereby obtaining xanthate group-introduced fibers. Besides, in the above description, metal ions introduced into the alkali cellulose are representatively described as Nat, but the same reaction as described above progresses even using other alkali metal ions.

In the xanthation treatment, 10% by mass or more of carbon disulfide is preferably supplied with respect to the absolute dry mass of cellulose in the alkali cellulose. In addition, in the xanthation treatment, the period of time, in which the carbon disulfide is allowed to come into contact with the alkali cellulose, is preferably 30 minutes or more, and more preferably 1 hour or more. By allowing the carbon disulfide to come into contact with the alkali cellulose, xanthation promptly progresses. However, since it takes a considerable period of time for the carbon disulfide to permeate into the alkali cellulose, the reaction time is preferably set within the above-described range. On the other hand, the period of time, in which the carbon disulfide is allowed to come into contact with the alkali cellulose, is 6 hours or less, and thereby, permeation of the carbon disulfide is sufficiently carried out even into a mass of alkali cellulose after completion of the dehydration, and reactive xanthation can be almost completed.

The reaction temperature in the xanthation treatment is preferably 46° C. or lower. By setting the reaction temperature within the above-described range, decomposition of the alkali cellulose is easily suppressed. In addition, by setting the reaction temperature within the above-described range, since a uniform reaction is easily carried out, generation of by-products can be suppressed, and further, the removal of the generated xanthate groups can also be suppressed.

The amount of xanthate groups introduced per g (mass) of the fiber raw material in the xanthate group introduction step is preferably 0.60 mmol/g or more, more preferably 0.70 mmol/g or more, further preferably 0.80 mmol/g or more, still further preferably 1.00 mmol/g or more, and particularly preferably 1.20 mmol/g or more. On the other hand, the amount of xanthate groups introduced is, for example, per g (mass) of the fiber raw material, preferably 5.00 mmol/g or less, and more preferably 3.00 mmol/g or less. Besides, the amount of xanthate groups introduced in the xanthate group introduction step that is within the above-described range means that the amount of substituents introduced into the fine fibrous cellulose to be subjected to the step (A) is within the above-described range. By setting the amount of xanthate groups introduced within the above-described range, the amount of substituents introduced into the fine fibrous cellulose to be subjected to the step (A) can be adjusted within the above-described range, and as a result, it becomes easy to produce fine fibrous cellulose having a fiber width of 10 nm or less. In addition, the transparency of a dispersed solution or a sheet comprising the fine fibrous cellulose can be more effectively enhanced.

<Washing Step>

In the step of producing the fine fibrous cellulose to be subjected to the step (A), a washing step may be performed, as necessary, on the anionic group-introduced fibers. The washing step is carried out by washing the anionic group-introduced fibers, for example, with water or an organic solvent. In addition, the washing step may be performed after each step as described below, and the number of washing operations performed in each washing step is not particularly limited.

<Alkali Treatment Step>

In the step of producing the fine fibrous cellulose to be subjected to the step (A), an alkali treatment may be performed on the fiber raw material between the anionic group introduction step and a defibration treatment step as described below. The method of the alkali treatment is not particularly limited. For example, a method of immersing the anionic group-introduced fibers in an alkaline solution may be applied.

The alkali compound contained in the alkaline solution is not particularly limited, and it may be an inorganic alkaline compound or an organic alkali compound. In the present embodiment, because of high versatility, for example, sodium hydroxide or potassium hydroxide is preferably used as an alkaline compound. In addition, the solvent contained in the alkaline solution may be either water or an organic solvent. Among others, the solvent contained in the alkaline solution is preferably water, or a polar solvent including a polar organic solvent such as alcohol, and is more preferably an aqueous solvent containing at least water. As an alkaline solution, for example, a sodium hydroxide aqueous solution or a potassium hydroxide aqueous solution is preferable, because of high versatility.

The temperature of the alkali solution in the alkali treatment step is not particularly limited, and for example, it is preferably 5° C. or higher and 80° C. or lower, and more preferably 10° C. or higher and 60° C. or lower. The time for immersion of the anionic group-introduced fibers in the alkali solution in the alkali treatment step is not particularly limited, and for example, it is preferably 5 minutes or more and 30 minutes or less, and more preferably 10 minutes or more and 20 minutes or less. The amount of the alkali solution used in the alkali treatment is not particularly limited, and for example, it is preferably 100% by mass or more and 100000% by mass or less, and more preferably 1000% by mass and 10000% by mass or less, with respect to the absolute dry mass of the anionic group-introduced fibers.

In order to reduce the amount of the alkaline solution used in the alkali treatment step, the anionic group-introduced fibers may be washed with water or an organic solvent after the anionic group introduction step and before the alkali treatment step. After the alkali treatment step and before the defibration step, the alkali-treated anionic group-introduced fibers are preferably washed with water or an organic solvent, from the viewpoint of the improvement of the handling ability.

<Acid Treatment Step>

In the step of producing the fine fibrous cellulose to be subjected to the step (A), an acid treatment may be performed on the fiber raw material between the step of introducing anionic groups into the fiber raw material and the after-mentioned defibration treatment step. For example, an anionic group introduction step, an acid treatment, an alkali treatment, and a defibration treatment may be performed in this order.

Such an acid treatment method is not particularly limited, and for example, a method of immersing the fiber raw material in an acid solution containing an acid may be applied. The concentration of the used acid solution is not particularly limited, and for example, it is preferably 10% by mass or less, and more preferably 5% by mass or less. In addition, the pH of the used acid solution is not particularly limited, and for example, it is preferably a pH value of 0 or more and 4 or less, and more preferably a pH value of 1 or more and 3 or less. Examples of the acid contained in the acid solution that can be used herein may include inorganic acid, sulfonic acid, and carboxylic acid. Examples of the inorganic acid may include sulfuric acid, nitric acid, hydrochloric acid, hydrobromic acid, hydroiodic acid, hypochlorous acid, chlorous acid, chloric acid, perchloric acid, phosphoric acid, and boric acid. Examples of the sulfonic acid may include methanesulfonic acid, ethanesulfonic acid, benzenesulfonic acid, p-toluenesulfonic acid, and trifluoromethanesulfonic acid. Examples of the carboxylic acid may include formic acid, acetic acid, citric acid, gluconic acid, lactic acid, oxalic acid, and tartaric acid. Among these acids, it is particularly preferable to use hydrochloric acid or sulfuric acid.

The temperature of the acid solution used in the acid treatment is not particularly limited, and for example, it is preferably 5° C. or higher and 100° C. or lower, and more preferably 20° C. or higher and 90° C. or lower. The time for immersion of the fiber raw material in the acid solution in the acid treatment is not particularly limited, and for example, it is preferably 5 minutes or more and 120 minutes or less, and more preferably 10 minutes or more and 60 minutes or less. The amount of the acid solution used in the acid treatment is not particularly limited, and for example, it is preferably 100% by mass or more and 100000% by mass or less, and more preferably 1000% by mass or more and 10000% by mass or less, with respect to the absolute dry mass of the fiber raw material.

<Nitrogen Removal Treatment>

The step of producing the fine fibrous cellulose to be subjected to the step (A) may further comprise a step of reducing the amount of nitrogen introduced into fibrous cellulose or the amount of nitrogen existing in the reaction system (i.e. a nitrogen removal treatment step). By reducing the nitrogen amount, fine fibrous cellulose capable of further suppressing coloring can be obtained. The nitrogen removal treatment step may be established after a uniform dispersion treatment step in the after-mentioned step (B), but it is preferably established before such a uniform dispersion treatment step in the after-mentioned step (B). Otherwise, the nitrogen removal treatment step is preferably established before a defibration treatment step in the after-mentioned step (A).

In the nitrogen removal treatment step, it is preferable that the pH of a slurry containing anionic group-introduced fibers is adjusted to pH 10 or more, and that a heat treatment is then carried out. In the heat treatment, the liquid temperature of the slurry is preferably set to be 50° C. or higher and 100° C. or lower. The heating time is preferably set to be 15 minutes or more and 180 minutes or less. Upon the adjustment of the pH of the slurry containing anionic group-introduced fibers, an alkali compound that can be used in the aforementioned alkali treatment step is preferably added to the slurry.

After completion of the nitrogen removal treatment step, a washing step can be carried out on the anionic group-introduced fibers, as necessary. The washing step is carried out by washing the anionic group-introduced fibers, for example, with water or an organic solvent. In addition, the number of washing operations performed in each washing step is not particularly limited.

<Defibration Treatment>

The step of producing the fine fibrous cellulose to be subjected to the step (A) comprises a defibration treatment step. Thereby, fine fibrous cellulose with a fiber width of 1000 nm or less having substituents are obtained. In the defibration treatment step, for example, a defibration treatment apparatus can be used. Such a defibration treatment apparatus is not particularly limited, and for example, a high-speed defibrator, a grinder (stone mill-type crusher), a high-pressure homogenizer, an ultrahigh-pressure homogenizer, a high-pressure collision-type crusher, a ball mill, a bead mill, a disc-type refiner, a conical refiner, a twin-screw kneader, an oscillation mill, a homomixer under high-speed rotation, an ultrasonic disperser, a beater or the like can be used. Among the above-described defibration treatment apparatuses, it is more preferable to use a high-speed defibrator, a high-pressure homogenizer, and an ultrahigh-pressure homogenizer, which are less affected by milling media, and are less likely to be contaminated.

Treatment conditions applied in the defibration treatment step are not particularly limited. For example, when a high-pressure homogenizer is used, the pressure applied upon the treatment is preferably 1 MPa or more and 350 MPa or less, more preferably 10 MPa or more and 300 MPa or less, and further preferably 50 MPa or more and 250 MPa or less.

In the defibration treatment step, for example, the anionic group-introduced fibers are preferably diluted with a dispersion medium to form a slurry. As a dispersion medium, water, and one type or two or more types selected from organic solvents such as polar organic solvents can be used. The polar organic solvent is not particularly limited, and for example, alcohols, polyhydric alcohols, ketones, ethers, esters, aprotic polar solvents, etc. are preferable. Examples of the alcohols may include methanol, ethanol, isopropanol, n-butanol, and isobutyl alcohol. Examples of the polyhydric alcohols may include ethylene glycol, propylene glycol, and glycerin. Examples of the ketones may include acetone and methyl ethyl ketone (MEK). Examples of the ethers may include diethyl ether, tetrahydrofuran, ethylene glycol monomethyl ether, ethylene glycol monoethyl ether, ethylene glycol mono n-butyl ether, and propylene glycol monomethyl ether. Examples of the esters may include ethyl acetate and butyl acetate. Examples of the aprotic polar solvents may include dimethyl sulfoxide (DMSO), dimethylformamide (DMF), dimethylacetamide (DMAc), and N-methyl-2-pyrrolidinone (NMP).

The solid concentration of the fine fibrous cellulose upon the defibration treatment can be determined, as appropriate. In addition, in a slurry obtained by dispersing the anionic group-introduced fibers in a dispersion medium, solids other than the anionic group-introduced fibers, such as hydrogen-binding urea, may be comprised.

The fiber width of the fine fibrous cellulose to be subjected to the step (A), after completion of the defibration treatment, is preferably 1 to 50 nm, more preferably 1 to 25 nm, further preferably 1 to 15 nm, and particularly preferably 1 to 10 nm.

Moreover, when a water dispersion comprising 0.1% by mass of the fine fibrous cellulose to be subjected to the step (A) is prepared and a nanofiber yield thereof is then calculated, the nanofiber yield is preferably 90% by mass or more, more preferably 93% by mass or more, and further preferably 96% by mass or more. Besides, the nanofiber yield may also be 100% by mass. Herein, the nanofiber yield is a value obtained by centrifuging a dispersed solution comprising 0.1% by mass of fine fibrous cellulose using a cooled high-speed centrifugal separator (manufactured by KOKUSAN Co. Ltd., H-2000B) under conditions of 12000 G and 10 minutes, and then applying the cellulose concentration in the obtained supernatant to the following equation:

Nanofiber yield (% by mass)=cellulose concentration (% by mass) in supernatant/0.1×100.

Furthermore, when a water dispersion comprising 0.2% by mass of the fine fibrous cellulose to be subjected to the step (A) is prepared, the haze of the water dispersion is preferably 10% or less, more preferably 5.0% or less, and further preferably 3.0% or less. Besides, the haze of the water dispersion may also be 0%. Herein, the haze of a water dispersion of the fine fibrous cellulose is a value measured using a hazemeter (manufactured by MURAKAMI COLOR RESEARCH LABORATORY Co., Ltd.; HM-150) in accordance with JIS K 7136: 2000. Upon the measurement, a liquid glass cell having an optical path length of 1 cm (manufactured by Fujiwara Scientific Company Co., Ltd., MG-40, inverse optical path) is used. Besides, the zero point is measured with ion exchange water which is placed in the same glass cell. The dispersed solution as a measurement target is left at rest under the environment of 23° C. and a relative humidity of 50% for 24 hours, before the measurement. The liquid temperature of the dispersed solution is set to be 23° C.

By setting the fiber width of the fine fibrous cellulose to be subjected to the step (A) or the nanofiber yield or haze of the fine fibrous cellulose-dispersed solution within the above-described range, when fine fibrous cellulose obtained through a step (B) are processed into a slurry or a sheet, the transparency thereof can be more effectively enhanced.

<Substituent Removal Treatment>

The method for producing fine fibrous cellulose of the present embodiment comprises the step (A) of removing at least a part of substituents from fine fibrous cellulose with a fiber width of 1000 nm or less having the substituents. In the present description, the step of removing at least a part of substituents from fine fibrous cellulose is also referred to as a substituent removal treatment step.

Examples of the substituent removal treatment step may include a step of performing a heat treatment on fine fibrous cellulose with a fiber width of 1000 nm or less having substituents, a step of performing an enzyme treatment on the fine fibrous cellulose, a step of performing an acid treatment on the fine fibrous cellulose, and a step of performing an alkali treatment on the fine fibrous cellulose. These steps may be carried out alone or in combination. Among others, the substituent removal treatment step is preferably a step of performing a heat treatment on the fine fibrous cellulose, or a step of performing an enzyme treatment on the fine fibrous cellulose. By going through the above-described treatment step(s), at least a part of substituents are removed from the fine fibrous cellulose with a fiber width of 1000 nm or less having substituents, and thus, fine fibrous cellulose, in which the amount of substituents introduced is less than 0.5 mmol/g, can be obtained.

The substituent removal treatment step is preferably carried out on the fine fibrous cellulose that are in a slurry state. That is to say, the substituent removal treatment step is preferably a step of performing a heat treatment on a slurry containing fine fibrous cellulose with a fiber width of 1000 nm or less having substituents, a step of performing an enzyme treatment on the slurry, a step of performing an acid treatment on the slurry, and a step of performing an alkali treatment on the slurry. By performing the substituent removal treatment step on the fine fibrous cellulose that are in a slurry state, coloring substances generated due to heating or the like during the substituent removal treatment, or added or generated acids, alkalis, salts and the like can be prevented from remaining in the fine fibrous cellulose. Thereby, when the fine fibrous cellulose obtained through a step (B) are processed into a slurry or a sheet, coloring thereof can be suppressed. In addition, when salts derived from the substituents removed after the substituent removal treatment are subjected to a removal treatment, the efficiency of removing the salts can also be enhanced.

When a substituent removal treatment is performed on a slurry containing fine fibrous cellulose with a fiber width of 1000 nm or less having substituents, the concentration of the fine fibrous cellulose in the slurry is preferably 0.05% by mass or more, more preferably 0.1% by mass or more, and further preferably 0.2% by mass or more. On the other hand, the concentration of the fine fibrous cellulose in the slurry is preferably 20% by mass or less, more preferably 15% by mass or less, and further preferably 10% by mass or less. By setting the concentration of the fine fibrous cellulose in the slurry within the above-described range, the substituent removal treatment can be more efficiently carried out. Moreover, by setting the concentration of the fine fibrous cellulose in the slurry within the above-described range, coloring substances generated due to heating or the like during the substituent removal treatment, or added or generated acids, alkalis, salts and the like can be prevented from remaining in the fine fibrous cellulose. Thereby, when the fine fibrous cellulose obtained through a step (B) are processed into a slurry or a sheet, coloring thereof can be suppressed. In addition, when salts derived from the substituents removed after the substituent removal treatment are subjected to a removal treatment, the efficiency of removing the salts can also be enhanced.

When the substituent removal treatment step is a step of performing a heat treatment on fine fibrous cellulose with a fiber width of 1000 nm or less having substituent, the heating temperature applied in the heat treatment step is preferably 40° C. or higher, more preferably 50° C. or higher, and further preferably 60° C. or higher. On the other hand, the heating temperature applied in the heat treatment step is preferably 250° C. or lower, more preferably 230° C. or lower, and further preferably 200° C. or lower. Among others, when the substituents possessed by the fine fibrous cellulose to be subjected to the substituent removal treatment step are phosphorus oxoacid groups or sulfone groups, the heating temperature applied in the heat treatment step is preferably 80° C. or higher, more preferably 100° C. or higher, and further preferably 120° C. or higher.

When the substituent removal treatment step is a heat treatment step, the heating apparatuses that can be used in the heat treatment step are not particularly limited. Examples of such heating apparatuses that can be used herein may include a hot-air drying device, a steam heating device, an electric heating device, a hydrothermal heating device, a thermal heating device, an infrared heating device, a far-infrared heating device, a microwave heating device, a high frequency drying device, a stirring drying device, a rotary drying device, a disk drying device, a roll-type heating device, a plate-type heating device, a fluidized bed drying device, a band-type drying device, a filtration drying device, a vibrating fluidized drying device, an airborne drying device, and a vacuum drying device. From the viewpoint of preventing evaporation, the heating is preferably carried out in a hermetically sealed system. Further, from the viewpoint of enhancing the heating temperature, the heating is preferably carried out in a pressure-resistant device or vessel. The heating treatment may be a batch treatment, a batch continuous treatment, or a continuous treatment.

When the substituent removal treatment step is a step of performing an enzyme treatment on fine fibrous cellulose with a fiber width of 1000 nm or less having substituents, in the enzyme treatment step, phosphoric acid ester hydrolase, sulfuric acid ester hydrolase, etc. is preferably used depending on the type of the substituents.

In the enzyme treatment step, the enzyme is added, so that the enzyme activity becomes preferably 0.1 nkat or more, more preferably 1.0 nkat or more, and further preferably 10 nkat or more, per g of the fine fibrous cellulose. On the other hand, the enzyme is added, so that the enzyme activity becomes preferably 100000 nkat or less, more preferably 50000 nkat or less, and further preferably 10000 nkat or less, per g of the fine fibrous cellulose. After addition of the enzyme to the fine fibrous cellulose-dispersed solution (slurry), the treatment is preferably carried out under conditions of 0° C. or higher and lower than 50° C. for 1 minutes or more and 100 hours or less.

After completion of the enzyme reaction, a step of inactivating the enzyme may be established. Examples of the method of inactivating the enzyme may include a method of adding an acid component or an alkali component to the slurry treated with the enzyme to inactivate the enzyme, and a method of increasing the temperature of the slurry treated with the enzyme to 90° C. or higher to inactivate the enzyme.

When the substituent removal treatment step is a step of performing an acid treatment on fine fibrous cellulose with a fiber width of 1000 nm or less having substituents, in the acid treatment step, an acid compound that can be used in the aforementioned acid treatment step is preferably added to the slurry.

When the substituent removal treatment step is a step of performing an alkali treatment on fine fibrous cellulose with a fiber width of 1000 nm or less having substituents, in the alkali treatment step, an alkali compound that can be used in the aforementioned alkali treatment step is preferably added to the slurry.

In the substituent removal treatment step, it is preferable that the substituent-removing reaction uniformly progresses. In order to promote uniform progress of the reaction, for example, a slurry containing the fine fibrous cellulose may be stirred, and the specific surface area of the slurry may be enhanced. As a method of stirring the slurry, external mechanical shear may be given to the slurry, or the liquid transfer speed of the slurry is increased during the reaction, so that self-stirring may be promoted.

In the substituent removal treatment step, spacer molecules may be added. Such spacer molecules penetrate into the spaces among adjacent fine fibrous cellulose, and thereby act as spacers for establishing very small spaces among the fine fibrous cellulose. In the substituent removal treatment step, by adding such spacer molecule, aggregation of the fine fibrous cellulose after completion of the substituent removal treatment can be suppressed. Thereby, the transparency of a dispersed solution or a sheet comprising the fine fibrous cellulose can be more effectively enhanced.

The spacer molecule is preferably a water-soluble organic compound. Examples of the water-soluble organic compound may include sugar, a water-soluble polymer, and urea. Specific examples of the water-soluble organic compound may include trehalose, urea, polyethylene glycol (PEG), polyethylene oxide (PEO), carboxymethyl cellulose, and polyvinyl alcohol (PVA). In addition, other examples of the water-soluble organic compound that can be used herein may include an alkyl methacrylate-acrylic acid copolymer, polyvinyl pyrrolidone, sodium polyacrylate, propylene glycol, dipropylene glycol, polypropylene glycol, isoprene glycol, hexylene glycol, 1,3-butylene glycol, polyacrylamide, xanthan gum, guar gum, tamarind gum, carrageenan, locust bean gum, quince seed, alginic acid, pullulan, carrageenan, pectin, starches such as cationized starch, raw starch, oxidized starch, etherified starch, esterified starch and amylose, glycerin, diglycerin, polyglycerin, hyaluronic acid, and a metal salt of hyaluronic acid.

Moreover, a known pigment can be used as such a spacer molecule. Examples of such a known pigment may include kaoline (containing clay), calcium carbonate, titanium oxide, zinc oxide, amorphous silica (containing colloidal silica), aluminum oxide, zeolite, sepiolite, smectite, synthetic smectite, magnesium silicate, magnesium carbonate, magnesium oxide, diatomaceous earth, a styrene-based plastic pigment, hydrotalcite, a urea resin-based plastic pigment, and a benzoguanamine-based plastic pigment.

<pH Adjustment Step>

When the substituent removal treatment step is carried out on the fine fibrous cellulose that are in a slurry state, before the substituent removal treatment step, a step of adjusting the pH of a slurry containing fine fibrous cellulose may be established. For example, in a case where anionic groups are introduced into cellulose fibers and where the counterions of these anionic groups are Nat, the slurry containing fine fibrous cellulose after defibrillation exhibits weak alkalinity. If the slurry is heated in this state, monosaccharide as one of coloring factors may be generated due to decomposition of the cellulose in some cases. Hence, the pH of the slurry is adjusted to preferably pH 8 or less, and more preferably pH 6 or less. Moreover, since there may be a case where monosaccharide is generated even under acidic conditions, the pH of the slurry is adjusted to preferably pH 3 or more, and more preferably pH 4 or more.

Furthermore, when the fine fibrous cellulose having substituents are fine fibrous cellulose having phosphoric acid groups, from the viewpoint of improvement of the efficiency of removing substituents, the phosphorus of the phosphoric acid groups is preferably in a state in which it easily receives nucleophilic attack. The phosphorus of the phosphoric acid groups easily receives nucleophilic attack, when the phosphorus is in a state in which it has a neutralization degree of 1, which is represented by cellulose-O—P(=O)(—O—H$^+$)(—O—Na$^+$). In order to achieve this state, the pH of the slurry is adjusted to preferably pH 3 or more and 8 or less, and more preferably pH 4 or more and 6 or less.

The means for adjusting pH is not particularly limited, and for example, an acid component or an alkali component may be added to the slurry containing fine fibrous cellulose. The acid component may be either inorganic acid or organic acid. Examples of the inorganic acid may include sulfuric acid, hydrochloric acid, nitric acid, and phosphoric acid. Examples of the organic acid may include formic acid, acetic acid, citric acid, malic acid, lactic acid, adipic acid, sebacic acid, stearic acid, maleic acid, succinic acid, tartaric acid, fumaric acid, and gluconic acid. The alkali component may be either an inorganic alkali compound, or an organic alkali compound. Examples of the inorganic alkali compound may include lithium hydroxide, sodium hydroxide, potassium hydroxide, lithium carbonate, lithium hydrogen carbonate, potassium carbonate, potassium hydrogen carbonate, sodium carbonate, and sodium hydrogen carbonate. Examples of the organic alkali compound may include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, and N,N-dimethyl-4-aminopyridine.

Moreover, in the pH adjustment step, an ion exchange treatment may be carried out to adjust pH. Upon the ion exchange treatment, a strongly acidic cation exchange resin or a weakly acidic ion exchange resin can be used. By treating the slurry with an appropriate amount of cation exchange resin for a sufficient period of time, a slurry containing fine fibrous cellulose having a pH value of interest can be obtained. Further, in the pH adjustment step, addition of an acid component or an alkali component may be combined with an ion exchange treatment.

<Salt Removal Treatment>

After completion of the substituent removal treatment step, a treatment of removing salts derived from the removed substituents is preferably carried out. By removing the substituent-derived salts, fine fibrous cellulose capable of suppressing coloring are easily obtained. The means for removing the substituent-derived salts is not particularly limited, and for example, a washing treatment is carried out. The washing treatment is carried out, for example, by washing the fine fibrous cellulose aggregated by the substituent removal treatment with water or an organic solvent. From the viewpoint of more effectively suppressing yellowing, the washing treatment is preferably carried out by filtration dehydration, centrifugal dehydration, or centrifugation.

(Step (B))

The method for producing fine fibrous cellulose of the present embodiment comprises a step (A) of removing at least a part of substituents from fine fibrous cellulose with a fiber width of 1000 nm or less having the substituents, and a step (B) of performing a uniform dispersion treatment on the resulting fine fibrous cellulose after completion of the step (A). The uniform dispersion treatment step (B) is a step of performing a uniform dispersion treatment on the fine fibrous cellulose obtained through the substituent removal treatment in the step (A). In the step (A), by performing a substituent removal treatment on the fine fibrous cellulose, at least a part of the fine fibrous cellulose is aggregated. The step (B) is a step of uniformly dispersing the thus aggregated fine fibrous cellulose. The uniformly dispersed state of the fine fibrous cellulose in the step (B) means a state in which the fiber width of the fine fibrous cellulose becomes 10 nm or less. Thus, the fine fibrous cellulose obtained in the production method of the present embodiment have a fiber width of 10 nm or less, although the amount of substituents introduced into the fine fibrous cellulose is low (less than 0.5 mmol/g).

In the step (B) of performing a uniform dispersion treatment, for example, a high-speed defibrator, a grinder (stone mill-type crusher), a high-pressure homogenizer, a high-pressure collision-type crusher, a ball mill, a bead mill, a disc-type refiner, a conical refiner, a twin-screw kneader, an oscillation mill, a homomixer under high-speed rotation, an ultrasonic disperser, a beater or the like can be used. Among the above-described uniform dispersion treatment apparatuses, it is more preferable to use a high-speed defibrator or a high-pressure homogenizer.

Treatment conditions applied in the step (B) of performing a uniform dispersion treatment are not particularly limited. It is preferable to increase the maximum movement speed of the fine fibrous cellulose during the treatment and the pressure applied during the treatment. In the case of a high-speed defibrator, the circumferential speed is preferably 20 m/sec or more, more preferably 25 m/sec or more, and further preferably 30 m/sec or more. Since the high-pressure homogenizer has the maximum movement speed of the fine fibrous cellulose during the treatment and the pressure applied during the treatment, which are higher than those of the high-speed defibrator, the high-pressure homogenizer can be more preferably used. In the treatment with the high-pressure homogenizer, the pressure applied during the treatment is preferably 1 MPa or more, more preferably 10 MPa or more, further preferably 50 MPa or more, and particularly preferably 100 MPa or more. On the other hand, in the treatment with the high-pressure homogenizer, the pressure applied during the treatment is preferably 350 MPa or less, more preferably 300 MPa or less, and further preferably 250 MPa or less.

Besides, in the step (B), the aforementioned spacer molecules may be newly added. In the uniform dispersion treatment step as the step (B), by adding such spacer molecules, uniform dispersion of the fine fibrous cellulose can be more smoothly carried out. Thereby, the transparency of a dispersed solution or a sheet comprising the fine fibrous cellulose can be more effectively enhanced.

(Dispersed Solution)

The present invention relates to a dispersed solution comprising the aforementioned fine fibrous cellulose. That is to say, the dispersed solution of the present invention comprises fine fibrous cellulose, in which the amount of substituents introduced is less than 0.5 mmol/g and a fiber width is 1 to 10 nm.

The amount of substituents introduced into the fine fibrous cellulose comprised in the dispersed solution is less than 0.5 mmol/g, and it is preferably 0.4 mmol/g or less, more preferably 0.3 mmol/g or less, further preferably 0.25 mmol/g or less, and particularly preferably 0.15 mmol/g or less. On the other hand, the amount of substituents introduced into the fine fibrous cellulose comprised in the dispersed solution may be 0.0 mmol/g, and it is preferably 0.01 mmol/g or more, more preferably 0.04 mmol/g or more, further preferably 0.05 mmol/g or more, and particularly preferably 0.07 mmol/g or more.

The fiber width of the fine fibrous cellulose comprised in the dispersed solution is 1 to 10 nm, and it is preferably 1 to 9 nm, more preferably 1 to 8 nm, and further preferably 1 to 7 nm. In addition, the number average fiber width of the fibrous cellulose comprised in the dispersed solution is preferably 1 to 10 nm, more preferably 1 to 9 nm, further preferably 1 to 8 nm, and particularly preferably 1 to 7 nm. Besides, in the present description, the fibrous cellulose include fine fibrous cellulose. On the other hand, the present fibrous cellulose also include coarse fibrous cellulose having a fiber width of larger than 1000 nm. The number average fiber width of the fibrous cellulose comprised in the dispersed solution that is within the above-described range means that the dispersed solution substantially does not comprise such coarse fibrous cellulose, and further that 70% or more of the fibrous cellulose have a fiber width of 10 nm or less. In all of the fibrous cellulose comprised in the dispersed solution, the percentage of fine fibrous cellulose having a fiber width of 10 nm or less is preferably 70% or more, more preferably 80% or more, and further preferably 90% or more.

It is to be noted that the percentage of the fine fibrous cellulose having a fiber width of 10 nm or less is a value calculated by the following equation.

Percentage (%) of fine fibrous cellulose having fiber width of 10 nm or less=(number of fine fibrous cellulose having fiber width of 10 nm or less/number of all fibrous cellulose)×100.

The dispersed solution of the present embodiment is preferably a dispersed solution comprising the aforementioned fine fibrous cellulose and a dispersion medium. The dispersion medium is not particularly limited. The dispersion medium preferably comprises water, and the dispersion medium is more preferably a solvent comprising water as a main component. That is to say, the dispersed solution of the present embodiment is preferably a water dispersion comprising fine fibrous cellulose. Besides, the dispersion medium may also be an organic solvent. Examples of the organic solvent may include dimethylformamide (DMF), dimethylacetamide (DMAc), N-methyl pyrrolidinone (NMP), aniline, pyridine, quinoline, lutidine, acetonitrile, tetrahydrofuran (THF), dimethyl sulfoxide (DMSO), dioxane, ethanol, and isopropanol. Moreover, as such a dispersion medium, a mixed solvent prepared by mixing such an organic solvent with water can also be used.

The pH of a dispersed solution comprising 1% by mass of fine fibrous cellulose is preferably 3 or more, more preferably 4 or more, and further preferably 5 or more. On the other hand, the pH of a dispersed solution comprising 1% by mass of fine fibrous cellulose is preferably 10 or less, more preferably 9 or less, and further preferably 8 or less. By setting the pH of a dispersed solution within the above-described range, the yellowing of the dispersed solution or a sheet can be more effectively suppressed. Besides, in order to adjust the pH of the dispersed solution within the above-described range, the same method as that described in the aforementioned <pH adjustment step> can be adopted.

The concentration of the aforementioned fine fibrous cellulose in the dispersed solution of the present embodiment is not particularly limited, and it is preferably 0.5% by mass or more, more preferably 1.0% by mass or more, and further preferably 2.0% by mass or more. Moreover, the dispersed solution of the present embodiment may also be a high-concentration dispersed solution comprising 3.0% by mass or more of the aforementioned fine fibrous cellulose.

The haze of the dispersed solution of the present embodiment is preferably 5% or less, more preferably 4% or less, and further preferably 3% or less. Herein, the haze of the dispersed solution is a value measured using a hazemeter and a liquid glass cell having an optical path length of 1 cm, in accordance with JIS K 7136: 2000. Besides, the zero point is measured with ion exchange water which is placed in the same glass cell. The dispersed solution as a measurement target is left at rest under the environment of 23° C. and a relative humidity of 50% for 24 hours, before the measurement. The liquid temperature of the dispersed solution is set to be 23° C.

With regard to the dispersed solution of the present embodiment, when a dispersed solution comprising 0.1% by mass of fine fibrous cellulose is prepared and a nanofiber yield is then calculated according to the following equation, the nanofiber yield is preferably 95% by mass or more, and more preferably 96% by mass or more. Besides, the nanofiber yield may also be 100% by mass.

Nanofiber yield [% by mass]=$C/0.1 \times 100$

In the above equation, C represents the concentration of fine fibrous cellulose comprised in a supernatant that is obtained by centrifuging a dispersed solution comprising 0.1% by mass of fine fibrous cellulose under conditions of 12000 G and 10 minutes.

With regard to the dispersed solution of the present embodiment, when a dispersed solution comprising 0.4% by mass of fine fibrous cellulose is prepared, the viscosity of the dispersed solution at 23° C. is preferably 100 mPa·s or more, more preferably 1000 mPa·s or more, and further preferably 2000 mPa·s or more. On the other hand, the viscosity of the dispersed solution at 23° C. is preferably 200000 mPa·s or less, and more preferably 100000 mPa·s or less. The viscosity of the dispersed solution comprising 0.4% by mass of fine fibrous cellulose can be measured using a type B viscometer (manufactured by BROOKFIELD; analog viscometer T-LVT). Regarding the measurement conditions, the temperature is set to be 23° C., and the rotation speed is set to be 3 rpm. The viscosity 3 minutes after initiation of the measurement is measured. In addition, before the measurement, the dispersed solution as a measurement target is left at rest for 24 hours under the environment of 23° C. and a relative humidity of 50%. The liquid temperature of the dispersed solution is set to be 23° C.

The amount of free nitrogen contained in the dispersed solution is preferably as small as possible. The amount of free nitrogen contained in the dispersed solution can be measured by filtrating an fine fibrous cellulose-dispersed solution and then measuring the concentration of nitrogen in the filtrate. For example, the concentration of free nitrogen in a dispersed solution comprising 0.2% by mass of fine fibrous cellulose is preferably 100 ppm or less, more preferably 80 ppm or less, even more preferably 70 ppm or less, further preferably 60 ppm or less, still further preferably 50 ppm or less, still further preferably 40 ppm or less, and particularly preferably 30 ppm or less. Besides, the nitrogen concentration in a dispersed solution comprising 0.2% by mass of fine fibrous cellulose may also be 0 ppm. Since free nitrogen present in a dispersed solution produce coloring, by setting the nitrogen concentration in a filtrate within the above-described range, the yellowing of a dispersed solution or a sheet comprising fine fibrous cellulose can be more effectively suppressed. Herein, the method of measuring the nitrogen concentration in a filtrate is as follows. First, distilled water is added to a dispersed solution so that the concentration of fine fibrous cellulose becomes 0.2% by mass, and after stirring the obtained solution for 24 hours, filtration is carried out using a filter material with a pore diameter of 0.45 μm, so as to obtain a filtrate. Thereafter, the nitrogen concentration (ppm) in the filtrate is measured according to a trace nitrogen analysis.

<Optional Components>

The dispersed solution may comprise optional components, in addition to the aforementioned fine fibrous cellulose and dispersion medium. Examples of such optional components may include the aforementioned spacer molecules, hydrophilic polymers, and organic ions. The hydrophilic polymer is preferably a hydrophilic oxygen-containing organic compound (provided that the above-described cellulose fibers are excluded). The oxygen-containing organic compound is preferably a non-fibrous compound, and such a non-fibrous oxygen-containing organic compound does not include fine fibrous cellulose or thermoplastic resin fibers. In addition, examples of the optional components may include a defoaming agent, a lubricant, an ultraviolet absorber, a dye, a pigment, a stabilizer, a surfactant, and an antiseptic (for example, phenoxy ethanol).

The oxygen-containing organic compound is preferably a hydrophilic organic compound. The hydrophilic oxygen-containing organic compound can improve the strength, density and chemical resistance of a sheet. The hydrophilic oxygen-containing organic compound preferably has, for example, an SP value of 9.0 or more. In addition, the hydrophilic oxygen-containing organic compound is preferably a compound, in which, for example, 1 g or more of oxygen-containing organic compound is dissolved in 100 ml of ion exchange water.

Examples of the oxygen-containing organic compound may include: hydrophilic polymers such as polyethylene glycol, polyethylene oxide, casein, dextrin, starch, modified starch, polyvinyl alcohol, modified polyvinyl alcohol (acetoacetylated polyvinyl alcohol, etc.), polyethylene oxide, polyvinyl pyrrolidone, polyvinyl methyl ether, polyacrylates, polyacrylamide, acrylic acid alkyl ester copolymers, urethane copolymers, and cellulose derivatives (hydroxyethyl cellulose, carboxyethyl cellulose, and carboxymethyl cellulose, etc.); and hydrophilic small molecules such as glycerin, sorbitol, and ethylene glycol. Among these, from the viewpoint of improving the strength, density, chemical resistance, etc. of a sheet, polyethylene glycol, polyethylene oxide, polyvinyl alcohol, glycerin, and sorbitol are preferable; at least one type selected from polyethylene glycol and polyethylene oxide is more preferable; and at least one type selected from polyethylene oxide, polyvinyl alcohol and polyethylene glycol is further preferable.

The oxygen-containing organic compound is preferably an organic compound polymer having a molecular weight of 50,000 or more and 8,000,000 or less. Also, the molecular weight of the oxygen-containing organic compound is preferably 100,000 or more and 5,000,000 or less, and it may also be a small molecule having, for example, a molecular weight of less than 1,000.

Examples of the organic ions may include tetraalkyl ammonium ions and tetraalkyl phosphonium ions. Examples of the tetraalkyl ammonium ions may include tetramethyl ammonium ions, tetraethyl ammonium ions, tetrapropyl ammonium ions, tetrabutyl ammonium ions, tetrapentyl ammonium ions, tetrahexyl ammonium ions, tetraheptyl ammonium ions, tributylmethyl ammonium ions, lauryltrimethyl ammonium ions, cetyltrimethyl ammonium ions, stearyltrimethyl ammonium ions, octyldimethylethyl ammonium ions, lauryldimethylethyl ammonium ions, didecyldimethyl ammonium ions, lauryldimethylbenzyl ammonium ions, and tributylbenzyl ammonium ions. Examples of the tetraalkyl phosphonium ions may include tetramethyl phosphonium ions, tetraethyl phosphonium ions, tetrapropyl phosphonium ions, tetrabutyl phosphonium ions, and lauryltrimethyl phosphonium ions. Moreover, the tetrapropyl onium ions and the tetrabutyl onium ions may be tetra-n-propyl onium ions and tetra-n-butyl onium ions, respectively.

(Sheet)

The present invention relates to a sheet comprising the aforementioned fine fibrous cellulose. That is to say, the sheet of the present invention comprises fine fibrous cellulose, in which the amount of substituent introduced is less than 0.5 mmol/g and having a fiber width of 1 to 10 nm.

Moreover, the present invention relates to a sheet comprising fine fibrous cellulose, in which the amount of substituent introduced is less than 0.5 mmol/g and having a fiber width of 1 to 10 nm, wherein the VI value at a thickness of 50 μm is 1.5 or less. The YI value at a sheet thickness of 50 μm is preferably 1.3 or less, and more preferably 1.2 or less. Besides, the lower limit value of the YI value at a sheet thickness of 50 μm is not particularly limited, and it may also be 0.0. Herein, the YI value at a sheet thickness of 50 μm is a yellowness index measured in accordance with JIS K 7373: 2006. As a device for measuring the YI value, for example, Colour Cute i (manufactured by Suga Test Instruments Co., Ltd.) can be used. Besides, since the aforementioned YI value is a YI value measured before heating a sheet, as described later, it is also referred to as an "initial YI value."

The YI value at a thickness of 50 μm can be calculated according to the following equation:

YI value at thickness of 50 μm=YI value (measured value) of sheet×[50/sheet thickness (μm)].

The thickness of the sheet can be measured using a stylus-type constant pressure thickness measuring device (manufactured by Mahr TECLOCK CORPORATION, Millitron 1202DPG-02). Specifically, a sheet that has been cut out into a size of 50 mm square or more is subjected to humidity conditioning under conditions of 23° C. and a relative humidity of 50% for 24 hours, then, the thicknesses of any given 4 points are measured, and the mean value of the obtained values is defined to be the thickness of the sheet.

The YI increase percentage of the sheet of the present embodiment is preferably 1500% or less, more preferably 1200% or less, further preferably 1000% or less, still further preferably 800% or less, and particularly preferably 750% or less. Besides, the lower limit value of the YI increase percentage of the sheet is not particularly limited, and it may also be 0%. Herein, the YI increase percentage of the sheet means an increase percentage of the YI values before and after the heating of the sheet at 160° C. for 6 hours. Specifically, the YI increase percentage is a value calculated according to the following equation:

YI increase percentage (%)=(yellowness index of sheet after heating yellowness index of sheet before heating)/yellowness index of sheet before heating×100.

In the above equation, the yellowness index of the sheet is a yellowing index measured in accordance with JIS K 7373: 2006.

In the present embodiment, when the initial YI value is 1.5 or less and the YI increase percentage is within the above-described range, it can be determined that the coloring (yellowing) of the sheet is suppressed.

The haze of the sheet of the present embodiment is preferably 5.0% or less, more preferably less than 3.5%, further preferably 3.0% or less, still further preferably 2.5% or less, and particularly preferably 2.0% or less. When the haze of the sheet is within the above-described range, it can be determined that a highly transparent sheet has been formed by using the fine fibrous cellulose of the present embodiment. The haze of the sheet is a value measured in accordance with JIS K 7136: 2000, using a hazemeter.

The total light transmittance of the sheet of the present embodiment is preferably 90.0% or more, more preferably 90.5% or more, and further preferably 91.0% or more. Besides, the haze of the sheet is a value measured in accordance with JIS K 7361-1: 1997, using a hazemeter.

The surface roughness of at least one surface of the sheet of the present embodiment is preferably 50 nm or less, more preferably 30 nm or less, and further preferably 10 nm or less. Besides, the surface roughness of both surfaces of the sheet that is within the above-described range is particularly preferable. By setting the surface roughness within the above-described range, the transparency of the sheet can be further enhanced. Specifically, the haze of the sheet can be further reduced. Herein, the surface roughness (arithmetic mean) of the sheet is the arithmetic mean roughness of at least one surface of the sheet. The surface roughness (arithmetic mean) is a value obtained by measuring the arithmetic mean roughness of a 3 μm square, using an atomic force microscope (manufactured by Veeco, NanoScope Ma).

The surface pH of the sheet of the present embodiment is preferably 3 or more, more preferably 4 or more, and further preferably 5 or more. On the other hand, the surface pH of the present sheet is preferably 10 or less, more preferably 9 or less, and further preferably 8 or less. By setting the surface pH of the sheet within the above-described range, the effect of suppressing yellowing is easily obtained. In order to set the surface pH of the sheet within the above-described range, the pH of a dispersed solution (i.e. a dispersed solution comprising 1% by mass of fine fibrous cellulose) is desirably set within the aforementioned preferred range. Besides, when the surface pH of the sheet is measured, 10 μL of ion exchange water is added dropwise in a 1 cm square range on the surface of the sheet, using a micropipette, and the pH of the portion is then measured using a flat-type pH composite electrode (6261-10C; manufactured by HORIBA).

The sheet of the present embodiment is produced from the aforementioned dispersed solution. Specifically, the step of producing the sheet preferably comprises a coating step of applying the aforementioned dispersed solution onto a base material, or a papermaking step of making a paper from the aforementioned dispersed solution. The dispersed solution may comprise the aforementioned additives, as necessary.

In the coating step, a dispersed solution comprising the aforementioned fine fibrous cellulose (i.e. a coating solution) is applied onto a base material, and is then dried to form a sheet, which is then detached from the base material, so as to obtain a sheet. Using a coating apparatus and a long base material, the sheets can be continuously produced. On the other hand, the papermaking step is carried out by making a paper from a slurry using a paper machine. The paper machine used in the papermaking step is not particularly limited, and examples thereof may include continuous paper machines such as a Fourdrinier paper machine, a cylinder paper machine, and an inclined paper machine, and a multilayer combination paper machine, which is a combination thereof. A known papermaking method, such as papermaking by hand, may be adopted in the papermaking step.

On the sheet of the present embodiment, a resin layer or an inorganic layer may be further laminated. The present embodiment may also relate to a laminate having the aforementioned sheet and a resin layer and/or an inorganic layer.

<Optional Components>

The sheet of the present embodiment may comprise optional components that can be comprised in the dispersed solution. Among others, the present sheet preferably comprises the aforementioned hydrophilic polymer, and the hydrophilic polymer is preferably a hydrophilic oxygen-containing organic compound. The content of the oxygen-containing organic compound in the sheet is preferably 1 part by mass or more, more preferably 10 parts by mass or more, and further preferably 15 parts by mass or more, with respect to 100 parts by mass of the fine fibrous cellulose comprised in the sheet. On the other hand, the content of the oxygen-containing organic compound in the sheet is preferably 1000 parts by mass or less, more preferably 500 parts by mass or less, further preferably 100 parts by mass or less, and particularly preferably 50 parts by mass or less, with respect to 100 parts by mass of the fine fibrous cellulose comprised in the sheet. By setting the content of the oxygen-containing organic compound within the above-described range, a laminated sheet having high transparency and strength can be formed.

(Laminated Sheet)

The present invention relates to a laminated sheet having a fiber layer and a resin layer disposed on at least one surface of the fiber layer. Herein, the fiber layer comprises fibrous cellulose, in which the amount of substituents introduced is less than 0.5 mmol/g and the fiber width is 1 to 10 nm. The fiber layer constituting the laminated sheet is a layer consisting of the aforementioned sheet.

FIG. 2 is a cross-sectional view showing the configuration of the laminated sheet of the present embodiment. As shown in FIG. 2, the laminated sheet 10 of the present embodiment has a resin layer 2 and a fiber layer 6. The resin layer 2 is directly laminated on the fiber layer 6, and the resin layer 2 and the fiber layer 6 are in a state in which they are contacted with each other at either one surface thereof. The laminated sheet 10 of the present embodiment may have at least one resin layer 2 and at least one fiber layer 6. Otherwise, the laminated sheet 10 may have two or more of the resin layers 2, or may also have two or more of the fiber layers 6. For example, the laminated sheet may be configured by laminating a fiber layer, a resin layer and a fiber layer in this order, or may also be configured by laminating a resin layer, a fiber layer and a resin layer in this order.

Conventionally, in order to obtain a highly transparent sheet, it has been studied to enhance the amount of substituents introduced into the fine fibrous cellulose and thereby to obtain fine fibrous cellulose having a small fiber width. However, when such fine fibrous cellulose containing a large amount of substituents have been mixed into a sheet, the sheet has tended to be colored in a sheet production step or in a usage environment. On the other hand, when the substituent introduction step has been controlled to keep the amount of substituents introduced low, defibration of the fine fibrous cellulose has become insufficient, and thus, a highly transparent sheet has been hardly obtained. Hence, the present inventors have conducted intensive studies regarding the step of producing fine fibrous cellulose, etc., and as a result, the present inventors have succeeded in fibrillating fibrous cellulose to such an extent that the fiber width is 1 to 10 nm, although the amount of substituents introduced is small (less than 0.5 mmol/g). Then, the present inventors have found that a sheet comprising fibrous cellulose, which contain a small amount of substituents and are fibrillated to such an extent that the fiber width is 1 to 10 nm, is highly transparent, and that the coloring of the sheet is suppressed. When such an fine fibrous cellulose-containing sheet is laminated on a resin layer, the transparency of the resin layer is not impaired but is maintained.

The total light transmittance of the laminated sheet is preferably 88% or more, more preferably 90% or more, further preferably 91% or more, and particularly preferably 91.5% or more. By setting the total light transmittance of the laminated sheet within the above-described range, the laminated sheet of the present embodiment can be applied to intended uses, to which a transparent glass has been conventionally applied. Herein, the total light transmittance is a value measured in accordance with JIS K 7361-1: 1997, using a hazemeter (manufactured by MURAKAMI COLOR RESEARCH LABORATORY Co., Ltd.; HM-150).

The haze of the laminated sheet is preferably 2.0% or less, more preferably 1.5% or less, and further preferably 1.0% or less. The lower limit value of the haze of the laminated sheet is not particularly limited, and it may also be 0%. Herein, the haze is a value measured in accordance with JIS K 7136: 2000, using a hazemeter (manufactured by MURAKAMI COLOR RESEARCH LABORATORY Co., Ltd.; HM-150).

The laminated sheet of the present embodiment is also excellent in terms of interlayer adhesiveness between the fiber layer and the resin layer. Specifically, in accordance with JIS K 5400, 100 cross cuts (1 mm$^2$ each) are created on the surface of the laminated sheet on the fiber layer side. Thereafter, a scotch tape (manufactured by NICHIBAN CO., LTD.) is then adhered onto them and is pressed on them. Thereafter, the tape is peeled in the direction of 90°. The number of squares of fiber layers peeled from the resin layer is less than 5. In this case, it can be determined that the interlayer adhesiveness between the fiber layer and the resin layer are favorable. The number of the peeled squares is more preferably 3 or less, further preferably 1 or less, and particularly preferably 0.

The laminated sheet of the present embodiment has a fiber layer and a resin layer, and the fiber layer can also function as a layer for reinforcing the resin layer. Thus, the strength of the laminated sheet itself is enhanced. In addition, even in a case where the laminated sheet is adhered to an adherend such as another resin film or resin plate, the fiber layer functions as a layer for reinforcing the adherend. For example, a resin plate such as a polycarbonate plate is used as an adherend, and the laminated sheet is then adhered to this resin plate, so that the mechanical strength of the resin plate can be reinforced. Thus, the laminated sheet having a fiber layer also has the effect of reinforcing an adherend.

With regard to the reinforcing effect obtained when the laminated sheet is adhered to an adherend, for example, when the bending elastic modulus obtained after adhesion of the laminated sheet to an adherend is 1.5 times or more higher than the bending elastic modulus of the adherend alone, it can be evaluated that an excellent reinforcing effect has been exhibited. The bending elastic modulus obtained after adhesion of the laminated sheet to the adherend is particularly preferably 2.0 times or more higher than the bending elastic modulus of the adherend alone. Besides, when an adherend is adhered to the laminated sheet, the adherend is laminated on the laminated sheet, and then, hot pressing is performed on them at a glass transition temperature or higher, so as to produce a laminated sheet.

The laminated sheet of the present embodiment has excellent mechanical strength by itself. For example, the tensile elastic modulus of the laminated sheet at 23° C. and at a relative humidity of 50% is preferably 2.5 GPa or more, more preferably 5.0 GPa or more, and further preferably 10 GPa or more. On the other hand, the tensile elastic modulus of the laminated sheet at 23° C. and at a relative humidity of 50% is preferably 30 GPa or less, more preferably 25 GPa or less, and further preferably 20 GPa or less. The tensile elastic modulus of the laminated sheet is a value measured in accordance with JIS P 8113.

The entire thickness of the laminated sheet is not particularly limited, and it is preferably 30 μm or more, more preferably 40 μm or more, further preferably 50 μm or more, still further preferably 60 μm or more, and particularly preferably 70 μm or more. On the other hand, the entire thickness of the laminated sheet is preferably 1000 μm or less. The thickness of the laminated sheet can be adjusted, as appropriate, depending on intended use. From the viewpoint of exhibiting the effect of reinforcing the adherend, the entire thickness of the laminated sheet is preferably 50 μm or more.

The thickness of the fiber layer of the laminated sheet is preferably 5 μm or more, more preferably 10 μm or more, and further preferably 20 μm or more. On the other hand, the thickness of the fiber layer is preferably 500 μm or less, more preferably 200 μm or less, and further preferably 100 μm or less. Herein, the thickness of the fiber layer constituting the laminated sheet is a value measured by cutting out a cross section from the laminated sheet by Ultramicrotome UC-7 (manufactured by JEOL) and then observing the cross section by an electron microscope, a magnifying glass, or visual inspection. When a plurality of fiber layers are comprised in the laminated sheet, the total thickness of the fiber layers is preferably within the above-described range.

Moreover, the thickness of the resin layer of the laminated sheet is preferably 0.5 μm or more, more preferably 1 μm or more, further preferably 2 μm or more, and particularly preferably 3 μm or more. On the other hand, the thickness of the resin layer is preferably 15000 μm or less, more preferably 5000 μm or less, and further preferably 500 μm or less. Herein, the thickness of the resin layer constituting the laminated sheet is a value measured by cutting out a cross section from the laminated sheet by Ultramicrotome UC-7 (manufactured by JEOL) and then observing the cross section by an electron microscope, a magnifying glass, or visual inspection. When a plurality of resin layers are comprised in the laminated sheet, the total thickness of the resin layers is preferably within the above-described range.

The ratio of the thickness of the resin layer to the thickness of the fiber layer (the thickness of the resin layer/the thickness of the fiber layer) is preferably 10 or less, more preferably 5 or less, and further preferably 1 or less. When the resin layer is, for example, a coated layer formed by coating, the ratio of the thickness of the resin layer to the thickness of the fiber layer (the thickness of the resin layer/the thickness of the fiber layer) may be 0.5 or less, may also be 0.2 or less, may also be 0.15 or less, and may also be 0.1 or less. When a plurality of fiber layers are present in the laminated sheet, the thickness of the fiber layer means the total thickness of the fiber layers. When a plurality of resin layers are present in the laminated sheet, the thickness of the resin layer means the total thickness of the resin layers.

In the present embodiment, the YI value of the laminated sheet is preferably 2.0 or less, and more preferably 1.5 or less. The lower limit value of the YI value of the laminated sheet is not particularly limited, and it is preferably 0.1 or more. Herein, the YI value of the laminated sheet is a YI value measured in accordance with JIS K 7373: 2006. As a device for measuring the YI value, for example, Colour Cute i (manufactured by Suga Test Instruments Co., Ltd.) can be used. Besides, since the aforementioned YI value is a YI value measured before heating the laminated sheet, as described later, it is also referred to as an "initial YI value."

In the present embodiment, the YI value of the laminated sheet after heating at 160° C. for 6 hours is preferably 20 or less, more preferably 15 or less, and further preferably 10 or less. Besides, the lower limit value of the YI value of the laminated sheet after heating at 160° C. for 6 hours is not particularly limited, and it is preferably 0.1 or more. Besides, the YI value of the laminated sheet after heating at 160° C. for 6 hours is also referred to as a "YI value after heating."

The YI increase percentage of the laminated sheet of the present embodiment is preferably 1500% or less, more preferably 1250% or less, further preferably 1000% or less, still further preferably 800% or less, and particularly preferably 600% or less. Besides, the lower limit value of the YI increase percentage of the laminated sheet is not particularly limited, and it is preferably 0.1% or more. Herein, the YI increase percentage of the laminated sheet means an increase percentage of the YI values before and after the heating of the laminated sheet at 160° C. for 6 hours.

Specifically, the YI increase percentage is a value calculated according to the following equation:

YI increase percentage (%)=(YI value of laminated sheet after heating−YI value of laminated sheet before heating)/YI value of laminated sheet before heating×100.

In the above equation, the YI value of the laminated sheet is a YI value measured in accordance with JIS K 7373: 2006.

(Resin Layer)

The laminated sheet has at least one resin layer. Herein, the resin layer is directly laminated on the fiber layer, and the resin layer and the fiber layer are in a state in which they are contacted with each other at either one surface thereof. Besides, the resin layer is preferably a resin layer formed by coating (i.e. a coated resin layer).

The resin layer is a layer comprising a natural resin or a synthetic resin as a main component. In this context, the main component refers to a component comprised in 50% by mass or more, with respect to the total mass of the resin layer. The content of the resin is preferably 60% by mass or more, more preferably 70% by mass or more, further preferably 80% by mass or more, and particularly preferably 90% by mass or more, with respect to the total mass of the resin layer. It is to be noted that the content of the resin may be set to be 100% by mass, or may also be set to be 95% by mass or less.

Examples of natural resins may include rosin-based resins, such as rosin, rosin ester and hydrogenated rosin ester.

The synthetic resin is preferably at least one type selected from, for example, polycarbonate resins, polyethylene terephthalate resins, polyethylene naphthalate resins, polyethylene resins, polypropylene resins, cyclic olefin resins, polyimide resins, polystyrene resins, and acrylic resins. Among them, the synthetic resin is preferably at least one type selected from polycarbonate resins and acrylic resins, and more preferably a polycarbonate resin. It is to be noted that the acrylic resin is preferably at least any one type selected from polyacrylonitrile and poly(meth)acrylate.

Examples of the polycarbonate resin, which constitutes the resin layer, may include aromatic polycarbonate-based resins and aliphatic polycarbonate-based resins. These specific polycarbonate-based resins are known, and for example, the polycarbonate-based resin described in JP Patent Publication No. 2010-023275 A may be included.

In the laminated sheet of the present embodiment, the resin layer preferably comprises an adhesion aid. Examples of the adhesion aid may include compounds comprising at least one type selected from an isocyanate group, a carbodiimide group, an epoxy group, an oxazoline group, an amino group, a silanol group and an alkoxysilyl group, and organic silicon compounds. Among them, the adhesion aid is preferably at least one type selected from a compound containing an isocyanate group (an isocyanate compound) and an organic silicon compound. Examples of the organic silicon compound may include silane coupling agent condensates and silane coupling agents.

Examples of the isocyanate compound may include a polyisocyanate compound and polyfunctional isocyanate. Specific examples of the polyisocyanate compound may include aromatic polyisocyanate containing 6 or more and 20 or less carbon atoms excluding carbon atoms in the NCO group, aliphatic polyisocyanate containing 2 or more and 18 or less carbon atoms, alicyclic polyisocyanate containing 6 or more and 15 or less carbon atoms, aralkyl-type polyisocyanate containing 8 or more and 15 or less carbon atoms, denatured products of these polyisocyanates, and a mixture of two or more types of these polyisocyanates. Among others, alicyclic polyisocyanate containing 6 or more and 15 or less carbon atoms, namely, isocyanurate is preferably used.

Specific examples of the alicyclic polyisocyanate may include isophorone diisocyanate (IPDI), dicyclohexylmethane-4,4'-diisocyanate (hydrogenated MDI), cyclohexylene diisocyanate, methylcyclohexylene diisocyanate, bis(2-isocyanatoethyl)-4-cyclohexene-1,2-dicarboxylate, 2,5-norbornane diisocyanate, and 2,6-norbornane diisocyanate.

Examples of the organic silicon compound may include a compound having a siloxane structure, and a compound that forms a siloxane structure by condensation. For example, the organic silicon compound may be a silane coupling agent, or a condensate of the silane coupling agent. The silane coupling agent may have or may not have a functional group other than the alkoxysilyl group. Examples of the functional group other than an alkoxysilyl group may include a vinyl group, an epoxy group, a styryl group, a methacryloxy group, an acryloxy group, an amino group, a ureido group, a mercapto group, a sulfide group, and an isocyanate group. The silane coupling agent used in the present embodiment is preferably a silane coupling agent containing a methacryloxy group.

Specific examples of a silane coupling agent having a methacryloxy group in a molecule thereof may include methacryloxypropylmethyldimethoxysilane, methacryloxypropyltrimethoxysilane, methacryloxypropylmethyldiethoxysilane, methacryloxypropyltriethoxysilane, and 1,3-bis(3-methacryloxypropyl)tetramethyldisiloxane. Among these, at least one type selected from methacryloxypropyltrimethoxysilane, methacryloxypropyltriethoxysilane, and 1,3-bis(3-methacryloxypropyl)tetramethyldisiloxane is preferably used. The silane coupling agent preferably contains 3 or more alkoxysilyl groups.

As such silane coupling agents, those having an alkoxysilyl group may be used, and those generating a silanol group after completion of hydrolysis may also be used. In this case, at least some alkoxysilyl groups and some silanol groups are preferably present even after lamination of the fiber layer. Since such silanol groups are hydrophilic groups, it enhances the hydrophilicity of the surface of the resin layer on the fiber layer side, so that the adhesiveness between the resin layer and the fiber layer can be more effectively enhanced.

The adhesion aid may be comprised in the resin layer in a state it is uniformly dispersed therein. Herein, the state in which the adhesion aid is uniformly dispersed in the resin layer means a state in which the concentrations of the following 3 regions ((a) to (c)) are measured and the concentrations of any two regions do not differ from each other by 2 or more times when compared:

(a) a region from the surface of the resin layer on the fiber layer side to 10% of the entire thickness of the resin layer,
(b) a region from the surface opposite to the surface of the resin layer on the fiber layer side to 10% of the entire thickness of the resin layer, and
(c) a region from the center plane in the thickness direction of the resin layer to ±5% (a total of 10%) of the entire thickness.

Otherwise, the adhesion aid may be unevenly distributed in the region of the resin layer on the fiber layer side. For example, when an organic silicon compound is used as such an adhesion aid, the organic silicon compound may be unevenly distributed in the region of the resin layer on the fiber layer side.

Herein, the state in which the adhesion aid is unevenly distributed in the region of the resin layer on the fiber layer side means a state in which the concentrations of the following 2 regions ((d) and (e)) are measured and as a result, the concentrations of the two regions differ from each other by 2 or more times when compared:

(d) a region from the surface of the resin layer on the fiber layer side to 10% of the entire thickness of the resin layer, and
(e) a region from the center plane in the thickness direction of the resin layer to ±5% (a total of 10%) of the entire thickness.

Herein, the concentration of the adhesion aid is a numerical value measured using an X-ray electron spectrometer or an infrared spectrophotometer. The concentration of the adhesion aid is a value obtained by cutting out a cross section from a predetermined region of the laminated sheet using Ultramicrotome UC-7 (manufactured by JEOL), and then measuring the cross section using the aforementioned device.

On the surface of the resin layer on the fiber layer side, an organic silicon compound-containing layer may be established. Such a state is also included in the state in which the organic silicon compound is unevenly distributed in the region of the resin layer on the fiber layer side. The organic silicon compound-containing layer may be a coated layer formed by applying an organic silicon compound-containing coating solution to the surface of the resin layer on the fiber layer side.

Besides, when such an organic silicon compound-containing layer is established on the surface of the resin layer on the fiber layer side, "the surface of the resin layer on the fiber layer side" in the above region (d) is read to "the exposed surface of the organic silicon compound-containing layer," and "the entire thickness of the resin layer" is read to "the total thickness of the resin layer and the organic silicon compound-containing layer."

The content of the adhesion aid is preferably 0.1 part by mass or more, and more preferably 0.5 parts by mass or more, with respect to 100 parts by mass of the resin comprised in the resin layer. On the other hand, the content of the adhesion aid is preferably 40 parts by mass or less, and more preferably 35 parts by mass or less, with respect to 100 parts by mass of the resin comprised in the resin layer.

When the adhesion aid is an isocyanate compound, the content of the isocyanate compound is preferably 10 parts by mass or more, more preferably 15 parts by mass or more, and further preferably 18 parts by mass or more, with respect to 100 parts by mass of the resin comprised in the resin layer. On the other hand, the content of the isocyanate compound is preferably 40 parts by mass or less, more preferably 35 parts by mass or less, and further preferably 30 parts by mass or less, with respect to 100 parts by mass of the resin comprised in the resin layer.

When the adhesion aid is an organic silicon compound, the content of the organic silicon compound is preferably 0.1 part by mass or more, and more preferably 0.5 parts by mass or more, with respect to 100 parts by mass of the resin comprised in the resin layer. On the other hand, the content of the organic silicon compound is preferably 10 parts by mass or less, and more preferably 5 parts by mass or less, with respect to 100 parts by mass of the resin comprised in the resin layer.

By setting the content of the adhesion aid within the above-described range, the adhesiveness of the fiber layer and the resin layer can be more effectively enhanced.

When the adhesion aid is an isocyanate compound, the content of the isocyanate groups in the resin layer is preferably 0.5 mmol/g or more, more preferably 0.6 mmol/g or more, further preferably 0.8 mmol/g or more, and particularly preferably 0.9 mmol/g or more. On the other hand, the content of the isocyanate groups in the resin layer is preferably 3.0 mmol/g or less, more preferably 2.5 mmol/g or less, further preferably 2.0 mmol/g or less, and particularly preferably 1.5 mmol/g or less.

A surface treatment may be performed on the surface of the resin layer on the fiber layer side. Examples of the surface treatment method may include a corona treatment, a plasma discharge treatment, a UV irradiation treatment, an electron beam irradiation treatment, and a flame treatment. Among these treatments, the surface treatment is preferably at least one type selected from a corona treatment and a plasma discharge treatment. Besides, the plasma discharge treatment is preferably a vacuum plasma discharge treatment.

On the surface of the resin layer on the fiber layer side, an ultrafine uneven structure may be formed. When the surface of the resin layer on the fiber layer side has such an ultrafine uneven structure, the adhesiveness between the fiber layer and the resin layer can be more effectively enhanced. When the surface of the resin layer on the fiber layer side has an ultrafine uneven structure, such a structure is preferably formed by a treatment step such as a blasting treatment, an embossing treatment, an etching treatment, a corona treatment, or a plasma discharge treatment. It is to be noted that the term "ultrafine uneven structure" is used in the present description to mean a structure in which 10 or more recesses exist on a straight line of 1 mm in length drawn at any given area. When the number of recesses is measured, the laminated sheet is immersed in ion exchange water for 24 hours, and the fiber layer is then detached from the resin layer. Thereafter, the surface of the resin layer on the fiber layer side is scanned by a stylus-type surface roughness measuring instrument (manufactured by Kosaka Laboratory Ltd., Surfcorder series), so that the number of recesses can be measured. When recesses and projections have extremely small pitches of a submicron or nanometer order, the number of recesses and projections can be measured from observed images obtained by a scanning probe microscope (manufactured by Hitachi High-Tech Science Corporation, AFM5000II and AFM5100N).

Optional components other than synthetic resins may be comprised in the resin layer. Examples of such optional components include known components used in the resin film field, such as fillers, pigments, dyes and ultraviolet absorbing agents.

(Fiber Layer)

The fiber layer comprises fibrous cellulose in which the amount of substituents introduced is less than 0.5 mmol/g and the fiber width is 1 to 10 nm. In general, the fibrous cellulose having a fiber width of 1000 nm or less are referred to as "fine fibrous cellulose" or "CNF." However, the fibrous cellulose comprised in the fiber layer of the present embodiment are fine fibrous cellulose having a much smaller fiber width. Preferred examples of the fine fibrous cellulose comprised in the present fiber layer may include the aforementioned fine fibrous cellulose. In addition, the fine fibrous cellulose comprised in the present fiber layer are preferably produced by the aforementioned production method.

The number average fiber width of the fibrous cellulose comprised in the fiber layer is preferably 1 to 10 nm, more preferably 1 to 9 nm, further preferably 1 to 8 nm, and particularly preferably 1 to 7 nm. The number average fiber width of the fibrous cellulose comprised in the fiber layer that is within the above-described range means that the fiber layer substantially does not comprise coarse fibrous cellulose, and further that 70% or more of the fibrous cellulose have a fiber width of 10 nm or less. In all of the fibrous cellulose comprised in the fiber layer, the percentage of fine fibrous cellulose having a fiber width of 10 nm or less is preferably 70% or more, more preferably 80% or more, and further preferably 90% or more.

Herein, the percentage of the fine fibrous cellulose having a fiber width of 10 nm or less is a value calculated by the following equation:

Percentage (%) of fine fibrous cellulose having fiber width of 10 nm or less=(number of fine fibrous cellulose having fiber width of 10 nm or less/ number of all fibrous cellulose)×100.

The fiber width of the fine fibrous cellulose in the laminated sheet is measured as follows, for example, by applying atomic force microscopy. First, the fiber layer of a laminated sheet comprising fine fibrous cellulose is observed by an atomic force microscope (manufactured by Veeco, NanoScope IIIc). At that time, an image is set to be a 500-nm viewing angle. With respect to the obtained image, two longitudinal axes and two horizontal axes are arbitrarily drawn per image. Twenty or more fibers intersecting the axes are arbitrarily selected, and the widths of the fibers are visually read. Thus, 3 nonoverlapped observation images are photographed, and the values of the fiber widths of the fibers intersecting the two axes are thus read in each image (20 fibers or more×2×3=120 fibers or more).

(1) A single straight line X is drawn in any given portion in an observation image, and 20 or more fibers intersecting with the straight line X are selected.
(2) A straight line Y, which intersects perpendicularly with the aforementioned straight line in the same image as described above, is drawn, and 20 or more fibers intersecting with the straight line Y are selected.

Besides, in a case where the fiber layer is not exposed from the laminated sheet, the laminated sheet is cut using an ultramicrotome or the like, and a cross section is cut out from the fiber layer and is then observed by the aforementioned method.

In the present embodiment, the density of the fiber layer is preferably 1.0 g/cm$^3$ or more, more preferably 1.2 g/cm$^3$ or more, and further preferably 1.4 g/cm$^3$ or more. On the other hand, the density of the fiber layer is preferably 1.7 g/cm$^3$ or less, more preferably 1.65 g/cm$^3$ or less, and further preferably 1.6 g/cm$^3$ or less. When the laminated sheet comprises two or more fiber layers, the density of each fiber layer is preferably within the above-described range.

The density of the fiber layer is calculated from the basis weight and thickness thereof in accordance with JIS P 8118: 2014. The basis weight of the fiber layer can be calculated in accordance with the JIS standard P 8124: 2011, by cutting the laminated sheet with the Ultramicrotome UC-7 (manufactured by JEOL Ltd.), such that only the fiber layer is left. It is to be noted that when the fiber layer comprises optional components other than the fine fibrous cellulose, the density of the fiber layer means a density including such optional components other than the fine fibrous cellulose.

In the present embodiment, the fiber layer is preferably a nonporous layer. In this context, a nonporous fiber layer means that the density of the entire fiber layer is 1.0 g/cm$^3$ or more. When the density of the entire fiber layer is 1.0 g/cm$^3$ or more, it means that the porosity included in the fiber layer is suppressed to a predetermined value or less, distinguishing the fiber layer from porous sheets or layers.

Moreover, the nonporous fiber layer may be characterized in that the porosity is 15% by volume or less. In this context, the porosity of the fiber layer is simply obtained through Equation (a) below:

Porosity (% by volume)=$\{1-B/(M \times A \times t)\} \times 100$   Equation (a):

wherein A represents the area (cm$^2$) of the fiber layer, t represents the thickness (cm) of the fiber layer, B represents the mass (g) of the fiber layer, and M represents the density of cellulose.

In the present embodiment, the surface roughness of at least one surface of the fiber layer is preferably 50 nm or less, more preferably 30 nm or less, and further preferably 10 nm or less. Besides, the surface roughness of both surfaces of the fiber layer that is within the above-described range is particularly preferable. By setting the surface roughness within the above-described range, the transparency of the fiber layer can be further enhanced, and as a result, the transparency of the laminated sheet can also be enhanced. Specifically, the haze of the fiber layer and the haze of the laminated sheet can be further reduced. Herein, the surface roughness (arithmetic mean) of the fiber layer is the arithmetic mean roughness of at least one surface of the fiber layer. The surface roughness (arithmetic mean) is a value obtained by measuring the arithmetic mean roughness of a 3 μm square, using an atomic force microscope (manufactured by Veeco, NanoScope Ma).

In the present embodiment, the surface pH of the fiber layer is preferably 3 or more, more preferably 4 or more, and further preferably 5 or more. On the other hand, the surface pH of the present fiber layer is preferably 10 or less, more preferably 9 or less, and further preferably 8 or less. By setting the surface pH of the fiber layer within the above-described range, the effect of suppressing yellowing is easily obtained. In order to set the surface pH of the fiber layer within the above-described range, the pH of an fine fibrous cellulose-dispersed solution obtained in the after-mentioned production step is preferably adjusted, as appropriate. Besides, when the surface pH of the fiber layer is measured, 10 μL of ion exchange water is added dropwise in a 1 cm square range on the surface of the fiber layer, using a micropipette, and the pH of the portion is then measured using a flat-type pH composite electrode (6261-10C; manufactured by HORIBA).

<Optional Components>

The fiber layer may comprise optional components other than the fine fibrous cellulose. Such optional components may be optional components that can be comprised in a dispersed solution or a fiber layer.

The fiber layer preferably comprises the aforementioned hydrophilic polymer, and the hydrophilic polymer is preferably a hydrophilic oxygen-containing organic compound. The content of the oxygen-containing organic compound in the fiber layer is preferably 1 part by mass or more, more preferably 10 parts by mass or more, and further preferably 15 parts by mass or more, with respect to 100 parts by mass of the fine fibrous cellulose comprised in the fiber layer. On the other hand, the content of the oxygen-containing organic compound in the fiber layer is preferably 1000 parts by mass or less, more preferably 500 parts by mass or less, further preferably 100 parts by mass or less, and particularly preferably 50 parts by mass or less, with respect to 100 parts by mass of the fine fibrous cellulose comprised in the fiber layer. By setting the content of the oxygen-containing organic compound within the above-described range, a laminated sheet having high transparency and strength can be formed.

(Method for Producing Laminated Sheet)

The method for producing a laminated sheet of the present embodiment preferably comprises a step of forming a fiber layer comprising fibrous cellulose in which the amount of substituents introduced is less than 0.5 mmol/g and the fiber width is 1 to 10 nm, and a step of applying a resin composition onto the fiber layer. Otherwise, the method for producing a laminated sheet of the present embodiment may comprise a step of applying, onto the resin layer, an fine fibrous cellulose-dispersed solution comprising fibrous cellulose in which the amount of substituents introduced is less than 0.5 mmol/g and the fiber width is 1 to 10 nm.

In the step of applying a resin composition onto the fiber layer, or upon the formation of a resin layer, it is preferable that a resin composition comprising a resin is applied onto the fiber layer to form a coated film, and that a drying step is then established.

As a method for producing the laminated sheet, a method of placing a resin layer on a fiber layer and then performing hot pressing on them is also applied, as well as the aforementioned method. Moreover, a method which comprises disposing a fiber layer in a mold for use in injection molding, injecting a heated and melted resin into the mold, and conjugating the resin layer with the fiber layer is also applied.

The step of forming a fiber layer comprising fibrous cellulose, in which the amount of substituents introduced is less than 0.5 mmol/g and the fiber width is 1 to 10 nm, preferably comprises a step of applying a dispersed solution comprising the aforementioned fine fibrous cellulose (i.e. an fine fibrous cellulose-containing slurry) onto a base material, or a step of papermaking from the fine fibrous cellulose-dispersed solution. Moreover, when an fine fibrous cellulose-dispersed solution comprising fibrous cellulose having a fiber width of 1000 nm or less is applied onto a resin layer, the base material may be changed to the resin layer, and then, the after-mentioned coating method may be adopted.

It is to be noted that the fine fibrous cellulose-dispersed solution (i.e. the fine fibrous cellulose-containing slurry) may comprise optional components contained in the fiber layer, and the nanofiber yield, haze, pH, viscosity, free nitrogen amount, and the like of the fine fibrous cellulose-dispersed solution are preferably within the numerical ranges described in the aforementioned section <Fine fibrous cellulose>.

<Coating Step>

The step of applying an fine fibrous cellulose-dispersed solution (i.e. an fine fibrous cellulose-containing slurry) onto a base material (hereinafter also referred to as a "coating step") is a step of applying an fine fibrous cellulose-dispersed solution onto a base material, and then peeling from the base material, an fine fibrous cellulose-containing sheet formed by drying the fine fibrous cellulose-dispersed solution, so as to obtain a sheet. Using a coating apparatus and a long base material, the sheets can be continuously produced. The concentration of the fine fibrous cellulose-dispersed solution applied is not particularly limited, and it is preferably 0.05% by mass or more and 5% by mass or less.

The quality of the base material used in the coating step is not particularly limited. Although a base material having higher wettability to the fine fibrous cellulose-dispersed solution is preferable because shrinkage of the sheet or the like upon drying is suppressed, it is preferable to select one from which a sheet formed after drying can be easily detached. Of these, a resin plate or a metal plate is preferable, without particular limitation. Examples of the base material that can be used herein include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the fine fibrous cellulose-dispersed solution has a low viscosity and spreads on the base material in the coating step, a damming frame may be fixed and used on the base material in order to obtain an fine fibrous cellulose-containing sheet having a predetermined thickness and basis weight. The quality of the damming frame is not particularly limited, and it is preferable to select ones from which edges of the sheet adhere after drying can be easily detached. Of these, frames formed from resin plates or metal plates are preferable, without particular limitation. Example thereof that can be used herein include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates.

Examples of a coater for applying the fine fibrous cellulose-dispersed solution that can be used herein include bar coaters, roll coaters, gravure coaters, die coaters, curtain coaters, and air doctor coaters. Bar coaters, die coaters, curtain coaters, and spray coaters are preferable because more even thickness can be provided.

The coating temperature is not particularly limited, and it is preferably 20° C. or higher and 45° C. or lower. When the coating temperature is equal to or higher than the above-described lower limit value, it is possible to easily apply the fine fibrous cellulose-dispersed solution. When the coating temperature is equal to or lower than the above-described upper limit value, it is possible to prevent volatilization of the dispersion medium upon coating.

In the coating step, it is preferable to apply the fine fibrous cellulose-dispersed solution so as to achieve a finished basis weight of the sheet of 10 g/m$^2$ or more and 100 g/m$^2$ or less. By applying the dispersed solution so as to achieve a basis weight that is within the above-described range, a fiber layer having excellent strength can be obtained.

The step of producing an fine fibrous cellulose-containing sheet preferably includes a step of drying the fine fibrous cellulose-dispersed solution applied onto the base material. The drying method is not particularly limited, and any of a contactless drying method and a method of drying the sheet while locking the sheet may be used, or these methods may also be used in combination.

The contactless drying method is not particularly limited, and a method for drying by heating with hot air, infrared radiation, far-infrared radiation, or near-infrared radiation (a drying method by heating) or a method for drying in vacuum (a vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited, and it is preferably 20° C. or higher and 150° C. or lower, and more preferably 25° C. or higher and 105° C. or lower. At the heating temperature equal to or higher than the above-described lower limit value, the dispersion medium can be rapidly volatilized. At the heating temperature equal to or lower than the above-described upper limit value, cost required for the heating can be reduced, and the thermal discoloration of the fine fibrous cellulose can be suppressed.

After the drying, the fine fibrous cellulose-containing sheet is detached from the base material. When the base material is a sheet, the fine fibrous cellulose-containing sheet and base material may be rolled up while they are laminated, and the fine fibrous cellulose-containing sheet may be detached from the base material immediately before the use of the fine fibrous cellulose-containing sheet. Thus, an fine fibrous cellulose-containing sheet serving as a fiber layer is obtained.

It is to be noted that, in the above-described step of applying a resin composition on a fiber layer, the resin composition is preferably applied onto the surface of the fine fibrous cellulose-containing sheet on the side that has been detached from the base material. Thereby, the interlayer adhesiveness between the fiber layer and the resin layer can be further enhanced.

<Papermaking Step>

The step of producing the fine fibrous cellulose-containing sheet that serves as a fiber layer may include a step of papermaking from an fine fibrous cellulose-dispersed solution. Examples of a paper machine used in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the fine fibrous cellulose-dispersed solution is wire-filtered and dehydrated to obtain a sheet in a wet state. The concentration of the fine fibrous cellulose-dispersed solution is not particularly limited, and it is preferably 0.05% by mass or more and 5% by mass or less. Upon filtration and dehydration of the fine fibrous cellulose-dispersed solution, filter fabric for filtration is not particularly limited. It is important that fine fibrous cellulose do not pass through filter fabric and the filtration speed is not excessively slow. Such filter fabric is not particularly limited, and a sheet comprising organic polymers, woven fabric, or porous membrane is preferable. Preferred examples of organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm, and woven fabric made of polyethylene terephthalate or polyethylene having a pore size of 0.1 μm or more and 20 μm or less, for example, 1 μm.

A method for producing a sheet from an fine fibrous cellulose-dispersed solution is not particularly limited, and an example thereof is the method disclosed in WO 2011/013567 comprising using a production apparatus. This production apparatus comprises a dewatering section for ejecting an fine fibrous cellulose-dispersed solution onto the upper surface of an endless belt and then dewatering a dispersion medium contained in the ejected fine fibrous cellulose-dispersed solution to form a web and a drying section for drying the web to produce a fiber sheet. The endless belt is provided across from the dewatering section to the drying section, and the web formed in the dewatering section is transferred to the drying section while being placed on the endless belt.

A dehydration method that can be used in the present embodiment is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example a method using a cylinder dryer, a Yankee dryer, hot air drying, a near-infrared heater, or an infrared heater is preferable.

(Laminate)

The present invention may relate to a laminate formed by laminating the aforementioned laminated sheet and an adherend. Besides, when the adherend is disposed on the resin layer side of the laminated sheet, the resin layer in the laminated sheet may function as an adhesive layer. Examples of the adherend may include an organic film (hereinafter also referred to as an "organic layer") and an inorganic film (hereinafter also referred to as an "inorganic layer"). Among others, the laminate of the present embodiment is preferably a laminate formed by laminating the aforementioned laminated sheet and an organic film. Examples of the organic film may include a resin film, a resin plate, and a resin molded body.

Such a resin film, a resin plate, and a resin molded body (hereinafter simply referred to as a "resin film" at times) are layers comprising a natural resin or a synthetic resin as a main component. In this context, the main component refers to a component comprised in 50% by mass or more, with respect to the total mass of the resin film. The content of the resin component is preferably 60% by mass or more, more preferably 70% by mass or more, further preferably 80% by mass or more, and particularly preferably 90% by mass or more, with respect to the total mass of the resin film. It is to be noted that the content of the resin component may also be 100% by mass, with respect to the total mass of the resin film.

Examples of the natural resin may include rosin-based resins, such as rosin, rosin ester and hydrogenated rosin ester.

Examples of the synthetic resin may include polyolefin resins, cyclic olefin resins, polycarbonate resins, polyethylene terephthalate resins, polyethylene naphthalate resins, polyimide resins, polystyrene resins, and acrylic resins. Among them, the synthetic resin is preferably a polyolefin resin, and preferably has at least one type selected from polyethylene resins and polypropylene resins.

The method of forming the organic layer is not particularly limited. Examples thereof may include a coating method, an injection molding method, and a heating and pressurizing method. In the coating method, it is preferable that a resin composition that forms an organic layer is applied onto the resin layer of the laminated sheet, and that thermosetting or photosetting is then performed thereon. In the heating and pressurizing method, hot pressing is preferably performed on a resin film that is placed on the resin layer of the laminated sheet. Hot pressing conditions applied herein can be selected, as appropriate, with reference to the glass transition temperature of the resin film, etc.

The substance that constitutes the inorganic layer is not particularly limited and examples thereof include aluminum, silicon, magnesium, zinc, tin, nickel, and titanium; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, or mixtures thereof are preferable.

The method of forming the inorganic layer is not particularly limited, and examples of the method may include Chemical Vapor Deposition (CVD) and Physical Vapor Deposition (PVD). Specific examples of the CVD method may include plasma CVD, which utilizes plasma, and Catalyst Chemical Vapor Deposition (Cat-CVD) including catalytically cracking material gas using a heated catalyzer. Specific examples of PVD methods may include vacuum deposition, ion plating, and sputtering. Moreover, as a method of forming the inorganic layer, Atomic Layer Deposition (ALD) can also be adopted. The ALD method is a method of forming a thin film at an atomic layer unit by alternately supplying the raw material gases of individual elements constituting a film to be formed, to the surface on which a layer is to be formed.

(Intended Use)

The intended use of the fine fibrous cellulose of the present embodiment is not particularly limited. Examples of the intended use may include a concrete precursor (a precursor agent for concrete pumping), a lubricant, a mold molding composition, a dental material, a polishing agent, a release agent, a papermaking additive, a metal surface treatment agent, a resin surface treatment agent, an oil drilling agent, an adhesive, a cleaner, an electrode/separator for use in batteries/condensers, an anti-freezing agent, a friction resistance reducing agent for pipes, a filter, an air freshener/deodorant, an asphalt, an absorbent article, a hydrolysable sheet, an antibacterial agent, an insecticide/insect repellent, and an agricultural chemical. Among these, the fine fibrous cellulose of the present embodiment are preferably for use in concrete precursors (precursor agents for concrete pumping), lubricants, mold molding compositions, dental materials, polishing agents, release agents, and papermaking additives.

Moreover, the present embodiment may also relate to a concrete precursor (a precursor agent for concrete pumping), a lubricant, a mold molding composition, a dental material, a polishing agent, a release agent, and a papermaking additive, each of which comprises the aforementioned fine fibrous cellulose.

Furthermore, the laminated sheet of the present embodiment is a transparent laminated sheet having mechanical strength, in which coloring is suppressed. From the viewpoint of utilizing such excellent optical properties, the laminated sheet of the present embodiment is suitably used for optical members. For example, the present laminated sheet can be used for intended uses such as light transmissive substrates for various display devices, various solar cells, and the like. Further, the laminated sheet of the present embodiment is also suitable for intended uses, such as substrates of electronic devices, components of consumer electronics, window materials of various types of vehicles or buildings, interior materials, exterior materials, and wrapping materials.

EXAMPLES

Hereinafter, the features of the present invention will be more specifically described with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Production Example 1

[Phosphorylation Treatment]

The broad-leaf dissolving pulp (dry sheet) manufactured by Oji Paper Co., Ltd. was used as a raw material pulp. A phosphorylation treatment was performed on this raw material pulp as follows. First, a mixed aqueous solution of ammonium dihydrogen phosphate and urea was added to 100 parts by mass (absolute dry mass) of the above raw material pulp, and the obtained mixture was adjusted to result in 45 parts by mass of the ammonium dihydrogen phosphate, 120 parts by mass of the urea and 150 parts by mass of water, so as to obtain a chemical solution-impregnated pulp. Subsequently, the obtained chemical solution-impregnated pulp was heated with a hot air drying device of 165° C. for 250 seconds, so that phosphoric acid groups were introduced into cellulose in the pulp, thereby obtaining a phosphorylated pulp.

[Washing Treatment]

Subsequently, a washing treatment was performed on the obtained phosphorylated pulp. The washing treatment was carried out by repeating the operation to pour 10 L of ion exchange water onto 100 g (absolute dry mass) of the phosphorylated pulp to obtain a pulp dispersed solution, which was then uniformly dispersed by stirring, followed by filtration and dehydration. The washing was terminated at a time point at which the electric conductivity of the filtrate became 100 μS/cm or less.

[Neutralization Treatment]

Subsequently, a neutralization treatment was performed on the phosphorylated pulp after the washing as follows. First, the phosphorylated pulp after the washing was diluted with 10 L of ion exchange water, and then, while stirring, a 1 N sodium hydroxide aqueous solution was slowly added to the diluted solution to obtain a phosphorylated pulp slurry having a pH value of 12 or more and 13 or less. Thereafter, the phosphorylated pulp slurry was dehydrated, so as to obtain a neutralization-treated phosphorylated pulp. Subsequently, the above-described washing treatment was performed on the phosphorylated pulp after the neutralization treatment.

The infrared absorption spectrum of the thus obtained phosphorus oxoacid pulp was measured by FT-IR. As a result, absorption based on P=O of the phosphoric acid groups was observed around 1230 $cm^{-1}$, and thus, addition of the phosphoric acid groups to the pulp was confirmed. Moreover, the obtained phosphorylated pulp was analyzed using an X-ray diffractometer. As a result, it was confirmed that there were typical peaks at two positions near 2θ=14° or more and 17° or less, and near 2θ=22° or more and 23° or less. Thus, the phosphorylated pulp was confirmed to have cellulose type I crystals.

[Defibration Treatment]

Ion exchange water was added to the obtained phosphorylated pulp, so as to prepare a slurry having a solid concentration of 2% by mass. This slurry was treated using a high-pressure homogenizer (manufactured by Sugino Machine Limited, Star Burst) at a pressure of 200 MPa six times, so as to obtain an fine fibrous cellulose-dispersed solution comprising fine fibrous cellulose. It was confirmed according to X-ray diffraction that these fine fibrous cellulose maintained cellulose type I crystals. It is to be noted that the amount of phosphoric acid groups (the first amount of dissociated acid) measured by the measurement method described in the after-mentioned [Amount of phosphorus oxoacid groups] was 1.45 mmol/g. Besides, the total amount of dissociated acid was 2.45 mmol/g.

Production Example 2

A phosphorylated pulp and an fine fibrous cellulose-dispersed solution comprising fine fibrous cellulose were obtained in the same manner as that of Production Example 1, with the exception that the following nitrogen removal treatment was carried out after completion of the washing treatment and the neutralization treatment performed on the phosphorylated pulp.

[Nitrogen Removal Treatment]

Ion exchange water was added to the phosphorylated pulp to prepare a slurry having a solid concentration of 4% by mass. To this slurry, 48% by mass of a sodium hydroxide aqueous solution was added, so that the pH thereof was adjusted to pH 13.4, and the slurry was then heated under conditions of a liquid temperature of 85° C. Thereafter, this pulp slurry was dehydrated, and thereafter, a pulp dispersed solution obtained by pouring 10 L of ion exchange water to 100 g (absolute dry mass) of the phosphorylated pulp was stirred so that the pulp was uniformly dispersed, followed by filtration dehydration. This operation was repeatedly carried out to remove redundant sodium hydroxide. The removal was terminated at a time point at which the electric conductivity of the filtrate became 100 μS/cm or less.

The infrared absorption spectrum of the thus obtained phosphorus oxoacid pulp was measured by FT-IR. As a result, absorption based on P=O of the phosphoric acid groups was observed around 1230 $cm^{-1}$, and thus, addition of the phosphoric acid groups to the pulp was confirmed. In addition, it was confirmed according to X-ray diffraction that the obtained fine fibrous cellulose maintained cellulose type I crystals. It is to be noted that the amount of phosphoric acid groups (the first amount of dissociated acid) measured by the measurement method described in the after-mentioned [Amount of phosphorus oxoacid groups] was 1.35 mmol/g. Besides, the total amount of dissociated acid was 2.30 mmol/g.

Production Example 3

[Treatment with Phosphorus Acid]

A phosphorus oxoacid pulp and an fine fibrous cellulose-dispersed solution comprising fine fibrous cellulose were obtained in the same manner as that of Production Example 1, with the exception that 33 parts by mass of phosphorous acid (phosphonic acid) was used instead of ammonium dihydrogen phosphate in the phosphorylation treatment.

The infrared absorption spectrum of the thus obtained phosphorylated pulp was measured by FT-IR. As a result, absorption based on P=O of the phosphonic acid groups as tautomers of phosphorus acid groups was observed around 1210 $cm^{-1}$, and thus, addition of the phosphorus acid groups (phosphonic acid groups) to the pulp was confirmed. In addition, it was confirmed according to X-ray diffraction that the obtained fine fibrous cellulose maintained cellulose type I crystals. It is to be noted that the amount of phosphorus acid groups (the first amount of dissociated acid) measured by the measurement method described in the after-mentioned [Amount of phosphorus oxoacid groups] was 1.51 mmol/g, and that the total amount of dissociated acid was 1.54 mmol/g.

Production Example 4

[Sulfation Treatment]

A sulfated pulp and an fine fibrous cellulose-dispersed solution comprising fine fibrous cellulose were obtained by performing the same operations as those of Production Example 1, with the exceptions that 38 parts by mass of amidosulfuric acid (sulfamic acid) was used instead of ammonium dihydrogen phosphate in the phosphorylation treatment, and that the heating time was extended to 19 minutes.

The infrared absorption spectrum of the thus obtained sulfated pulp was measured by FT-IR. As a result, absorption based on sulfuric acid groups (sulfone groups) was observed around 1220-1260 $cm^{-1}$, and thus, addition of the sulfuric acid groups (sulfone groups) to the pulp was confirmed. In addition, it was confirmed according to X-ray diffraction that the obtained fine fibrous cellulose maintained cellulose type I crystals. It is to be noted that the amount of sulfone groups measured by the measurement method described in the after-mentioned [Measurement of amount of sulfone groups] was 1.12 mmol/g.

Production Example 5

A xanthated pulp and an fine fibrous cellulose-dispersed solution comprising fine fibrous cellulose were obtained by performing the same operations as those of Production Example 1, with the exception that the following xanthation treatment was carried out instead of the phosphorylation treatment.

[Xanthation Treatment]

To 100 parts by mass (absolute dry mass) of a raw material pulp (the broad-leaf dissolving pulp (dry sheet) manufactured by Oji Paper Co., Ltd.), 2500 parts by mass of 8.5% by mass of a sodium hydroxide aqueous solution was added, and the obtained mixture was then stirred at room temperature for 3 hours to perform an alkali treatment. After completion of this alkali treatment, the pulp was subjected to centrifugation (filter cloth: 400 meshes, 3000 rpm, 5 minutes) for solid-liquid separation, thereby obtaining a dehydration product of alkali cellulose. Thereafter, 3.5 parts by mass of carbon disulfide was added to 10 parts by mass (absolute dry mass) of the obtained alkali cellulose, and a sulfurization reaction was then promoted at room temperature for 4.5 hours to perform a xanthation treatment.

It was confirmed according to X-ray diffraction that the obtained fine fibrous cellulose maintained cellulose type I crystals. It is to be noted that the amount of xanthate groups measured by the measurement method described in the after-mentioned [Measurement of amount of xanthate groups] was 1.73 mmol/g.

Production Example 6

Ion exchange water was added to a raw material pulp (the broad-leaf dissolving pulp (dry sheet) manufactured by Oji Paper Co., Ltd.) to prepare a slurry having a solid concentration of 2% by mass. This slurry was treated with a high-pressure homogenizer (manufactured by Sugino Machine Limited, Star Burst) at a pressure of 200 MPa 30 times, so as to obtain a cellulose-dispersed solution comprising coarse fibrous cellulose having a fiber width of more than 1000 nm.

TABLE 1

| | Chemical modification | Nitrogen removal | Substituent amount [mmol/g] | Number average fiber width [nm] | Liquid haze [%] | Nanofiber yield [%] | Carbamide group amount [mmol/g] | Nitrogen amount [mmol/g] |
|---|---|---|---|---|---|---|---|---|
| Production Ex. 1 | Ultrafine cellulose fibers | Phosphorylation | No | 1.45 | 3 | 0.4 | 99.2 | 0.09 | 0.09 |
| Production Ex. 2 | Ultrafine cellulose fibers | Phosphorylation | Yes | 1.35 | 3 | 0.4 | 99.8 | 0.01 | 0.01 |
| Production Ex. 3 | Ultrafine cellulose fibers | Treatment with phosphorus acid | No | 1.51 | 3 | 0.4 | 99.5 | 0.09 | 0.09 |
| Production Ex. 4 | Ultrafine cellulose fibers | Sulfation | No | 1.12 | 3 | 0.6 | 99.3 | 0.09 | 0.09 |
| Production Ex. 5 | Ultrafine cellulose fibers | xanthation | No | 1.73 | 3 | 0.8 | 99.1 | 0.00 | 0.00 |
| Production Ex. 6 | Coarse cellulose fibers | Not modified | No | 0.00 | 150 | 86.3 | 7.8 | 0.00 | 0.00 |

Example 1

[Substituent Removal Treatment (High-Temperature Heat Treatment)]

To the fine fibrous cellulose-dispersed solution obtained in Production Example 1, an aqueous solution of 20% by mass of citric acid was added, so that the pH of the dispersed solution was adjusted to pH 5.5. The obtained slurry was placed in a pressure-resistant vessel, and was then heated at a liquid temperature of 160° C. for 15 minutes, until the amount of phosphoric acid groups became 0.08 mmol/g. Generation of an fine fibrous cellulose aggregate was confirmed by this operation.

[Washing Treatment of Substituent-Removed Slurry]

To the heated slurry, ion exchange water was added in an amount equal to that of the slurry, so as to prepare a slurry having a solid concentration of about 1% by mass. The operation of stirring the slurry and then subjecting the resulting slurry to filtration dehydration was repeatedly carried out to wash the slurry. At a time point at which the electric conductivity of the filtrate became 10 μS/cm or less, ion exchange water was added again to prepare a slurry having a solid concentration of about 1% by mass, which was then left at rest for 24 hours. Thereafter, the filtration dehydration operation was further repeatedly carried out, and the washing was terminated at a time point at which the electric conductivity of the filtrate became 10 μS/cm or less again. Ion exchange water was added to the obtained fine fibrous cellulose aggregate, thereby obtaining a substituent-removed slurry. The solid concentration of this slurry was 1.7% by mass.

[Uniform Dispersion of Substituent-Removed Slurry]

Ion exchange water was added to the obtained substituent-removed slurry to prepare a slurry having a solid concentration of 1.0% by mass. The pH of this slurry was pH 5.5. The slurry was treated with a high-pressure homogenizer (manufactured by Sugino Machine Limited, Star Burst) at a pressure of 200 MPa three times, so as to obtain a substituent-removed fine fibrous cellulose-dispersed solution comprising substituent-removed fine fibrous cellulose. The number average fiber width of the substituent-removed fine fibrous cellulose measured in the after-mentioned [Measurement of fiber width] was 4 nm, and the percentage of fine fibrous cellulose having a fiber width of 10 nm or less in all of the fibrous cellulose comprised in the dispersed solution was 98%.

[Sheet Production 1]

Acetoacetyl group-modified polyvinyl alcohol (manufactured by Mitsubishi Chemical Corporation, Gosenex Z-200) was added to ion exchange water to a concentration of 12% by mass, and the obtained mixture was then stirred at 95° C. for 1 hour for dissolution. According to the above procedures, a polyvinyl alcohol aqueous solution was obtained.

The substituent-removed fine fibrous cellulose-dispersed solution and the above-described polyvinyl alcohol aqueous solution were each diluted with ion exchange water to result in a solid concentration of 0.6% by mass. Subsequently, 30 parts by mass of the diluted polyvinyl alcohol aqueous solution was mixed into 70 parts by mass of the diluted substituent-removed fine fibrous cellulose-dispersed solution to obtain a mixed solution. Further, the mixed solution was weighed, so that the finished basis weight of a sheet became 35 g/m$^2$, and was then spread on a commercially available acrylic plate. Besides, in order to obtain the predetermined basis weight, a damming frame (inside dimension: 250 mm×250 mm, height: 5 cm) was arranged on the acrylic plate. Thereafter, the solution was dried with a dryer at 70° C. for 24 hours, and the resultant was then peeled from the above-described acrylic plate to obtain a substituent-removed fine fibrous cellulose-containing sheet. The thickness of the sheet was 25 μm.

Example 2

A substituent-removed fine fibrous cellulose-dispersed solution and a substituent-removed fine fibrous cellulose-containing sheet were obtained in the same manner as that of Example 1, with the exception that the substituent removal treatment was carried out at a liquid temperature of 85° C. for 5 days.

Example 3

The fine fibrous cellulose-dispersed solution obtained in Production Example 1 was diluted to a concentration of 0.7% by mass, and a substituent removal treatment was then carried out. After completion of the washing treatment step following the removal of substituents, ion exchange water was added to the obtained fine fibrous cellulose aggregate to obtain a slurry having a solid concentration of 1.0% by mass. Except for these conditions, a substituent-removed fine fibrous cellulose-dispersed solution and a substituent-removed fine fibrous cellulose-containing sheet were obtained in the same manner as that of Example 1.

Example 4

A substituent-removed fine fibrous cellulose-dispersed solution and a substituent-removed fine fibrous cellulose-containing sheet were obtained in the same manner as that of Example 1, with the exception that the substituent removal treatment was carried out at a liquid temperature of 160° C. for 40 minutes until the amount of phosphoric acid groups became 0.05 mmol/g.

Example 5

A substituent-removed fine fibrous cellulose-dispersed solution and a substituent-removed fine fibrous cellulose-containing sheet were obtained in the same manner as that of Example 1, with the exception that the substituent removal treatment was carried out at a liquid temperature of 150° C. for 15 minutes until the amount of phosphoric acid groups became about 0.21 mmol/g.

Example 6

A substituent-removed fine fibrous cellulose-dispersed solution and a substituent-removed fine fibrous cellulose-containing sheet were obtained in the same manner as that of Example 1, with the exception that the substituent removal treatment was carried out at a liquid temperature of 140° C. for 20 minutes until the amount of phosphoric acid groups became about 0.40 mmol/g.

Example 7

A substituent-removed fine fibrous cellulose-dispersed solution and a substituent-removed fine fibrous cellulose-containing sheet were obtained in the same manner as that of Example 1, with the exceptions that the pH of the fine fibrous cellulose-dispersed solution to be subjected to the substituent removal treatment was adjusted to pH 2.4, and that the pH of the substituent-removed slurry was adjusted to pH 5.5 after completion of the washing treatment. The amount of phosphoric acid groups after the removal of substituents was 0.22 mmol/g.

Example 8

A substituent-removed fine fibrous cellulose-dispersed solution and a substituent-removed fine fibrous cellulose-containing sheet were obtained in the same manner as that of Example 1, with the exceptions that the heat treatment was carried out without adjusting the pH of the fine fibrous cellulose-dispersed solution to be subjected to the substituent removal treatment, and that the pH of the substituent-removed slurry was adjusted to pH 5.5 after completion of the washing treatment. The amount of phosphoric acid groups after the removal of substituents was 0.29 mmol/g.

Example 9

A substituent-removed fine fibrous cellulose-dispersed solution and a substituent-removed fine fibrous cellulose-containing sheet were obtained in the same manner as that of Example 1, with the exception that the substituent-removed slurry was uniformly dispersed using a high-speed defibrator (manufactured by M Technique Co., Ltd., CLEARMIX-11S) under conditions of a circumferential speed of 34 m/sec for 180 minutes.

Example 10

A substituent-removed fine fibrous cellulose-dispersed solution and a substituent-removed fine fibrous cellulose-containing sheet were obtained in the same manner as that of Example 1, with the exceptions that not the heat treatment but the following enzyme treatment was carried out as a substituent removal treatment, and further that the washing treatment of the substituent-removed slurry was carried out by the following method.

[Substituent Removal Treatment (Enzyme Treatment)]

To the obtained fine fibrous cellulose-dispersed solution, an aqueous solution of 20% by mass of citric acid was added, so that the pH of the slurry was adjusted to pH 5.5. To the obtained slurry, acid phosphatase (manufactured by Shin-Nippon Chemical Industrial Co., Ltd., Sumizyme PM) was added in an amount of 3 parts by mass with respect to 100 parts by mass of the fine fibrous cellulose, and an enzyme treatment was then carried out in a hot water bath at 37° C. for 2.5 hours. By this operation, generation of an fine fibrous cellulose aggregate was confirmed.

[Washing Treatment of Slurry after Removal of Substituents by Enzyme Treatment]

To the obtained substituent-removed slurry, ⅕ by volume of a strongly basic ion exchange resin (Amberjet 4400; manufactured by Organo Corporation; conditioned) and ⅕ by volume of a weakly acidic ion exchange resin (Amberlite IRC76; manufactured by Organo Corporation; conditioned) were added, and the resultant mixture was then shaken for 1 hour. Thereafter, the reaction mixture was poured onto a mesh having 90 μm apertures to separate the resin from the slurry, so as to wash the slurry.

Example 11

A substituent-removed fine fibrous cellulose-dispersed solution and a substituent-removed fine fibrous cellulose-containing sheet were obtained in the same manner as that of Example 1, with the exception that the fine fibrous cellulose-dispersed solution obtained in Production Example 2 was used, instead of the fine fibrous cellulose-dispersed solution obtained in Production Example 1.

Example 12

A substituent-removed fine fibrous cellulose-dispersed solution and a substituent-removed fine fibrous cellulose-containing sheet were obtained in the same manner as that of Example 1, with the exception that the fine fibrous cellulose-dispersed solution obtained in Production Example 3 was used, instead of the fine fibrous cellulose-dispersed solution obtained in Production Example 1.

Example 13

A substituent-removed fine fibrous cellulose-dispersed solution and a substituent-removed fine fibrous cellulose-containing sheet were obtained in the same manner as that of Example 1, with the exception that the fine fibrous cellulose-dispersed solution obtained in Production Example 4 was used, instead of the fine fibrous cellulose-dispersed solution obtained in Production Example 1.

Example 14

The fine fibrous cellulose-dispersed solution obtained in Production Example 5 was used, instead of the fine fibrous cellulose-dispersed solution obtained in Production Example 1. Moreover, the after-mentioned substituent removal treatment (low-temperature heat treatment) was carried out, instead of the substituent removal treatment (high-temperature heat treatment). Except for these conditions, a substituent-removed fine fibrous cellulose-dispersed solution and a substituent-removed fine fibrous cellulose-containing sheet were obtained in the same manner as that of Example 1.

[Substituent Removal (Low-Temperature Heat Treatment)]

The obtained fine fibrous cellulose-dispersed solution was heated at a liquid temperature of 40° C. for 45 minutes, until the amount of xanthate groups became 0.08 mmol/g.

Comparative Example 1

An fine fibrous cellulose-containing sheet was obtained by performing the same operations as those in the above [Sheet production 1], with the exception that the fine fibrous cellulose-dispersed solution obtained in Production Example 1 was used instead of the substituent-removed fine fibrous cellulose-dispersed solution in the above [Sheet production 1].

Comparative Example 2

An fine fibrous cellulose-containing sheet was obtained in the same manner as that of Comparative Example 1, with the exception that the fine fibrous cellulose-dispersed solution obtained in Production Example 3 was used.

Comparative Example 3

An fine fibrous cellulose-containing sheet was obtained in the same manner as that of Comparative Example 1, with the exception that the fine fibrous cellulose-dispersed solution obtained in Production Example 4 was used.

Comparative Example 4

An fine fibrous cellulose-containing sheet was obtained in the same manner as that of Comparative Example 1, with the exception that the fine fibrous cellulose-dispersed solution obtained in Production Example 5 was used.

Comparative Example 5

A substituent-removed fine fibrous cellulose-dispersed solution and a substituent-removed fine fibrous cellulose-containing sheet were obtained in the same manner as that of Example 1, with the exception that the substituent removal treatment was carried out at a liquid temperature of 140° C. for 10 minutes, until the amount of phosphoric acid groups became about 0.74 mmol/g.

Comparative Example 6

A sheet comprising coarse fibrous cellulose was obtained in the same manner as that of Comparative Example 1, with the exception that the cellulose-dispersed solution comprising coarse fibrous cellulose obtained in Production Example 6 was used.

Comparative Example 7

A substituent-removed fine fibrous cellulose-dispersed solution and a substituent-removed fine fibrous cellulose-containing sheet were obtained in the same manner as that of Example 1, with the exception that uniform dispersion of the substituent-removed slurry was not carried out.

Comparative Example 8

A substituent-removed fine fibrous cellulose-dispersed solution and a substituent-removed fine fibrous cellulose-containing sheet were obtained in the same manner as that of Example 12, with the exception that uniform dispersion of the substituent-removed slurry was not carried out.

Comparative Example 9

A substituent-removed fine fibrous cellulose-dispersed solution and a substituent-removed fine fibrous cellulose-containing sheet were obtained in the same manner as that of Example 13, with the exception that uniform dispersion of the substituent-removed slurry was not carried out.

Comparative Example 10

A substituent-removed fine fibrous cellulose-dispersed solution and a substituent-removed fine fibrous cellulose-containing sheet were obtained in the same manner as that of Example 14, with the exception that uniform dispersion of the substituent-removed slurry was not carried out.

Comparative Example 11

A substituent-removed fine fibrous cellulose-dispersed solution and a substituent-removed fine fibrous cellulose-containing sheet were obtained in the same manner as that of Example 1, with the exceptions that uniform dispersion of the substituent-removed slurry was not carried out, and that the slurry was stirred using a disperser at 2000 rpm for 10 minutes.

Comparative Example 12

A substituent-removed fine fibrous cellulose-containing sheet was obtained by removing substituents from fine fibrous cellulose that were not in a slurry state but in a sheet state, as described below.
[Sheet Production 2]
To the fine fibrous cellulose-dispersed solution obtained in Production Example 1 before the removal of substituents, glycerin was added in an amount of 15 parts by mass with respect to 100 parts by mass of the fine fibrous cellulose. Besides, the concentration of a slurry was adjusted, so that the solid concentration thereof became 0.5% by mass. The amount of the slurry was weighed, so that the finished basis weight of a sheet became 37.5 g/m², and was then spread on a commercially available acrylic plate, followed by drying in an oven at 50° C. Besides, a damming frame was arranged on the acrylic plate to obtain a predetermined basis weight, so that the obtained sheet became a square. By the above procedures, an fine fibrous cellulose-containing sheet was obtained. The obtained sheet had a thickness of 25 μm and a density of 1.49 g/cm³.
[Substituent Removal Treatment]
A heat resistant rubber sheet (manufactured by Shin-Etsu Chemical Co., Ltd., X-30-4084-U) with a 100 mmφ hole was placed on a stainless steel plate, and 11 mL of ethylene glycol was then filled into the hole. Thereafter, an fine fibrous cellulose-containing sheet that had been cut out into a 5 cm square was immersed in the ethylene glycol, and a stainless steel plate was then placed thereon, which was then equipped into a hot pressing machine (manufactured by Imoto machinery Co., LTD.; manual hydraulic vacuum heating hot pressing) that had been heated to 180° C. As a substituent removal treatment, the sheet was treated at 180° C. for 15 minutes, and the sheet was then immersed in 30 mL of methanol, followed by washing. The washing was repeated three times, and the resulting sheet was then adhered onto a glass, and was then dried by heating at 100° C. for 5 minutes, so as to obtain a substituent-removed fine fibrous cellulose-containing sheet. Besides, the amount of phosphoric acid groups measured by the measurement method described in the after-mentioned [Measurement of amount of phosphoric acid groups in sheet] was less than 0.1 mmol/g.

Comparative Example 13

A substituent-removed fine fibrous cellulose-dispersed solution and a substituent-removed fine fibrous cellulose-containing sheet were obtained in the same manner as that of Example 1, with the exception that the following [Ion exchange resin treatment of substituent-removed slurry] was carried out instead of [Washing treatment of substituent-removed slurry].
[Ion Exchange Resin Treatment of Substituent-Removed Slurry]
Ion exchange water was added to the heated slurry obtained in [Substituent removal treatment (high-temperature heat treatment)] to obtain a slurry having a solid concentration of about 1.1% by mass. To the obtained slurry, ¹⁄₁₀ by volume of a strongly acidic ion exchange resin (Amberjet 1024; manufactured by Organo Corporation; conditioned) and ¹⁄₁₀ by volume of a strongly basic ion exchange resin (Amberjet 4400; manufactured by Organo Corporation; conditioned) were added, and the resultant mixture was then shaken for 1 hour. Thereafter, the reaction mixture was poured onto a mesh having 90-μm apertures to separate the resin from the slurry. The pH of the obtained slurry was pH 3.1.

Comparative Example 14

A substituent-removed fine fibrous cellulose-dispersed solution and a substituent-removed fine fibrous cellulose-containing sheet were obtained in the same manner as that of Comparative Example 13, with the exception that citric acid was not added but urea was added in an amount of ¹⁄₁₀ of the fine fibrous cellulose-dispersed solution in [Substituent removal treatment (high-temperature heat treatment)].
[Evaluation]
The dispersed solutions and the sheets obtained in the above Examples and Comparative Examples were evaluated by the following methods.
[Measurement of Fiber Width]
The fiber width of fibrous cellulose was measured by the following method. Each cellulose fiber-dispersed solution was diluted with water to a cellulose concentration of 0.01% by mass or more and 0.1% by mass or less, and was then casted onto a hydrophilized carbon grid film. After drying, it was stained with uranyl acetate, and was then observed under a transmission electron microscope (TEM; manufactured by JEOL; JEOL-2000EX). At that time, in the obtained image, any vertical or horizontal axis with the image width was created, and the magnification was then adjusted, so that 20 or more fibers intersected against the axis. The observation image satisfying this condition was obtained, and with respect to this image, two longitudinal axes and two horizontal axes were arbitrarily drawn per image. The widths of the fibers intersecting the axes were visually read. Three nonoverlapped observation images were photographed for each dispersed solution, and the values of the fiber widths of the fibers intersecting the two axes were thus read in each image (20 fibers or more×2×3=120 fibers or more). Besides, from the thus obtained fiber width, the number average fiber width was calculated. However, only regarding Production Example 6, the obtained dispersed solution was diluted with water to a cellulose concentration of 0.01% by mass or more and 0.1% by mass or less, and was then casted on a glass, which was then observed under a scanning electron microscope (SEM).

Moreover, according to the following equation, the percentage of fine fibrous cellulose having a fiber width of 10 nm or less was obtained:

Percentage (%) of fine fibrous cellulose having fiber width of 10 nm or less=(number of fine fibrous cellulose having fiber width of 10 nm or less/number of all fibrous cellulose)×100.

[Measurement of Amount of Phosphorus Oxoacid Group]

In the measurement of the amount of phosphorus oxoacid groups (the amount of phosphoric acid groups or phosphorus acid groups), first, ion exchange water was added to the fine fibrous cellulose as targets, so as to prepare a slurry having a solid concentration of 0.2% by mass. The amount of phosphorus oxoacid groups was measured by treating the obtained slurry with an ion exchange resin, and then performing titration using alkali.

In the treatment with the ion exchange resin, 1/10 by volume of a strongly acidic ion exchange resin (Amberjet 1024; manufactured by Organo Corporation; conditioned) was added to the aforementioned fine fibrous cellulose-containing slurry, and the resultant mixture was then shaken for 1 hour. Then, the mixture was poured onto a mesh having 90-μm apertures to separate the resin from the slurry.

In the titration using alkali, a change in the pH value shown by the fine fibrous cellulose-containing slurry after the treatment with the ion exchange resin the slurry was measured, while adding an aqueous solution of 0.1 N sodium hydroxide in each amount of 10 μL for every 5 seconds to the slurry. It is to be noted that the titration was carried out, while nitrogen gas was blown into the slurry from 15 minutes before initiation of the titration. According to this neutralization titration, in a curve formed by plotting pH values measured with respect to the amount of alkali added, two points are confirmed, in which an increment (a derivative of pH with respect to the amount of alkali added dropwise) becomes maximum. Regarding these two points, a maximum point of an increment firstly obtained after addition of alkali is referred to as a first end point, whereas a maximum point of an increment subsequently obtained after addition of alkali is referred to as a second end point (FIG. 1). The amount of alkali required from initiation of the titration until the first end point becomes equal to the first amount of dissociated acid in the slurry used in the titration. In addition, the amount of alkali required from initiation of the titration until the second end point becomes equal to the total amount of dissociated acid in the slurry used in the titration. Besides, the value obtained by dividing the amount of alkali required from initiation of the titration until the first end point by a solid content (g) in the slurry to be titrated was defined to be the first amount of dissociated acid (mmol/g). In addition, the value obtained by dividing the amount of alkali required from initiation of the titration until the second end point by a solid content (g) in the slurry to be titrated was defined to be the amount of phosphorus oxo acid groups (mmol/g).

Besides, when the amount of phosphorus oxoacid groups in a pulp was measured, ion exchange water was added to the phosphorus oxoacid pulp to prepare a slurry having a solid concentration of 2% by mass, and this slurry was then treated with a high-pressure homogenizer (manufactured by Sugino Machine Limited, Star Burst) at a pressure of 200 MPa six times, so as to obtain a dispersed solution. Thereafter, titration using alkali was carried out on the obtained dispersed solution by the same method as described above.

[Measurement of Amount of Sulfone Groups]

The amount of sulfone groups was measured as follows. The fine fibrous cellulose were frozen in a freezer, and were then dried in a freeze-dryer (manufactured by Labconco, FreeZone) for 3 days. The obtained freeze-dried product was subjected to a pulverization treatment using a hand mixer (manufactured by OSAKA CHEMICAL Co., Ltd., Labo Milser PLUS) at a rotation number of 20,000 rpm for 60 seconds, so that it was converted to powders. After completion of the freeze-drying and the pulverization treatment, the sample was subjected to pressurized heat decomposition using nitric acid in a hermetically sealed vessel. Thereafter, the resultant was diluted, as appropriate, and the amount of sulfur was then measured by ICP-OES. The obtained value was divided by the absolute dry mass of the tested fine fibrous cellulose, and the thus calculated value was defined to be the amount of sulfuric acid ester groups (unit: mmol/g).

[Measurement of Amount of Xanthate Groups]

The amount of xanthate groups was measured by a Bredee method. Specifically, 40 mL of a saturated ammonium chloride solution was added to 1.5 parts by mass (absolute dry mass) of fibrous cellulose, and they were fully mixed with each other, while crushing the sample with a glass rod. Thereafter, the sample was left for about 15 minutes, and was then filtrated with a GFP filter (GS-25 manufactured by ADVANTEC), and the resultant was fully washed with a saturated ammonium chloride solution. Subsequently, the sample, together with the GFP filter, was placed in a 500-mL tall beaker, and 50 mL of a 0.5 M sodium hydroxide solution (5° C.) was added thereto, followed by stirring. The obtained mixture was left for 15 minutes. Thereafter, a phenolphthalein solution was added to the reaction mixture until the solution became pink, and 1.5 M acetic acid was then added thereto. The time point at which the pink solution was converted to a colorless solution was defined to be a neutralization point. After neutralization, 250 mL of distilled water was added to the solution, and the mixture was then fully stirred. Thereafter, 10 mL of 1.5 M acetic acid and 10 mL of a 0.05 mol/L iodine solution were added to the reaction mixture, using a Volumetric pipette. After that, the thus obtained solution was titrated with a 0.05 mol/L sodium thiosulfate solution, and then, using the amount of sodium thiosulfate titrated and the absolute dry mass of fibrous cellulose, the amount of xanthate groups was calculated according to the following equation:

Amount (mmol/g) of xanthate groups=(0.05×10×2−0.05×amount (mL) of sodium thiosulfate titrated)/1000/absolute dry mass (g) of fibrous cellulose.

[Measurement of Amount of Phosphoric Acid Groups in Sheet]

The concentration of phosphorus atoms in the sheet was measured according to a fluorescent X-ray analysis. Specifically, the intensity of the characteristic X-ray of phosphorus atoms, which were released when outer-shell electrons transfer to vacancy generated by excitation of the core electrons of the phosphorus atoms upon irradiation of X-ray to the sheet, was measured, and the concentration of the phosphorus atoms was then calculated from a calibration curve produced by the following method. That is, the calibration curve was produced by producing a sheet from an fine fibrous cellulose-dispersed solution, in which the amount of phosphoric acid groups had already been known, then performing a fluorescent X-ray analysis, and then obtaining the plots of the characteristic X-ray intensity of the phosphorus atoms and the amount of phosphoric acid groups.

[Measurement of Haze of Dispersed Solution]

A cellulose fiber-dispersed solution was diluted with ion exchange water to a concentration of 0.2% by mass, and the haze of the dispersed solution was measured with a hazemeter (manufactured by MURAKAMI COLOR RESEARCH LABORATORY Co., Ltd.; HM-150) in accordance with JIS K 7136: 2000, using a liquid glass cell having an optical path length of 1 cm (manufactured by Fujiwara Scientific Company Co., Ltd., MG-40, inverse optical path). Besides, the zero point was measured with ion exchange water which was placed in the same glass cell. The dispersed solution as a measurement target was left at rest under the environment of 23° C. and a relative humidity of 50% for 24 hours, before the measurement. The liquid temperature of the dispersed solution upon the measurement was set to be 23° C.

[Measurement of Nanofiber Yield]

The nanofiber yield after centrifugation of the cellulose fiber-dispersed solution was measured by the following method. The nanofiber yield serves as an indicator of the yield of the fine fibrous cellulose. As the nanofiber yield increases, the yield of the fine fibrous cellulose becomes high. Each dispersed solution was adjusted to a cellulose concentration of 0.1% by mass, and it was then centrifuged using a cooled high-speed centrifugal separator (manufactured by KOKUSAN Co. Ltd., H-2000B) under conditions of 12000 G and 10 minutes. The obtained supernatant was recovered, and the cellulose concentration in the supernatant was then measured. The yield of the fine fibrous cellulose was obtained according to the following equation:

Nanofiber yield (% by mass)=cellulose concentration (% by mass) in supernatant/0.1×100.

[Measurement of Nitrogen Amount]

The total amount of nitrogen contained in the fine fibrous cellulose and free nitrogen contained in the fine fibrous cellulose-dispersed solution was measured by the following method. Each dispersed solution was adjusted to a solid concentration of 1% by mass, and was then decomposed by a Kjeldahl method (JIS K 0102: 2016 44.1). After completion of the decomposition, the ammonium ion content (mmol) was measured by cation chromatography, and the obtained value was then divided by the amount (g) of cellulose used in the measurement to calculate the nitrogen content (mmol/g).

[Measurement of Carbamide Groups]

A sample obtained by freeze-drying a slurry comprising fibrous cellulose (fine fibrous cellulose and coarse fibrous cellulose) and then pulverizing the resultant was subjected to a trace nitrogen analysis, so as to measure the amount of carbamide groups. The amount (mmol/g) of carbamide groups introduced per unit mass of the fine fibrous cellulose was calculated by dividing the nitrogen content (g/g) per unit mass of the fine fibrous cellulose obtained by the trace nitrogen analysis by the atomic weight of nitrogen.

[Measurement of Total Light Transmittance of Sheet]

The total light transmittance of the sheet was measured in accordance with JIS K 7361-1: 1997, using a hazemeter (manufactured by MURAKAMI COLOR RESEARCH LABORATORY Co., Ltd.; HM-150).

[Measurement of Haze of Sheet]

The haze of the sheet was measured in accordance with JIS K 7136: 2000, using a hazemeter (manufactured by MURAKAMI COLOR RESEARCH LABORATORY Co., Ltd.; HM-150).

[Measurement of Yellowness Index Values of Sheet Before and After Heating]

The yellowness index values of the sheet before and after heating were measured in accordance with JIS K 7373: 2006, using Colour Cute i (manufactured by Suga Test Instruments Co., Ltd.). Besides, the yellowness index after heating was defined to be the yellowness index of the sheet that was heated at 160° C. for 6 hours. The measured yellowness index was converted to a YI value at a thickness of 50 µm according to the following equation:

YI value at thickness of 50 µm=YI value (measured value) of sheet×[50/sheet thickness (µm)].

Herein, the thickness of the sheet was measured according to the following method, using a stylus-type constant pressure thickness measuring device (manufactured by Mahr TECLOCK CORPORATION, Millitron 1202DPG-02). That is, a sheet that had been cut out into a size of 50 mm square or more was subjected to humidity conditioning under conditions of 23° C. and a relative humidity of 50% for 24 hours, then, the thicknesses of any given 4 points were measured, and the mean value of the obtained values was defined to be the thickness of a sheet.

In addition, from the yellowness index values of the sheet before and after heating, a YI increase percentage was calculated according to the following equation:

YI increase percentage (%)=(yellowness index of sheet after heating yellowness index of sheet before heating)/yellowness index of sheet before heating×100.

TABLE 2

| | | | Substituent removal method/treatment after removal | | | |
|---|---|---|---|---|---|---|
| | Production Examples | pH Adjustment | State | Temperature [° C.] | Concentration [%] | Treatment after removal | pH upon treatment after removal |
| Ex. 1 | Production Ex. 1 | pH 5.5 | Slurry | 160 | 2 | High-pressure homogenizer | pH 5.5 |
| Ex. 2 | Production Ex. 1 | pH 5.5 | Slurry | 85 | 2 | High-pressure homogenizer | pH 5.5 |
| Ex. 3 | Production Ex. 1 | pH 5.5 | Slurry | 160 | 0.7 | High-pressure homogenizer | pH 5.5 |
| Ex. 4 | Production Ex. 1 | pH 5.5 | Slurry | 160 | 2 | High-pressure homogenizer | pH 5.5 |
| Ex. 5 | Production Ex. 1 | pH 5.5 | Slurry | 150 | 2 | High-pressure homogenizer | pH 5.5 |
| Ex. 6 | Production Ex. 1 | pH 5.5 | Slurry | 140 | 2 | High-pressure homogenizer | pH 5.5 |
| Ex. 7 | Production Ex. 1 | pH 2.4 | Slurry | 160 | 2 | High-pressure homogenizer | pH 5.5 |
| Ex. 8 | Production Ex. 1 | Non (pH 8.8) | Slurry | 160 | 2 | High-pressure homogenizer | pH 5.5 |
| Ex. 9 | Production Ex. 1 | pH 5.5 | Slurry | 160 | 2 | CLEARMIX | pH 5.5 |

TABLE 2-continued

Substituent removal method/treatment after removal

| | Production Examples | pH Adjustment | State | Temperature [° C.] | Concentration [%] | Treatment after removal | pH upon treatment after removal |
|---|---|---|---|---|---|---|---|
| Ex. 10 | Production Ex. 1 | pH 5.5 | Slurry | 37 (Enzyme) | 2 | High-pressure homogenizer | pH 5.5 |
| Ex. 11 | Production Ex. 2 | pH 5.5 | Slurry | 160 | 2 | High-pressure homogenizer | pH 5.5 |
| Ex. 12 | Production Ex. 3 | pH 5.5 | Slurry | 160 | 2 | High-pressure homogenizer | pH 5.5 |
| Ex. 13 | Production Ex. 4 | pH 5.5 | Slurry | 160 | 2 | High-pressure homogenizer | pH 5.5 |
| Ex. 14 | Production Ex. 5 | Non (pH 8.8) | Slurry | 40 | 2 | High-pressure homogenizer | PH 8.3 |
| Comp. Ex. 1 | Production Ex. 1 | — | — | — | — | — | — |
| Comp. Ex. 2 | Production Ex. 3 | — | — | — | — | — | — |
| Comp. Ex. 3 | Production Ex. 4 | — | — | — | — | — | — |
| Comp. Ex. 4 | Production Ex. 5 | — | — | — | — | — | — |
| Comp. Ex. 5 | Production Ex. 1 | pH 5.5 | Slurry | 140 | 2 | High-pressure homogenizer | pH 5.5 |
| Comp. Ex. 6 | Production Ex. 6 | — | — | — | — | — | — |
| Comp. Ex. 7 | Production Ex. 1 | pH 5.5 | Slurry | 160 | 2 | Non | — |
| Comp. Ex. 8 | Production Ex. 3 | pH 5.5 | Slurry | 160 | 2 | Non | — |
| Comp. Ex. 9 | Production Ex. 4 | pH 5.5 | Slurry | 160 | 2 | Non | — |
| Comp. Ex. 10 | Production Ex. 5 | Non (pH 8.8) | Slurry | 40 | 2 | Non | — |
| Comp. Ex. 11 | Production Ex. 1 | pH 5.5 | Slurry | 160 | 2 | Disperser | pH 5.5 |
| Comp. Ex. 12 | Production Ex. 1 | Non (pH 8.8) | Sheet | 180 | — | Non | — |
| Comp. Ex. 13 | Production Ex. 1 | pH 5.5 | Slurry | 160 | 2 | High-pressure homogenizer | pH 3.1 |
| Comp. Ex. 14 | Production Ex. 1 | Non (pH 8.8) | Slurry | 160 | 2 | High-pressure homogenizer | pH 3.1 |

TABLE 3

Physical properties of sheet-forming slurry (after removal treatment)

| | Production Examples | Substituent amount [mmol/g] | Number average fiber width [nm] | Percentage [%] of CNF with fiber width of 10 nm or less | Liquid haze [%] | Nanofiber yield [%] | Carbamide group amount [mmol/g] | Nitrogen amount [mmol/g] |
|---|---|---|---|---|---|---|---|---|
| Ex. 1 | Production Ex. 1 | 0.08 | 4 | 98 | 1.2 | 99.5 | 0.09 | 0.09 |
| Ex. 2 | Production Ex. 1 | 0.08 | 4 | 94 | 1.8 | 97.5 | 0.09 | 0.09 |
| Ex. 3 | Production Ex. 1 | 0.08 | 4 | 97 | 0.9 | 99.7 | 0.09 | 0.09 |
| Ex. 4 | Production Ex. 1 | 0.05 | 4 | 93 | 1.3 | 99.3 | 0.09 | 0.09 |
| Ex. 5 | Production Ex. 1 | 0.21 | 4 | 97 | 0.7 | 99.5 | 0.09 | 0.09 |
| Ex. 6 | Production Ex. 1 | 0.40 | 3 | 99 | 0.5 | 99.1 | 0.09 | 0.09 |
| Ex. 7 | Production Ex. 1 | 0.22 | 4 | 98 | 0.7 | 99.3 | 0.09 | 0.09 |
| Ex. 8 | Production Ex. 1 | 0.29 | 4 | 97 | 0.7 | 99.2 | 0.03 | 0.03 |
| Ex. 9 | Production Ex. 1 | 0.08 | 9 | 80 | 3.5 | 96.3 | 0.09 | 0.09 |
| Ex. 10 | Production Ex. 1 | 0.08 | 4 | 98 | 0.7 | 99.6 | 0.09 | 0.09 |
| Ex. 11 | Production Ex. 2 | 0.08 | 4 | 98 | 1.0 | 99.6 | 0.01 | 0.01 |
| Ex. 12 | Production Ex. 3 | 0.08 | 4 | 91 | 2.6 | 97.1 | 0.09 | 0.09 |
| Ex. 13 | Production Ex. 4 | 0.08 | 4 | 91 | 2.1 | 97.4 | 0.09 | 0.09 |
| Ex. 14 | Production Ex. 5 | 0.08 | 4 | 91 | 2.1 | 97.3 | 0.00 | 0.09 |
| Comp. Ex. 1 | Production Ex. 1 | (1.45) | (3) | 99 | — | — | — | — |
| Comp. Ex. 2 | Production Ex. 3 | (1.51) | (3) | 99 | — | — | — | — |
| Comp. Ex. 3 | Production Ex. 4 | (1.12) | (3) | 99 | — | — | — | — |
| Comp. Ex. 4 | Production Ex. 5 | (1.73) | (3) | 99 | — | — | — | — |
| Comp. Ex. 5 | Production Ex. 1 | 0.74 | 3 | 99 | 0.3 | 99.7 | 0.09 | 0.09 |
| Comp. Ex. 6 | Production Ex. 6 | (0.00) | (150) | 0 | — | — | — | — |
| Comp. Ex. 7 | Production Ex. 1 | 0.08 | 26 | 42 | 14.1 | 85.1 | 0.09 | 0.09 |
| Comp. Ex. 8 | Production Ex. 3 | 0.08 | 28 | 40 | 16.5 | 80.3 | 0.09 | 0.09 |
| Comp. Ex. 9 | Production Ex. 4 | 0.08 | 29 | 40 | 21.9 | 84.4 | 0.09 | 0.09 |
| Comp. Ex. 10 | Production Ex. 5 | 0.08 | 27 | 40 | 17.4 | 85.4 | 0.00 | 0.09 |
| Comp. Ex. 11 | Production Ex. 1 | 0.08 | 23 | 43 | 11.3 | 89.3 | 0.09 | 0.09 |
| Comp. Ex. 12 | Production Ex. 1 | (1.45) | (3) | 99 | — | — | — | — |
| Comp. Ex. 13 | Production Ex. 1 | 0.08 | 18 | 65 | 10.2 | 89.7 | 0.09 | 0.09 |
| Comp. Ex. 14 | Production Ex. 1 | 0.08 | 20 | 59 | 10.7 | 89.5 | — | 50 or more |

TABLE 4

| | | Physical properties of sheet after removal treatment | | | | | |
|---|---|---|---|---|---|---|---|
| | Production Examples | Substituent amount [mmol/g] | Total light transmittance [%] | Haze [%] | YI before heating | YI after heating | YI increase percentage [%] |
| Ex. 1 | Production Ex. 1 | 0.08 | 91.4 | 1.0 | 0.9 | 6.6 | 633 |
| Ex. 2 | Production Ex. 1 | 0.08 | 91.3 | 1.1 | 1.0 | 8.2 | 720 |
| Ex. 3 | Production Ex. 1 | 0.08 | 91.5 | 1.1 | 1.0 | 6.5 | 550 |
| Ex. 4 | Production Ex. 1 | 0.05 | 91.2 | 1.0 | 0.9 | 8.3 | 822 |
| Ex. 5 | Production Ex. 1 | 0.21 | 91.4 | 1.0 | 0.9 | 11.4 | 1167 |
| Ex. 6 | Production Ex. 1 | 0.40 | 91.4 | 1.0 | 0.9 | 13.0 | 1344 |
| Ex. 7 | Production Ex. 1 | 0.22 | 91.3 | 1.0 | 1.1 | 14.0 | 1173 |
| Ex. 8 | Production Ex. 1 | 0.29 | 91.3 | 1.2 | 1.3 | 18.0 | 1285 |
| Ex. 9 | Production Ex. 1 | 0.08 | 90.9 | 1.8 | 1.1 | 8.9 | 709 |
| Ex. 10 | Production Ex. 1 | 0.08 | 91.4 | 0.9 | 1.0 | 6.3 | 530 |
| Ex. 11 | Production Ex. 2 | 0.08 | 91.4 | 1.0 | 0.9 | 5.4 | 500 |
| Ex. 12 | Production Ex. 3 | 0.08 | 91.5 | 1.5 | 0.9 | 7.3 | 711 |
| Ex. 13 | Production Ex. 4 | 0.08 | 91.2 | 1.3 | 1.0 | 7.4 | 640 |
| Ex. 14 | Production Ex. 5 | 0.08 | 91.3 | 1.2 | 1.2 | 9.7 | 708 |
| Comp. Ex. 1 | Production Ex. 1 | 1.45 | 91.4 | 0.9 | 0.9 | 20.7 | 2200 |
| Comp. Ex. 2 | Production Ex. 3 | 1.51 | 91.2 | 1.0 | 1.0 | 22.2 | 2120 |
| Comp. Ex. 3 | Production Ex. 4 | 1.12 | 91.1 | 1.1 | 0.9 | 20.9 | 2222 |
| Comp. Ex. 4 | Production Ex. 5 | 1.73 | 91.3 | 1.0 | 2.1 | 50.0 | 2281 |
| Comp. Ex. 5 | Production Ex. 1 | 0.74 | 91.2 | 0.9 | 1.0 | 18.9 | 1790 |
| Comp. Ex. 6 | Production Ex. 6 | 0.00 | 85.8 | 90.8 | 0.7 | 3.1 | 343 |
| Comp. Ex. 7 | Production Ex. 1 | 0.08 | 87.8 | 40.2 | 1.0 | 7.4 | 640 |
| Comp. Ex. 8 | Production Ex. 3 | 0.08 | 87.1 | 42.3 | 1.0 | 8.1 | 710 |
| Comp. Ex. 9 | Production Ex. 4 | 0.08 | 86.5 | 46.1 | 0.9 | 7.6 | 744 |
| Comp. Ex. 10 | Production Ex. 5 | 0.08 | 86.9 | 43.7 | 1.3 | 9.9 | 662 |
| Comp. Ex. 11 | Production Ex. 1 | 0.08 | 89.1 | 35.3 | 1.0 | 8.1 | 710 |
| Comp. Ex. 12 | Production Ex. 1 | 0.04 | 90.9 | 3.5 | 10.4 | 17.2 | 65 |
| Comp. Ex. 13 | Production Ex. 1 | 0.08 | 89.5 | 13.3 | 1.3 | 45.3 | 3385 |
| Comp. Ex. 14 | Production Ex. 1 | 0.08 | 89.3 | 15.2 | 1.4 | 53.2 | 3700 |

The dispersed solutions obtained in the above Examples comprised fine fibrous cellulose containing a small amount of substituents, and also, the dispersed solutions were highly transparent. In addition, the sheets formed from these dispersed solutions were highly transparent, and the YI increase percentage before and after heating was small.

In contrast, when the substituent removal treatment was not carried out or when the removal treatment was insufficient, the obtained sheets had a large YI increase percentage before and after heating (Comparative Examples 1 to 5). In addition, when unmodified coarse fibrous cellulose were used, the obtained sheet was not transparent (Comparative Example 6). Moreover, when uniform dispersion was not carried out after the removal of substituents, the obtained slurries had low transparency and the transparency of the obtained sheets tended to be low (Comparative Examples 7 to 11). Besides, when the substituent removal treatment was carried out on fine fibrous cellulose that were in a sheet state, the haze of the sheet was high, and also, the YI value before heating was high (Comparative Example 12). Furthermore, when the uniform dispersion treatment was carried out at a pH value of less than pH 4, the haze of the sheet was high, and also, the YI value after heating was high (Comparative Example 13).

[Measurement of Surface Roughness of Sheet]

The surface roughness of each of the substituent-removed fine fibrous cellulose-containing sheets obtained in Examples 1, 3, 10 and 11 was measured. The surface roughness of the sheet was measured using an atomic force microscope (manufactured by Veeco, NanoScope Ma), and the arithmetic mean roughness of a 3 μm square on the surface of the sheet was defined to be the surface roughness of the sheet.

TABLE 5

| | Surface roughness [nm] |
|---|---|
| Ex. 1 | 8 |
| Ex. 3 | 7 |
| Ex. 10 | 8 |
| Ex. 11 | 6 |

As shown in the results of the above table, the surface roughness of the sheet in any of the examples was a low value.

[Measurement of Dispersed Solution pH and Sheet Surface pH]

Moreover, the pH of the substituent-removed fine fibrous cellulose-containing dispersed solution obtained in each of Example 1 and Comparative Example 13 and the surface pH of the sheet thereof were measured. When the surface pH of the sheet was measured, 10 μL of ion exchange water was added dropwise in a 1 cm square range on the surface of the sheet, using a micropipette, and the pH of the portion was then measured using a flat-type pH composite electrode (6261-10C; manufactured by HORIBA).

[Measurement of Viscosity]

Furthermore, the viscosity of the substituent-removed fine fibrous cellulose-containing dispersed solution obtained in each of Example 1 and Comparative Example 13 was measured. The concentration of the fine fibrous cellulose was set to be 0.4% by mass, and the fine fibrous cellulose-containing dispersed solution was left at rest under the environment of 23° C. and a relative humidity of 50% for 24 hours, before the measurement. Thereafter, the viscosity was measured using a type B viscometer (manufactured by BROOKFIELD; analog viscometer T-LVT) under conditions of 23° C. and a rotation speed of 3 rpm. The viscosity 3 minutes after initiation of the measurement was defined to be the viscosity of the dispersed solution.

TABLE 6

|  | pH of dispersed solution | pH of sheet surface | Viscosity [mPa · s] |
| --- | --- | --- | --- |
| Ex. 1 | 5.5 | 4.8 | 3040 |
| Comp. Ex. 13 | 3.1 | 2.4 | 2680 |

As shown in the results of the above table, the pH of the dispersed solution obtained in Comparative 13 and the surface pH of the sheet were less than pH 4. Thus, yellowing was observed after heating. In addition, the dispersed solution obtained in Comparative 13 had a lower viscosity than the dispersed solution obtained in Example 1, and in Comparative Example 13, the fine fibrous cellulose became short.

[Measurement of Concentration of Free Nitrogen in Dispersed Solution]

Moreover, the amount of free nitrogen contained in each of the substituent-removed fine fibrous cellulose-containing dispersed solutions obtained in Example 1, Comparative Example 13 and Comparative Example 14 was measured. Distilled water was added to the fine fibrous cellulose-dispersed solution, so that the concentration of the fine fibrous cellulose became 0.2% by mass, and the obtained solution was then stirred for 24 hours. After completion of the stirring, the reaction mixture was filtrated using a filter material having a pore diameter of 0.45 μm to obtain a filtrate.

TABLE 7

|  | Free nitrogen concentration [ppm] in dispersed solution |
| --- | --- |
| Ex. 1 | 30 or less |
| Comp. Ex. 13 | 30 or less |
| Comp. Ex. 14 | 200 or more |

Example 101

[Substituent Removal Treatment (High-Temperature Heat Treatment)]

To the fine fibrous cellulose-dispersed solution obtained in Production Example 1, an aqueous solution of 20% by mass of citric acid was added, so that the pH of the dispersed solution was adjusted to pH 5.5. The obtained slurry was placed in a pressure-resistant vessel, and was then heated at a liquid temperature of 160° C. for 15 minutes, until the amount of phosphoric acid groups became 0.08 mmol/g. Generation of an fine fibrous cellulose aggregate was confirmed by this operation.

[Washing Treatment of Substituent-Removed Slurry]

To the heated slurry, ion exchange water was added in an amount equal to that of the slurry, so as to prepare a slurry having a solid concentration of about 1% by mass. The operation of stirring the slurry and then subjecting the resulting slurry to filtration dehydration was repeatedly carried out to wash the slurry. At a time point at which the electric conductivity of the filtrate became 10 μS/cm or less, ion exchange water was added again to prepare a slurry having a solid concentration of about 1% by mass, which was then left at rest for 24 hours. Thereafter, the filtration dehydration operation was further repeatedly carried out, and the washing was terminated at a time point at which the electric conductivity of the filtrate became 10 μS/cm or less again. Ion exchange water was added to the obtained fine fibrous cellulose aggregate, thereby obtaining a substituent-removed slurry. The solid concentration of this slurry was 1.7% by mass.

[Uniform Dispersion of Substituent-Removed Slurry]

Ion exchange water was added to the obtained substituent-removed slurry to prepare a slurry having a solid concentration of 1.0% by mass. The pH of this slurry was pH 5.5. The slurry was treated with a high-pressure homogenizer (manufactured by Sugino Machine Limited, Star Burst) at a pressure of 200 MPa three times, so as to obtain a substituent-removed fine fibrous cellulose-dispersed solution comprising substituent-removed fine fibrous cellulose. The number average fiber width of the substituent-removed fine fibrous cellulose measured in the after-mentioned [Measurement of fiber width] was 4 nm, and the percentage of fine fibrous cellulose having a fiber width of 10 nm or less was 98%.

[Sheet Production 1]

Acetoacetyl group-modified polyvinyl alcohol (manufactured by Mitsubishi Chemical Corporation, Gosenex Z-200) was added to ion exchange water to a concentration of 12% by mass, and the obtained mixture was then stirred at 95° C. for 1 hour for dissolution. According to the above procedures, a polyvinyl alcohol aqueous solution was obtained.

The substituent-removed fine fibrous cellulose-dispersed solution and the above-described polyvinyl alcohol aqueous solution were each diluted with ion exchange water to result in a solid concentration of 0.6% by mass. Subsequently, 30 parts by mass of the diluted polyvinyl alcohol aqueous solution was mixed into 70 parts by mass of the diluted substituent-removed fine fibrous cellulose-dispersed solution to obtain a mixed solution. Further, the mixed solution was weighed, so that the finished basis weight of a sheet became 37.5 g/m², and was then spread on a commercially available acrylic plate. Besides, in order to obtain the predetermined basis weight, a damming frame (inside dimension: 250 mm×250 mm, height: 5 cm) was arranged on the acrylic plate. Thereafter, the solution was dried with a dryer at 70° C. for 24 hours, and the resultant was then peeled from the above-described acrylic plate to obtain a substituent-removed fine fibrous cellulose-containing sheet. The thickness of the sheet was 25 μm. Besides, the surface pH of the substituent-removed fine fibrous cellulose-containing sheet, before lamination of a resin layer, was 4.8.

[Formation of Resin Layer]

A resin composition was obtained by mixing 100 parts by mass of an acrylic resin graft-polymerized with an acryloyl group having a hydroxyl group (manufactured by Taisei Fine Chemical Co., Ltd.; Acrit 8KX-012C; solid concentration: 39% by mass), 38 parts by mass of a polyisocyanate compound (manufactured by Asahi Kasei Chemicals Corporation; TPA-100), and 100 parts by mass of methyl ethyl ketone. Subsequently, the above-described resin composition was applied onto one surface of the substituent-removed fine fibrous cellulose-containing sheet using a bar coater, and was then hardened by heating at 100° C. for 1 hour, so that a resin layer was laminated on the sheet. Further, a resin layer was also laminated on the other surface of the substituent-removed fine fibrous cellulose-containing sheet by the same procedures as those described above. The thickness of the resin layer was 5 μm on each surface. By the above procedures, a laminated sheet, in which resin layers were laminated on both surfaces of the substituent-removed fine fibrous cellulose-containing sheet, was obtained.

Example 102

A laminated sheet was obtained in the same manner as that of Example 101, with the exception that the substituent removal treatment was carried out at a liquid temperature of 85° C. for 5 days. Besides, the surface pH of the substituent-removed fine fibrous cellulose-containing sheet, before lamination of a resin layer, was 4.7.

Example 103

A laminated sheet was obtained in the same manner as that of Example 101, with the exceptions that the fine fibrous cellulose-dispersed solution obtained in Production Example 1 was diluted to a concentration of 0.7% by mass, the substituent removal treatment was then carried out, and after completion of the washing treatment step following the removal of substituents, ion exchange water was added to the obtained fine fibrous cellulose aggregate, so as to prepare a slurry having a solid concentration of 1.0% by mass. Besides, the surface pH of the substituent-removed fine fibrous cellulose-containing sheet, before lamination of a resin layer, was 4.8.

Example 104

A laminated sheet was obtained in the same manner as that of Example 101, with the exception that the substituent removal treatment was carried out at a liquid temperature of 160° C. for 40 minutes, until the amount of phosphoric acid groups became 0.05 mmol/g. Besides, the surface pH of the substituent-removed fine fibrous cellulose-containing sheet, before lamination of a resin layer, was 4.8.

Example 105

A laminated sheet was obtained in the same manner as that of Example 101, with the exception that the substituent removal treatment was carried out at a liquid temperature of 150° C. for 15 minutes, until the amount of phosphoric acid groups became about 0.21 mmol/g. Besides, the surface pH of the substituent-removed fine fibrous cellulose-containing sheet, before lamination of a resin layer, was 4.9.

Example 106

A laminated sheet was obtained in the same manner as that of Example 101, with the exception that the substituent removal treatment was carried out at a liquid temperature of 140° C. for 20 minutes, until the amount of phosphoric acid groups became about 0.40 mmol/g. Besides, the surface pH of the substituent-removed fine fibrous cellulose-containing sheet, before lamination of a resin layer, was 4.7.

Example 107

A laminated sheet was obtained in the same manner as that of Example 101, with the exceptions that the pH of the fine fibrous cellulose-dispersed solution to be subjected to the substituent removal treatment was adjusted to pH 2.4, and after completion of the washing treatment of the substituent-removed slurry, the pH of the slurry was adjusted to pH 5.5. The amount of phosphoric acid groups after the removal of substituents was 0.22 mmol/g. Besides, the surface pH of the substituent-removed fine fibrous cellulose-containing sheet, before lamination of a resin layer, was 4.7.

Example 108

A laminated sheet was obtained in the same manner as that of Example 101, with the exceptions that the heat treatment was carried out without adjusting the pH of the fine fibrous cellulose-dispersed solution to be subjected to the substituent removal treatment, and after completion of the washing treatment of the substituent-removed slurry, the pH of the slurry was adjusted to pH 5.5. The amount of phosphoric acid groups after the removal of substituents was 0.29 mmol/g. Besides, the surface pH of the substituent-removed fine fibrous cellulose-containing sheet, before lamination of a resin layer, was 4.9.

Example 109

A laminated sheet was obtained in the same manner as that of Example 101, with the exception that uniform dispersion of the substituent-removed slurry was carried out using a high-speed defibrator (manufactured by M Technique Co., Ltd., CLEARMIX-11S) under conditions of a circumferential speed of 34 m/sec for 180 minutes. Besides, the surface pH of the substituent-removed fine fibrous cellulose-containing sheet, before lamination of a resin layer, was 4.8.

Example 110

A laminated sheet was obtained in the same manner as that of Example 101, with the exceptions that the substituent removal treatment was carried out not by a heat treatment but by the following enzyme treatment, and further that the washing treatment of the substituent-removed slurry was carried out according to the method as described below. Besides, the surface pH of the substituent-removed fine fibrous cellulose-containing sheet, before lamination of a resin layer, was 4.8.
[Substituent Removal Treatment (Enzyme Treatment)]

To the obtained fine fibrous cellulose-dispersed solution, an aqueous solution of 20% by mass of citric acid was added, so that the pH of the slurry was adjusted to pH 5.5. To the obtained slurry, acid phosphatase (Sumizyme PM, manufactured by Shin-Nippon Chemical Industrial Co., Ltd.) was added in an amount of 3 parts by mass with respect to 100 parts by mass of the fine fibrous cellulose, and an enzyme treatment was then carried out in a hot water bath at 37° C. for 2.5 hours. By this operation, generation of an fine fibrous cellulose aggregate was confirmed.
[Washing Treatment of Slurry after Removal of Substituents by Enzyme Treatment]

To the obtained substituent-removed slurry, ⅕ by volume of a strongly basic ion exchange resin (Amberjet 4400; manufactured by Organo Corporation; conditioned) and ⅕ by volume of a weakly acidic ion exchange resin (Amberlite IRC76; manufactured by Organo Corporation; conditioned) were added, and the resultant mixture was then shaken for 1 hour. Thereafter, the reaction mixture was poured onto a mesh having 90-μm apertures to separate the resin from the slurry, so as to wash the slurry.

Example 111

A laminated sheet was obtained in the same manner as that of Example 101, with the exceptions that the fine fibrous cellulose-dispersed solution obtained in Production Example 2 was used, instead of the fine fibrous cellulose-dispersed solution obtained in Production Example 1. Besides, the surface pH of the substituent-removed fine fibrous cellulose-containing sheet, before lamination of a resin layer, was 4.7.

Example 112

A laminated sheet was obtained in the same manner as that of Example 101, with the exceptions that the fine fibrous cellulose-dispersed solution obtained in Production Example 3 was used, instead of the fine fibrous cellulose-dispersed solution obtained in Production Example 1. Besides, the surface pH of the substituent-removed fine fibrous cellulose-containing sheet, before lamination of a resin layer, was 4.7.

Example 113

A laminated sheet was obtained in the same manner as that of Example 101, with the exceptions that the fine fibrous cellulose-dispersed solution obtained in Production Example 4 was used, instead of the fine fibrous cellulose-dispersed solution obtained in Production Example 1. Besides, the surface pH of the substituent-removed fine fibrous cellulose-containing sheet, before lamination of a resin layer, was 4.8.

Example 114

The fine fibrous cellulose-dispersed solution obtained in Production Example 5 was used, instead of the fine fibrous cellulose-dispersed solution obtained in Production Example 1. Moreover, the after-mentioned substituent removal treatment (low-temperature heat treatment) was carried out, instead of the substituent removal treatment (high-temperature heat treatment). Except for these conditions, a laminated sheet was obtained in the same manner as that of Example 101. Besides, the surface pH of the substituent-removed fine fibrous cellulose-containing sheet, before lamination of a resin layer, was 6.9.
[Substituent Removal (Low-Temperature Heat Treatment)]

The obtained fine fibrous cellulose-dispersed solution was heated at a liquid temperature of 40° C. for 45 minutes, until the amount of xanthate groups became less than 0.08 mmol/g.

Example 115

A laminated sheet was obtained in the same manner as that of Example 101, with the exception that a resin layer was formed on only one surface of the substituent-removed fine fibrous cellulose-containing sheet in the above section [Formation of resin layer]. Besides, the surface pH of the substituent-removed fine fibrous cellulose-containing sheet, before lamination of a resin layer, was 4.8.

Example 116

In the above [Sheet production 1], polyethylene oxide (manufactured by Sumitomo Seika Chemicals Company, Limited.; PEO-18; viscosity average molecular weight: 4,300,000 to 4,800,000) that had been diluted to a solid concentration of 0.6% by mass was used, instead of the polyvinyl alcohol aqueous solution having a solid concentration of 0.6% by mass. Except for this condition, a laminated sheet was obtained in the same manner as that of Example 101. Besides, the surface pH of the substituent-removed fine fibrous cellulose-containing sheet, before lamination of a resin layer, was 4.8.

Example 117

A laminated sheet was obtained in the same manner as that of Example 101, with the exception that the procedures described in the above [Formation of resin layer] were changed as follows. A resin coating solution was obtained by mixing 15 parts by mass of a modified polycarbonate resin (manufactured by MITSUBISHI GAS CHEMICAL COMPANY, INC.; Yupizeta FPC-2136), 57 parts by mass of toluene, and 28 parts by mass of methyl ethyl ketone. Subsequently, 2.25 parts by mass of an isocyanate compound (manufactured by Asahi Kasei Chemicals Corporation; Duranate TPA-100) was added as an adhesion aid to the above-described resin coating solution to obtain a resin composition. Subsequently, the above-described resin composition was applied onto one surface of the substituent-removed fine fibrous cellulose-containing sheet using a bar coater, and was then hardened by heating at 100° C. for 1 hour, so that a resin layer was laminated on the sheet. Further, a resin layer was also laminated on the other surface of the substituent-removed fine fibrous cellulose-containing sheet by the same procedures as those described above. The thickness of the resin layer was 5 μm on each surface. Besides, the surface pH of the substituent-removed fine fibrous cellulose-containing sheet, before lamination of a resin layer, was 4.8.

Example 118

In the above [Sheet production 1], a polyvinyl alcohol aqueous solution was mixed into 40 parts by mass of the diluted substituent-removed fine fibrous cellulose-dispersed solution, so that the amount of the diluted polyvinyl alcohol aqueous solution became 60 parts by mass, thereby obtaining a mixed solution. Further, the mixed solution was weighed so that the finished basis weight of a sheet became 35.0 g/m², and it was then spread on a commercially available acrylic plate. Other than these conditions, a laminated sheet was obtained in the same manner as that of Example 117. Besides, the thickness of the substituent-removed fine fibrous cellulose-containing sheet was 25 μm. Besides, the surface pH of the substituent-removed fine fibrous cellulose-containing sheet, before lamination of a resin layer, was 3.2.

Example 119

In the above [Sheet production 1], a polyvinyl alcohol aqueous solution was mixed into 10 parts by mass of the diluted substituent-removed fine fibrous cellulose-dispersed solution, so that the amount of the diluted polyvinyl alcohol aqueous solution became 90 parts by mass, thereby obtaining a mixed solution. Further, the mixed solution was weighed so that the finished basis weight of a sheet became 31.0 g/m², and it was then spread on a commercially available acrylic plate. Other than these conditions, a laminated sheet was obtained in the same manner as that of Example 117. Besides, the thickness of the substituent-removed fine fibrous cellulose-containing sheet was 25 μm. Besides, the surface pH of the substituent-removed fine fibrous cellulose-containing sheet, before lamination of a resin layer, was 3.0.

Example 120

A laminated sheet was obtained in the same manner as that of Example 117, with the exceptions that the mixed solution weighed so that the finished basis weight of a sheet became 105.0 g/m², and was then spread on a commercially available acrylic plate in the above [Sheet production 1]. Besides, the thickness of the substituent-removed fine fibrous cellulose-containing sheet was 70 μm. Besides, the surface pH of the substituent-removed fine fibrous cellulose-containing sheet, before lamination of a resin layer, was 4.8.

Example 121

A laminated sheet was obtained in the same manner as that of Example 120, with the exception that the procedures of the above [Formation of resin layer] were changed as follows. A resin coating solution was obtained by mixing 15 parts by mass of a modified polycarbonate resin (manufactured by MITSUBISHI GAS CHEMICAL COMPANY, INC.; Yupizeta FPC-2136), 57 parts by mass of toluene, and 28 parts by mass of methyl ethyl ketone. Subsequently, 0.75 parts by mass of methacryloxypropyltrimethoxysilane (manufactured by Momentive Performance Materials Japan, SILQUEST A-174 SILANE) that was an organic silicon compound (silane coupling agent) was added as an adhesion aid to the above-described resin coating solution to obtain a resin composition. Subsequently, the above-described resin composition was applied onto one surface of the substituent-removed fine fibrous cellulose-containing sheet using a bar coater, and was then hardened by heating at 100° C. for 1 hour, so that a resin layer was laminated on the sheet. Further, a resin layer was also laminated on the other surface of the substituent-removed fine fibrous cellulose-containing sheet by the same procedures as those described above. The thickness of the resin layer was 5 μm on each surface. Besides, the surface pH of the substituent-removed fine fibrous cellulose-containing sheet, before lamination of a resin layer, was 4.8.

Comparative Example 101

An fine fibrous cellulose-containing sheet was obtained by performing the same operations as those in the above [Sheet production 1], with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 7.3.

Comparative Example 102

An fine fibrous cellulose-containing sheet was obtained in the same manner as that of Comparative Example 101, with the exception that the fine fibrous cellulose-dispersed solution obtained in Production Example 3 was used. Besides, the surface pH of the fine fibrous cellulose-containing sheet, before lamination of a resin layer, was 7.2.

Comparative Example 103

An fine fibrous cellulose-containing sheet was obtained in the same manner as that of Comparative Example 101, with the exception that the fine fibrous cellulose-dispersed solution obtained in Production Example 4 was used. Besides, the surface pH of the fine fibrous cellulose-containing sheet, before lamination of a resin layer, was 6.9.

Comparative Example 104

An fine fibrous cellulose-containing sheet was obtained in the same manner as that of Comparative Example 101, with the exception that the fine fibrous cellulose-dispersed solution obtained in Production Example 5 was used. Besides, the surface pH of the fine fibrous cellulose-containing sheet, before lamination of a resin layer, was 6.3.

Comparative Example 105

A laminated sheet was obtained in the same manner as that of Example 101, with the exception that the substituent removal treatment was carried out at a liquid temperature of 140° C. for 10 minutes, until the amount of phosphoric acid groups became about 0.74 mmol/g. Besides, the surface pH of the substituent-removed fine fibrous cellulose-containing sheet, before lamination of a resin layer, was 4.9.

Comparative Example 106

A laminated sheet was obtained in the same manner as that of Comparative Example 101, with the exception that the cellulose-dispersed solution comprising coarse fibrous cellulose obtained in Production Example 6 was used. Besides, the surface pH of the coarse cellulose fiber-containing sheet, before lamination of a resin layer, was 5.8.

Comparative Example 107

A laminated sheet was obtained in the same manner as that of Example 101, with the exception that uniform dispersion of the substituent-removed slurry was not carried out. Besides, the surface pH of the substituent-removed cellulose fiber-containing sheet, before lamination of a resin layer, was 4.8.

Comparative Example 108

A laminated sheet was obtained in the same manner as that of Example 112, with the exception that uniform dispersion of the substituent-removed slurry was not carried out. Besides, the surface pH of the substituent-removed cellulose fiber-containing sheet, before lamination of a resin layer, was 4.6.

Comparative Example 109

A laminated sheet was obtained in the same manner as that of Example 113, with the exception that uniform dispersion of the substituent-removed slurry was not carried out. Besides, the surface pH of the substituent-removed cellulose fiber-containing sheet, before lamination of a resin layer, was 4.5.

Comparative Example 110

A laminated sheet was obtained in the same manner as that of Example 114, with the exception that uniform dispersion of the substituent-removed slurry was not carried out. Besides, the surface pH of the substituent-removed cellulose fiber-containing sheet, before lamination of a resin layer, was 6.8.

Comparative Example 111

A laminated sheet was obtained in the same manner as that of Example 115, with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 7.3.

Comparative Example 112

A laminated sheet was obtained in the same manner as that of Example 116, with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 7.2.

Comparative Example 113

A laminated sheet was obtained in the same manner as that of Example 117, with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 7.3.

Comparative Example 114

A laminated sheet was obtained in the same manner as that of Example 118, with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 6.9.

Comparative Example 115

A laminated sheet was obtained in the same manner as that of Example 120, with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 7.2.

Comparative Example 116

A laminated sheet was obtained in the same manner as that of Example 121, with the exception that the fine fibrous cellulose-dispersed solution obtained in Production Example 1 was used instead of the substituent-removed fine fibrous cellulose-dispersed solution in the above [Sheet production 1]. Besides, the surface pH of the fine fibrous cellulose-containing sheet, before lamination of a resin layer, was 7.2.

Comparative Example 117

A laminated sheet was obtained in the same manner as that of Example 101, with the exception that the following [Ion exchange resin treatment of substituent-removed slurry] was carried out instead of the above [Washing treatment of substituent-removed slurry]. Besides, the surface pH of the substituent-removed fine fibrous cellulose-containing sheet, before lamination of a resin layer, was 2.4.
[Ion Exchange Resin Treatment of Substituent-Removed Slurry]

Ion exchange water was added to the heated slurry obtained in [Substituent removal treatment (high-temperature heat treatment)] to obtain a slurry having a solid concentration of about 1.1% by mass. To the obtained slurry, 1/10 by volume of a strongly acidic ion exchange resin (Amberjet 1024; manufactured by Organo Corporation; conditioned) and 1/10 by volume of a strongly basic ion exchange resin (Amberjet 4400; manufactured by Organo Corporation; conditioned) were added, and the resultant mixture was then shaken for 1 hour. Thereafter, the reaction mixture was poured onto a mesh having 90 μm apertures to separate the resin from the slurry. The pH of the obtained slurry was pH 3.1.

Comparative Example 118

A laminated sheet was obtained in the same manner as that of Comparative Example 117, with the exception that citric acid was not added, but urea was added in an amount of 1/10 of the fine fibrous cellulose-dispersed solution in the above [Substituent removal treatment (high-temperature heat treatment)]. Besides, the surface pH of the substituent-removed fine fibrous cellulose-containing sheet, before lamination of a resin layer, was 2.4.

[Evaluation]

The laminated sheets obtained in the above Examples and Comparative Examples were evaluated by the following methods.

[Measurement of Fiber Width]

The fiber width of fibrous cellulose was measured by the following method. Each cellulose fiber-dispersed solution was diluted with water to a cellulose concentration of 0.01% by mass or more and 0.1% by mass or less, and was then casted onto a hydrophilized carbon grid film. After drying, it was stained with uranyl acetate, and was then observed under a transmission electron microscope (TEM; manufactured by JEOL; JEOL-2000EX). At that time, in the obtained image, any vertical or horizontal axis with the image width was created, and the magnification was then adjusted, so that 20 or more fibers intersected against the axis. The observation image satisfying this condition was obtained, and with respect to this image, two longitudinal axes and two horizontal axes were arbitrarily drawn per image. The widths of the fibers intersecting the axes were visually read. Three nonoverlapped observation images were photographed for each dispersed solution, and the values of the fiber widths of the fibers intersecting the two axes were thus read in each image (20 fibers or more×2×3=120 fibers or more). Besides, from the thus obtained fiber width, the number average fiber width was calculated. However, with regard to Examples 101 to 121 and Comparative Examples 105 and 107 to 110, the measurement was carried out using the substituent-removed fine fibrous cellulose-dispersed solution, whereas with regard to Comparative Examples 101 to 104 and 111 to 116, the measurement was carried out using the fine fibrous cellulose-dispersed solution. In addition, only regarding the coarse fibrous cellulose used in Comparative Example 106, the dispersed solution thereof was diluted with water to a cellulose concentration of 0.01% by mass or more and 0.1% by mass or less, and was then casted on a glass, which was then observed under a scanning electron microscope (SEM).

Moreover, according to the following equation, the percentage of fine fibrous cellulose having a fiber width of 10 nm or less was obtained:

Percentage (%) of fine fibrous cellulose having fiber width of 10 nm or less=(number of fine fibrous cellulose having fiber width of 10 nm or less/number of all fibrous cellulose)×100.

[Measurement of Amount of Phosphorus Oxoacid Groups/Measurement of Amount of Sulfone Groups/Measurement of Amount of Xanthate Groups]

The amount of phosphorus oxoacid groups (the amount of phosphoric acid groups or phosphorus acid groups), the amount of sulfone groups and the amount of xanthate groups were measured by the same methods as those described above, respectively.

[Measurement of Total Light Transmittance of Laminated Sheet]

The total light transmittance of the laminated sheet was measured in accordance with JIS K 7361-1: 1997, using a hazemeter (manufactured by MURAKAMI COLOR RESEARCH LABORATORY Co., Ltd.; HM-150).

[Measurement of Haze of Laminated Sheet]

The haze of the laminated sheet was measured in accordance with JIS K 7136: 2000, using a hazemeter (manufactured by MURAKAMI COLOR RESEARCH LABORATORY Co., Ltd.; HM-150).

[Measurement of Yellowness Index Values of Laminated Sheet Before and After Heating]

The yellowness index values (YI values) of the laminated sheet before and after the heating were measured in accordance with JIS K 7373: 2006, using Colour Cute i (manufactured by Suga Test Instruments Co., Ltd.). Besides, the YI value after heating was defined to be the YI value of the laminated sheet that was heated at 160° C. for 6 hours. In addition, the YI increase percentage was measured according to the following method:

YI increase percentage (%)=(YI value of sheet after heating−YI value of sheet before heating)/YI value of sheet before heating×100.

[Measurement of Surface pH of Sheet (CNF Sheet) Before Lamination of Resin Layer]

10 μL of Ion exchange water was added dropwise in a 1 cm square range on the surface of the sheet, using a micropipette, and the pH of the portion was then measured using a flat-type pH composite electrode (6261-10C; manufactured by HORIBA).

TABLE 8

| Ex. | Product. Ex. | pH Adjustment | State upon dissociation | Dissociation temperature [° C.] | Dissociation concentration [mass %] | Number average fiber width [nm] | Percentage [%] of fibers with width of 10 nm or less | Substituent amount [mmol/g] |
|---|---|---|---|---|---|---|---|---|
| Ex. 101 | Product. Ex. 1 | pH 5.5 | Slurry | 160 | 2.0 | 4 | 98 | 0.08 |
| Ex. 102 | Product. Ex. 1 | pH 5.5 | Slurry | 85 | 2.0 | 5 | 94 | 0.08 |
| Ex. 103 | Product. Ex. 1 | pH 5.5 | Slurry | 160 | 0.7 | 4 | 97 | 0.08 |
| Ex. 104 | Product. Ex. 1 | pH 5.5 | Slurry | 160 | 2.0 | 5 | 93 | 0.05 |
| Ex. 105 | Product. Ex. 1 | pH 5.5 | Slurry | 160 | 2.0 | 4 | 97 | 0.21 |
| Ex. 106 | Product. Ex. 1 | pH 5.5 | Slurry | 140 | 2.0 | 3 | 99 | 0.40 |
| Ex. 107 | Product. Ex. 1 | pH 2.4 | Slurry | 160 | 2.0 | 4 | 98 | 0.22 |
| Ex. 108 | Product. Ex. 1 | Non (pH 8.8) | Slurry | 160 | 2.0 | 4 | 97 | 0.29 |
| Ex. 109 | Product. Ex. 1 | pH 5.5 | Slurry | 160 | 2.0 | 9 | 80 | 0.08 |
| Ex. 110 | Product. Ex. 1 | pH 5.5 | Slurry | 37 (enzyme) | 2.0 | 4 | 98 | 0.08 |
| Ex. 111 | Product. Ex. 2 | pH 5.5 | Slurry | 160 | 2.0 | 4 | 98 | 0.08 |
| Ex. 112 | Product. Ex. 3 | pH 5.5 | Slurry | 160 | 2.6 | 6 | 61 | 0.08 |
| Ex. 113 | Product. Ex. 4 | pH 5.5 | Slurry | 160 | 2.0 | 6 | 91 | 0.08 |
| Ex. 114 | Product. Ex. 5 | Non (pH 8.8) | Slurry | 40 | 2.0 | 6 | 91 | 0.08 |
| Ex. 115 | Product. Ex. 1 | pH 5.5 | Slurry | 160 | 2.0 | 4 | 98 | 0.08 |
| Ex. 116 | Product. Ex. 1 | pH 5.5 | Slurry | 160 | 2.0 | 4 | 98 | 0.08 |
| Ex. 117 | Product. Ex. 1 | pH 5.5 | Slurry | 160 | 2.0 | 4 | 98 | 0.08 |
| Ex. 118 | Product. Ex. 1 | pH 5.5 | Slurry | 160 | 2.0 | 4 | 98 | 0.08 |
| Ex. 119 | Product. Ex. 1 | pH 5.5 | Slurry | 160 | 2.0 | 4 | 98 | 0.08 |
| Ex. 120 | Product. Ex. 1 | pH 5.5 | Slurry | 160 | 2.0 | 4 | 98 | 0.08 |
| Ex. 121 | Product. Ex. 1 | pH 5.5 | Slurry | 160 | 2.0 | 4 | 98 | 0.08 |

TABLE 9

| Ex. | Product. Ex. | Total light transmittance [%] | Haze [%] | YI before heating | YI after heating | YI increase percentage [%] | Sheet second component | CNF/second component | CNF thickness [um] | Resin layer | CNF sheet surface pH [—] | Resin layer-added surface |
|---|---|---|---|---|---|---|---|---|---|---|---|---|
| Ex. 101 | Product. Ex. 1 | 91.5 | 0.3 | 1.0 | 5.9 | 494 | PVA | 70/30 | 25 | AC + PIC | 4.8 | Both surfaces |
| Ex. 102 | Product. Ex. 1 | 91.4 | 0.3 | 1.1 | 7.4 | 571 | PVA | 70/30 | 25 | AC + PIC | 4.7 | Both surfaces |
| Ex. 103 | Product. Ex. 1 | 91.6 | 0.3 | 1.1 | 5.9 | 432 | PVA | 70/30 | 25 | AC + PIC | 4.8 | Both surfaces |
| Ex. 104 | Product. Ex. 1 | 91.5 | 0.3 | 1.0 | 7.5 | 647 | PVA | 70/30 | 25 | AC + PIC | 4.8 | Both surfaces |
| Ex. 105 | Product. Ex. 1 | 91.7 | 0.3 | 1.0 | 10.3 | 926 | PVA | 70/30 | 25 | AC + PIC | 4.9 | Both surfaces |
| Ex. 106 | Product. Ex. 1 | 91.7 | 0.3 | 1.0 | 11.7 | 1070 | PVA | 70/30 | 25 | AC + PIC | 4.7 | Both surfaces |
| Ex. 107 | Product. Ex. 1 | 91.6 | 0.3 | 1.2 | 12.6 | 950 | PVA | 70/30 | 25 | AC + PIC | 4.7 | Both surfaces |
| Ex. 108 | Product. Ex. 1 | 91.6 | 0.3 | 1.4 | 16.2 | 1057 | PVA | 70/30 | 25 | AC + PIC | 4.9 | Both surfaces |
| Ex. 109 | Product. Ex. 1 | 91.0 | 0.9 | 1.2 | 8.0 | 568 | PVA | 70/30 | 25 | AC + PIC | 4.8 | Both surfaces |
| Ex. 110 | Product. Ex. 1 | 91.5 | 0.3 | 1.1 | 5.7 | 415 | PVA | 70/30 | 25 | AC + PIC | 4.8 | Both surfaces |
| Ex. 111 | Product. Ex. 2 | 91.5 | 0.3 | 1.0 | 4.9 | 386 | PVA | 70/30 | 25 | AC + PIC | 4.7 | Both surfaces |

TABLE 9-continued

| Ex. | Product. Ex. | Total light transmittance [%] | Haze [%] | YI before heating | YI after heating | YI increase percentage [%] | Sheet second component | CNF/ second component | CNF thickness [um] | Resin layer | CNF sheet surface pH [—] | Resin layer-added surface |
|---|---|---|---|---|---|---|---|---|---|---|---|---|
| Ex. 112 | Product. Ex. 3 | 91.6 | 0.4 | 1.0 | 6.6 | 557 | PVA | 70/30 | 25 | AC + PIC | 4.7 | Both surfaces |
| Ex. 113 | Product. Ex. 4 | 91.3 | 0.6 | 1.1 | 6.7 | 505 | PVA | 70/30 | 25 | AC + PIC | 4.8 | Both surfaces |
| Ex. 114 | Product. Ex. 5 | 91.4 | 0.8 | 1.3 | 8.7 | 572 | PVA | 70/30 | 25 | AC + PIC | 6.9 | Both surfaces |
| Ex. 115 | Product. Ex. 1 | 91.3 | 0.8 | 0.9 | 6.2 | 589 | PVA | 70/30 | 25 | AC + PIC | 4.8 | One surface |
| Ex. 116 | Product. Ex. 1 | 91.4 | 0.3 | 1.0 | 5.8 | 480 | PEO | 70/30 | 25 | AC + PIC | 4.8 | Both surfaces |
| Ex. 117 | Product. Ex. 1 | 91.0 | 0.3 | 1.0 | 5.8 | 480 | PVA | 70/30 | 25 | PC + PIC | 4.8 | Both surfaces |
| Ex. 118 | Product. Ex. 1 | 91.0 | 0.3 | 0.3 | 2.7 | 800 | PVA | 40/60 | 25 | PC + PIC | 3.2 | Both surfaces |
| Ex. 119 | Product. Ex. 1 | 91.0 | 0.3 | 0.3 | 2.4 | 700 | PVA | 10/90 | 25 | PC + PIC | 3.0 | Both surfaces |
| Ex. 120 | Product. Ex. 1 | 91.0 | 0.3 | 1.5 | 10.8 | 620 | PVA | 70/30 | 70 | PC + PIC | 4.8 | Both surfaces |
| Ex. 121 | Product. Ex. 1 | 91.0 | 0.3 | 1.3 | 8.7 | 569 | PVA | 70/30 | 70 | PC + OSI | 4.8 | Both surfaces |

TABLE 10

| Comp. Ex. | Product. Ex. | pH Adjustment | State upon dissociation | Dissociation temperature [° C.] | Dissociation concentration [mass %] | Number average fiber width [nm] | Percentage [%] of fibers with width of 10 nm or less | Substituent amount [mmol/g] |
|---|---|---|---|---|---|---|---|---|
| Comp. Ex. 101 | Product. Ex. 1 | — | — | — | — | 3 | 99 | 1.45 |
| Comp. Ex. 102 | Product. Ex. 3 | — | — | — | — | 3 | 99 | 1.51 |
| Comp. Ex. 103 | Product. Ex. 4 | — | — | — | — | 3 | 99 | 1.12 |
| Comp. Ex. 104 | Product. Ex. 5 | — | — | — | — | 3 | 99 | 1.73 |
| Comp. Ex. 105 | Product. Ex. 1 | pH 5.5 | Slurry | 160 | 2.0 | 3 | 99 | 0.74 |
| Comp. Ex. 106 | Product. Ex. 6 | — | — | — | — | 150 | 0 | 0.00 |
| Comp. Ex. 107 | Product. Ex. 1 | pH 5.5 | Slurry | 160 | 2.0 | 26 | 42 | 0.08 |
| Comp. Ex. 108 | Product. Ex. 3 | pH 5.5 | Slurry | 160 | 2.0 | 28 | 40 | 0.08 |
| Comp. Ex. 109 | Product. Ex. 4 | pH 5.5 | Slurry | 160 | 2.0 | 29 | 40 | 0.08 |
| Comp. Ex. 110 | Product. Ex. 5 | Non (pH 8.8) | Slurry | 40 | 2.0 | 27 | 40 | 0.08 |
| Comp. Ex. 111 | Product. Ex. 1 | — | — | — | — | 3 | 99 | 1.45 |
| Comp. Ex. 112 | Product. Ex. 1 | — | — | — | — | 3 | 99 | 1.45 |
| Comp. Ex. 113 | Product. Ex. 1 | — | — | — | — | 3 | 99 | 1.45 |
| Comp. Ex. 114 | Product. Ex. 1 | — | — | — | — | 3 | 99 | 1.45 |
| Comp. Ex. 115 | Product. Ex. 1 | — | — | — | — | 3 | 99 | 1.45 |
| Comp. Ex. 116 | Product. Ex. 1 | — | — | — | — | 3 | 99 | 1.45 |
| Comp. Ex. 117 | Product. Ex. 1 | pH 5.5 | Slurry | 160 | 2.0 | 18 | 65 | 0.08 |
| Comp. Ex. 118 | Product. Ex. 1 | Non (pH 8.8) | Slurry | 160 | 2.0 | 20 | 59 | 0.08 |

TABLE 11

| Comp. Ex. | Product. Ex. | Total light transmittance [%] | Haze [%] | YI before heating | YI after heating | YI increase percentage [%] | Sheet second component | CNF/ second component | CNF thickness [um] | Resin layer | CNF sheet surface pH [—] | Resin layer-added surface |
|---|---|---|---|---|---|---|---|---|---|---|---|---|
| Comp. Ex. 101 | Product. Ex. 1 | 91.7 | 0.3 | 1.5 | 23.5 | 1467 | PVA | 70/30 | 25 | AC + PIC | 7.3 | Both surfaces |
| Comp. Ex. 102 | Product. Ex. 3 | 91.5 | 0.3 | 1.6 | 25.0 | 1463 | PVA | 70/30 | 25 | AC + PIC | 7.2 | Both surfaces |
| Comp. Ex. 103 | Product. Ex. 4 | 91.4 | 0.3 | 1.5 | 23.7 | 1480 | PVA | 70/30 | 25 | AC + PIC | 6.9 | Both surfaces |
| Comp. Ex. 104 | Product. Ex. 5 | 91.6 | 0.3 | 2.7 | 52.8 | 1856 | PVA | 70/30 | 25 | AC + PIC | 6.3 | Both surfaces |
| Comp. Ex. 105 | Product. Ex. 1 | 91.5 | 0.3 | 1.6 | 21.7 | 1256 | PVA | 70/30 | 25 | AC + PIC | 4.9 | Both surfaces |
| Comp. Ex. 106 | Product. Ex. 6 | 86.1 | 90.1 | 1.3 | 5.9 | 354 | PVA | 70/30 | 25 | AC + PIC | 5.8 | Both surfaces |
| Comp. Ex. 107 | Product. Ex. 1 | 88.1 | 39.2 | 1.6 | 11.0 | 588 | PVA | 70/30 | 25 | AC + PIC | 4.8 | Both surfaces |
| Comp. Ex. 108 | Product. Ex. 3 | 87.4 | 40.1 | 1.6 | 11.9 | 644 | PVA | 70/30 | 25 | AC + PIC | 4.6 | Both surfaces |
| Comp. Ex. 109 | Product. Ex. 4 | 86.8 | 44.5 | 1.5 | 11.3 | 653 | PVA | 70/30 | 25 | AC + PIC | 4.5 | Both surfaces |
| Comp. Ex. 110 | Product. Ex. 5 | 87.2 | 42.3 | 1.9 | 14.2 | 647 | PVA | 70/30 | 25 | AC + PIC | 6.8 | Both surfaces |
| Comp. Ex. 111 | Product. Ex. 1 | 91.3 | 0.8 | 1.5 | 23.3 | 1453 | PVA | 70/30 | 25 | AC + PIC | 7.3 | One surface |
| Comp. Ex. 112 | Product. Ex. 1 | 91.4 | 0.3 | 1.4 | 22.8 | 1529 | PEO | 70/30 | 25 | AC + PIC | 7.2 | Both surfaces |
| Comp. Ex. 113 | Product. Ex. 1 | 91.0 | 0.3 | 1.4 | 22.9 | 1536 | PVA | 70/30 | 25 | PC + PIC | 7.3 | Both surfaces |
| Comp. Ex. 114 | Product. Ex. 1 | 91.0 | 0.3 | 1.4 | 21.0 | 1400 | PVA | 40/60 | 25 | PC + PIC | 6.9 | Both surfaces |
| Comp. Ex. 115 | Product. Ex. 1 | 91.0 | 0.3 | 2.3 | 39.7 | 1626 | PVA | 70/30 | 70 | PC + PIC | 7.2 | Both surfaces |
| Comp. Ex. 116 | Product. Ex. 1 | 91.0 | 0.3 | 2.1 | 34.5 | 1543 | PVA | 70/30 | 70 | PC + OSI | 7.2 | Both surfaces |
| Comp. Ex. 117 | Product. Ex. 1 | 90.2 | 14.2 | 1.7 | 49.5 | 2812 | PVA | 70/30 | 25 | AC + PIC | 2.4 | Both surfaces |
| Comp. Ex. 118 | Product. Ex. 1 | 91.0 | 13.3 | 1.9 | 57.1 | 2905 | PVA | 70/30 | 25 | AC + PIC | 2.4 | Both surfaces |

AC: Acryl

PIC: Polyisocyanate

PC: Polycarbonate

OSi: Organosilane

The laminated sheets obtained in the above Examples were highly transparent, and the YI value after heating was low, as well as the YI value before heating that was low (Examples 101 to 121). In contrast, when the substituent removal treatment was not carried out, or when the removal treatment was insufficient, the YI value of the obtained laminated sheet after heating was high (Comparative Examples 101 to 105 and 111 to 116). When unmodified coarse fibrous cellulose were used, the obtained laminated sheet was not transparent (Comparative Example 106). When uniform dispersion was not carried out after the removal of substituents, the transparency of the laminated sheets was low (Comparative Examples 107 to 110).

Example 501

The laminated sheet obtained Example 120 was trimmed into a 100 mm square, and such two trimmed sheets were prepared. A polycarbonate plate having a size of 100 mm square and a thickness of 2 mm was sandwiched between the two laminated sheets, and these sheets were further sandwiched between two stainless steel plates each having a size of 200 mm square. Thereafter, the thus obtained product was inserted into MINI TEST PRESS (manufactured by TOYO SEIKI KOGYO CO., LTD., MP-WCH) that had been set to be normal temperature, and the temperature was then increased to 160° C. over 3 minutes under a pressing pressure of 0.2 MPa. In this state, the product was retained for 30 seconds, and the temperature was then decreased to 30° C. over 3 minutes. By the above-described procedures, a laminate with the polycarbonate plate was obtained.

Example 502

A laminate with the polycarbonate plate was obtained in the same manner as that of Example 501, with the exception that the laminated sheet obtained in Example 121 was used.

Comparative Example 501

A laminate with the polycarbonate plate was obtained in the same manner as that of Example 501, with the exception that the laminated sheet obtained in Comparative Example 115 was used.

Comparative Example 502

A laminate with the polycarbonate plate was obtained in the same manner as that of Example 501, with the exception that the laminated sheet obtained in Comparative Example 116 was used.

Comparative Example 503

In Example 501, the treatment with MINI TEST PRESS was carried out without sandwiching the polycarbonate plate between the two laminated sheets. This plate was used in evaluation.

[Evaluation]

The laminates and the plates obtained in the above Examples and Comparative Examples were evaluated by the following methods.

[Measurement of Bending Elastic Modulus]

A test piece with a size of 80 mm×10 mm was cut out from each of the laminates and the plates. A bending test was carried out on the test piece in accordance with JIS K 7171: 2016, and the bending elastic modulus was measured.

[Appearance]

The YI value of each of the laminates and the plates was measured in accordance with JIS K 7373: 2006, using Colour Cute i (manufactured by Suga Test Instruments Co., Ltd.). From the measurement results, the appearance was evaluated in accordance with the following criteria.

A: YI value of less than 10

B: YI value of 10 or more

[Appearance]

The laminates and the plates were each heated at 90° C. for 720 hours. Thereafter, the YI value of each of the laminates and the plates was measured in accordance with JIS K 7373: 2006, using Colour Cute i (manufactured by Suga Test Instruments Co., Ltd.). From the measurement results, the appearance was evaluated in accordance with the following criteria.

A: YI value of less than 15

B: YI value of 15 or more

TABLE 12

| Laminated sheet | Base material | Base material resin | Base material thickness [mm] | CNF lamination form | Lamination method | Pressing temperature | Bending elastic modulus [GPa] of laminate | YI of laminate before heating | YI of laminate after heating | Resin layer | Resin layer-added surface |
|---|---|---|---|---|---|---|---|---|---|---|---|
| Ex. 501 | Ex. 120 | Polycarbonate | 2 | Front and back surfaces | Hot pressing | 160° C. | 4.8 | A | A | PC + PIC | Both surfaces |
| Ex. 502 | Ex. 121 | Polycarbonate | 2 | Front and back surfaces | Hot pressing | 160° C. | 4.8 | A | A | PC + OSi | Both surfaces |
| Comp. Ex. 501 | Comp. Ex. 115 | Polycarbonate | 2 | Front and back surfaces | Hot pressing | 160° C. | 4.4 | B | B | PC + PIC | Both surfaces |
| Comp. Ex. 502 | Comp. Ex. 116 | Polycarbonate | 2 | Front and back surfaces | Hot pressing | 160° C. | 4.4 | B | B | PC + OSi | Both surfaces |
| Comp. Ex. 503 | — | Polycarbonate | 2 | — | — | — | 2.3 | A | A | — | — |

The laminated sheets obtained in the above Examples had low YI values before and after heating and good appearance. In addition, when the laminated sheets were processed into laminates, the laminates had a high bending elastic modulus and were excellent in terms of the effect of reinforcing resin materials (Examples 501 and 502). On the other hand, the laminated sheets that were not subjected to a step comprising a substituent removal treatment had a slightly low bending elastic modulus, and had poor appearance when the laminated sheets were processed into laminates (Comparative Examples 501 and 502).

[Concrete Precursor (Precursor Agent for Concrete Pumping)]

Example 615

100 Parts by mass of porous calcium carbonate was mixed with 200 parts by mass of water, and the substituent-removed fine fibrous cellulose-dispersed solution obtained in Example 1 was then added into the above mixture to result in a solid content of 0.015 parts by mass, followed by fully blending, so as to produce a concrete precursor (a precursor agent for concrete pumping). The obtained concrete precursor (precursor agent for concrete pumping) exhibited good dispersion stability, and the viscosity of the composition was sufficiently low and did not cause problem in handling ability upon the practical use. Therefore, the above-described composition was favorable as a concrete precursor (a precursor agent for concrete pumping).

[Lubricant]

Example 616

0.2 Parts by mass (as a solid content) of the substituent-removed fine fibrous cellulose-dispersed solution obtained in Example 1, 12.5 parts by mass of polyalkylene glycol, 45.0 parts by mass of propylene glycol, 1.0 part by mass of morpholine, 1.5 parts by mass of lauric acid, 0.001 part by mass of metal deactivator (methylbenzotriazole alkanol amine salt), and a balance being water, based on 100 parts by mass of the total, were subjected to preparation and stirring, so as to produce a lubricant. The obtained lubricant exhibited good lubricity and preservation stability. Therefore, the above-described composition was favorable as a lubricant used in a friction part of apparatuses.

[Mold Molding Composition]

Example 617

0.25 Parts by mass (as a solid content) of the substituent-removed fine fibrous cellulose-dispersed solution obtained in Example 1, 100 parts by mass of alumina ($Al_2O_3$) (Al-160SG-4, manufactured by Showa Denko K.K.) used as an inorganic material, 0.2 parts by mass of A-6114 (carboxylic acid-based copolymer ammonium salt, manufactured by Toagosei Company, Limited) used as a dispersant, and 40 parts by mass of water were mixed with one another, and the obtained mixture was then blended using a ball mill for 24 hours, so as to prepare a mold molding composition. The obtained mold molding composition exhibited good dispersion stability and castability. Moreover, the obtained mold molding composition was poured into a gypsum mold, and was then left at rest at room temperature for 24 hours for drying, so as to obtain a wet molded body. The obtained wet molded body was burned in an electric furnace, so as to produce a mold molded body. The obtained mold molded body could be easily released from the mold, and comprised high-density ceramics. Therefore, the above-described composition was favorable as a mold molding composition for improving the production efficiency of mold molded bodies such as ceramic products.

[Dental Material]

Example 618

4 Parts by mass of gypsum dihydrate, 9 parts by mass of anhydrous gypsum, 3.2 parts by mass of magnesium oxide, 6 parts by mass of liquid paraffin, 1 part by mass of surfactant (decaglyceryl trioleate), 0.3 parts by mass of trisodium phosphate, and 3 parts by mass of diatomaceous earth were kneaded, so as to prepare a hardener paste. Further, 3.5 parts by mass of potassium alginate, 60 parts by mass of water, and 10 parts by mass of diatomaceous earth were kneaded, so as to prepare a base material paste. Furthermore, 200 parts by mass of isopropanol was added to 100 parts by mass of the substituent-removed fine fibrous cellulose-dispersed solution obtained in Example 1, so that the fine fibrous cellulose were precipitated. The precipitate was recovered by filtration, and the recovered fine fibrous cellulose were then heated in an oven at 70° C. for 3 hours. The heated fine fibrous cellulose had a solid concentration of 15% by mass. 1 Part by mass (as a solid content) of these fine fibrous cellulose, 26.2 parts by mass of the hardener paste, and 72.8 parts by mass of the base material paste were mixed and kneaded, so as to obtain a dental material composition. The obtained dental material composition exhibited good crushing drag and heat resistance. Therefore, the above-described composition was favorable as a dental material used for a cast crown-repairing treatment or a missing teeth prosthetic treatment in the oral cavity.

Comparative Example 615

A dental material composition was obtained in the same manner as that of Example 618, with the exception that the fine fibrous cellulose-dispersed solution obtained in Comparative Example 1 was used.

[YI Increase Percentage of Dental Material Composition Before and After Heating]

The YI increase percentage of each of the dental material compositions obtained in Example 618 and Comparative Example 615 before and after heating was measured by a reflection measurement method using Colour Cute i (manufactured by Suga Test Instruments Co., Ltd.) in accordance with JIS K 7373: 2006. Besides, the yellowness index after heating was defined to be the yellowness index of the composition that had been heated at 160° C. for 6 hours, and the YI increase percentage was measured according to the following method.

YI increase percentage (%)=(yellowness index of composition after heating−yellowness index of composition before heating)/yellowness index of composition before heating×100

The YI increase percentage of Example 618 was 850%, whereas the YI increase percentage of Comparative Example 615 was 2130%. Thus, when the substituent-removed fine fibrous cellulose obtained in Example 618 was used, yellowness was improved.

[Polishing Agent]

Example 619

0.2 Parts by mass (as a solid content) of the substituent-removed fine fibrous cellulose-dispersed solution obtained in Example 1, 30 parts by mass of cerium oxide, and a balance being water, based on 100 parts by mass of the total, were subjected to preparation and stirring, so as to obtain a polishing agent. The obtained polishing agent exhibited good spraying property and dripping preventing property. Therefore, the above-described composition was favorable as a polishing agent for use in the polishing and washing of metal products, glass products, stone products, resin products, etc.

[Release Agent]

Example 620

0.4 Parts by mass (as a solid content) of the substituent-removed fine fibrous cellulose-dispersed solution obtained in Example 1, 35 parts by mass of benzyl alcohol, 2 parts by mass of hydrogen peroxide ($H_2O_2$), and a balance being water, based on 100 parts by mass of the total, were subjected to preparation and stirring, so as to produce a release agent. The obtained release agent showed good results in a paint peeling test, and liquid dripping was not found after addition of a releasing aid. Therefore, the above-described composition was favorable as a release agent used when a paint was released from the base material of an outer wall, a structure, etc.

[Papermaking Additive]

Example 621

Waste papers (papers, such as waste newspapers, waste cardboards, high-quality waste papers and waste confidential documents) were dissolved by a pulper to obtain a recycled waste paper pulp slurry (freeness: 220 ml, calcium amount: 60 ppm, and sodium amount: 35 ppm). Thereafter, foreign matters such as dusts were removed from the recycled waste paper pulp slurry, using a foreign matter-removing device. Subsequently, the substituent-removed fine fibrous cellulose-dispersed solution obtained in Example 1 was added to the recycled waste paper pulp slurry, so that 30 parts by mass of the dispersed solution as a solid content could be added with respect to 100 parts by mass of the solid content of the recycled water paper pulp. The thus obtained recycled waste paper pulp slurry was placed in a container of a molding machine, and thereafter, using a mold for use in common pulp molds, a flat plate-shaped pulp mold having a thickness of 2.5±0.3 mm and a basis weight of 420±50 g/m² was obtained. The obtained pulp mold exhibited good releasability and tensile strength. Therefore, the above-described composition was favorable as a papermaking additive.

Example 622

A pulp mold was obtained in the same manner as that of Example 621, with the exception that the broad-leaf dissolving pulp manufactured by Oji Paper Co., Ltd. was used instead of the recycled waste paper pulp.

Comparative Example 616

A pulp mold was obtained in the same manner as that of Example 622, with the exception that the fine fibrous cellulose-dispersed solution obtained in Comparative Example 1 was used.

[YI Increase Percentage of Pulp Mold Before and After Heating]

The YI increase percentage of each of the pulp molds obtained in Example 622 and Comparative Example 616 before and after heating was measured by a reflection measurement method using Colour Cute i (manufactured by Suga Test Instruments Co., Ltd.) in accordance with JIS K 7373: 2006. Besides, the yellowness index after heating was defined to be the yellowness index of the composition that had been heated at 160° C. for 6 hours, and the YI increase percentage was measured according to the following method.

YI increase percentage (%)=(yellowness index of composition after heating−yellowness index of composition before heating)/yellowness index of composition before heating×100

The YI increase percentage of Example 622 was 820%, whereas the YI increase percentage of Comparative Example 616 was 2060%. Thus, when the substituent-removed fine fibrous cellulose obtained in Example 622 was used, yellowness was improved.

The invention claimed is:

1. A sheet comprising fine fibrous cellulose, in which the amount of substituent introduced is less than 0.5 mmol/g and having a fiber width of 1 to 10 nm,
    wherein the fine fibrous cellulose has a carbamide group, the haze is 5.0% or less, and
    the YI value at a thickness of 50 μm is 1.5 or less.

2. The sheet according to claim 1, wherein the substituent is an anionic group.

3. The sheet according to claim 1, wherein the substituent is a phosphorus oxoacid group, or substituent derived from the phosphorus oxoacid group.

4. The sheet according to claim 1, wherein when the sheet is heated at 160° C. for 6 hours, the YI increase percentage calculated according to the following equation is 1500% or less:

YI increase percentage (%)=(yellowness index of sheet after heating−yellowness index of sheet before heating)/yellowness index of sheet before heating×100, wherein the yellowness index of the sheet is a yellowness index measured in accordance with JIS K 7373:2006.

5. The sheet according to claim 1, wherein the total light transmittance is 90.0% or more.

6. The sheet according to claim 1, wherein the surface roughness of at least one surface is 10 nm or less.

7. A laminated sheet having a fiber layer and a resin layer, wherein
    the fiber layer is the sheet according to claim 1.

8. The laminated sheet according to claim 7, wherein the thickness of the fiber layer is 20 μm or more.

9. The laminated sheet according to claim 7, wherein the density of the fiber layer is 1.0 g/cm³ or more.

10. The laminated sheet according to claim 7, wherein the resin layer is directly laminated on the fiber layer.

11. The laminated sheet according to claim 7, wherein the resin layer comprises at least one type selected from a polycarbonate resin, an acrylic resin and polyethylene terephthalate resin.

12. The laminated sheet according to claim 7, wherein the resin layer further comprises an adhesion aid.

13. The laminated sheet according to claim 12, wherein the adhesion aid is at least one type selected from an isocyanate compound and an organic silicon compound.

14. The laminated sheet according to claim 13, wherein the adhesion aid is an isocyanate compound, and the content of the isocyanate compound is 10 parts by mass or more and 40 parts by mass or less with respect to 100 parts by mass of the resin comprised in the resin layer.

15. The laminated sheet according to claim 7, wherein the YI value is 2.0 or less.

16. The laminated sheet according to claim 7, wherein the haze is 2.0% or less.

17. A laminate comprising the laminated sheet according to claim 7 and an adherend.

* * * * *